(12) United States Patent
Davis et al.

(10) Patent No.: US 12,216,013 B2
(45) Date of Patent: Feb. 4, 2025

(54) MINIATURE PRESSURE/FORCE SENSOR WITH INTEGRATED LEADS

(71) Applicant: Hutchinson Technology Incorporated, Hutchinson, MN (US)

(72) Inventors: Michael W. Davis, Rockford, MN (US); Peter F. Ladwig, Hutchinson, MN (US); Matthew S. Lang, Excelsior, MN (US); Dean E. Myers, Stewart, MN (US); Clark T. Olsen, Dassel, MN (US); Douglas P. Riemer, Waconia, MN (US)

(73) Assignee: Hutchinson Technology Incorporated, Hutchinson, MN (US)

( * ) Notice: Subject to any disclaimer, the term of this patent is extended or adjusted under 35 U.S.C. 154(b) by 0 days.

(21) Appl. No.: 18/388,473

(22) Filed: Nov. 9, 2023

(65) Prior Publication Data
US 2024/0068889 A1 Feb. 29, 2024

Related U.S. Application Data

(60) Continuation of application No. 17/587,865, filed on Jan. 28, 2022, now Pat. No. 11,867,575, which is a division of application No. 15/424,282, filed on Feb. 3, 2017, now Pat. No. 11,243,127.

(60) Provisional application No. 62/403,765, filed on Oct. 4, 2016, provisional application No. 62/290,789, filed on Feb. 3, 2016.

(51) Int. Cl.
*G01L 1/22* (2006.01)
*G01L 1/14* (2006.01)

(52) U.S. Cl.
CPC ............ *G01L 1/2268* (2013.01); *G01L 1/146* (2013.01)

(58) Field of Classification Search
CPC .............................. G01L 1/2268; G01L 1/146
See application file for complete search history.

(56) References Cited

U.S. PATENT DOCUMENTS

| 4,319,397 A | 3/1982 | Tanabe et al. |
| 4,445,384 A | 5/1984 | Royer |

(Continued)

FOREIGN PATENT DOCUMENTS

| CN | 85108071 A | 4/1986 |
| CN | 103674402 A | 3/2014 |

(Continued)

OTHER PUBLICATIONS

Chang et al., "Demonstration for Integrating Capacitive Pressure Sensors With Read-Out Circuitry on Stainless Steel Substrate", Sensors and Actuators A: Physical, vol. 116, Issue 2, pp. 195-204, Oct. 2004.

(Continued)

*Primary Examiner* — Octavia Hollington
(74) *Attorney, Agent, or Firm* — DLA Piper LLP (US)

(57) ABSTRACT

A pressure/force sensor comprises a diaphragm structure including a sensing element and a lead structure extending from the diaphragm structure and including first and second traces electrically coupled to the sensing element. The diaphragm structure and the lead structure include a circuit assembly comprising a common insulating layer and a common conductor layer on the insulating layer. The conductor layer includes at least a portion of the sensing element and at least the first trace.

6 Claims, 102 Drawing Sheets

(56) References Cited

U.S. PATENT DOCUMENTS

| | | |
|---|---|---|
| 4,719,538 A | 1/1988 | Cox |
| 5,144,843 A | 9/1992 | Tamura et al. |
| 5,317,921 A | 6/1994 | Kremidas |
| 6,109,113 A | 8/2000 | Chavan et al. |
| 6,181,520 B1 | 1/2001 | Fukuda |
| 6,381,100 B1 | 4/2002 | Bennin et al. |
| 6,431,005 B1 | 8/2002 | Delaye |
| 7,096,748 B2 | 8/2006 | Kutlu |
| 7,384,531 B1 | 6/2008 | Peltoma et al. |
| 7,388,733 B2 | 6/2008 | Swanson et al. |
| 7,518,830 B1 | 4/2009 | Panchal et al. |
| 7,591,185 B1 | 9/2009 | Mothilal et al. |
| 7,886,608 B2 * | 2/2011 | Mothilal ............ A61N 1/056 607/116 |
| 7,929,252 B1 | 4/2011 | Hentges et al. |
| 8,048,063 B2 | 11/2011 | Aeby et al. |
| 8,107,248 B2 | 1/2012 | Shin et al. |
| 8,144,430 B2 | 3/2012 | Hentges et al. |
| 8,169,746 B1 | 5/2012 | Rice et al. |
| 8,250,926 B2 | 8/2012 | Yang et al. |
| 8,380,276 B2 | 2/2013 | Schultz |
| 8,424,388 B2 * | 4/2013 | Mattes ............ A61B 5/0215 73/718 |
| 8,885,299 B1 | 11/2014 | Bennin et al. |
| 8,941,951 B2 | 1/2015 | Bennin et al. |
| 9,241,227 B2 * | 1/2016 | Yamkovoy ........... G01D 5/2417 |
| 9,532,445 B2 | 12/2016 | Tanabe |
| 10,337,849 B2 * | 7/2019 | Otaka ............ G01B 7/16 |
| 11,243,127 B2 | 2/2022 | Davis et al. |
| 11,867,575 B2 | 1/2024 | Davis et al. |
| 2002/0193674 A1 | 12/2002 | Fleischman et al. |
| 2002/0194919 A1 | 12/2002 | Lee et al. |
| 2003/0019299 A1 | 1/2003 | Horie et al. |
| 2007/0027638 A1 | 2/2007 | Fernald et al. |
| 2009/0108382 A1 | 4/2009 | Eriksen et al. |
| 2009/0308169 A1 | 12/2009 | Mothilal et al. |
| 2014/0069198 A1 | 3/2014 | Barron et al. |
| 2014/0103096 A1 | 4/2014 | Zhang et al. |
| 2014/0339657 A1 | 11/2014 | Grosh et al. |

FOREIGN PATENT DOCUMENTS

| | | | |
|---|---|---|---|
| CN | 103730390 A | | 4/2014 |
| CN | 105181187 A | | 12/2015 |
| CN | 108593187 A | | 9/2018 |
| JP | 56-11312 A | | 2/1981 |
| JP | 3-42542 A | | 2/1991 |
| JP | 4-106442 A | | 4/1992 |
| JP | 4-204339 A | | 7/1992 |
| JP | 4-289423 A | | 10/1992 |
| JP | 8-271323 A | | 10/1996 |
| JP | 9-503864 A | | 4/1997 |
| JP | 9-257618 A | | 10/1997 |
| JP | 2724419 B2 * | | 3/1998 |
| JP | 10-239179 A | | 9/1998 |
| JP | 2000-22172 A | | 1/2000 |
| JP | 2000-121472 A | | 4/2000 |
| JP | 2001-174353 A | | 6/2001 |
| JP | 2003-322577 A | | 11/2003 |
| JP | 2006211414 A * | | 8/2006 |
| JP | 2006287314 A * | | 10/2006 ........... B06B 1/0611 |
| JP | 2007-64786 A | | 3/2007 |
| JP | 2007336504 A * | | 12/2007 |
| JP | 2012-145497 A | | 8/2012 |
| JP | 2015-219044 A | | 12/2015 |
| JP | 2018022225 A * | | 2/2018 ............ G01L 1/146 |
| WO | WO 95/10021 A1 | | 4/1995 |

OTHER PUBLICATIONS

Ha et al., "Polymer-Based Miniature Flexible Capacitive Pressure Sensor for Intraocular Pressure (IOP) Monitoring Inside a Mouse Eye", Biomedical Microdevices, vol. 14, Issue 1, pp. 207-215, Feb. 2012.

International Search Report and Written Opinion in International Application No. PCT/US2017/016497, mailed Jun. 6, 2017.

International Preliminary Report on Patentability in International Application No. PCT/US2017/016497, mailed Aug. 16, 2018.

Partial Supplemental Search Report for European Patent Application No. 17748271.8, dated Sep. 18, 2019.

Extended Search Report for European Patent Application No. 17748271.8, dated Dec. 19, 2019.

Examination Report in European Patent Application No. 17748271.8, dated Apr. 20, 2023.

Office Action in Chinese Application No. 201780019648.5, dated Feb. 2, 2021.

Office Action in Chinese Application No. 201780019648.5, dated Nov. 23, 2021.

Office Action in Chinese Application No. 201780019648.5, dated May 17, 2022.

Decision of Rejection in Chinese Application No. 201780019648.5, dated Nov. 11, 2022.

Notice of Granting Patent Right for Invention in Chinese Application No. 201780019648.5, dated Jul. 18, 2023.

Notice of Reasons for Refusal in Japanese Application No. 2018-540839, dated Dec. 1, 2020.

Notice of Decision of Refusal in Japanese Application No. 2018-540839, dated Jul. 13, 2021.

Notice of Reasons for Refusal in Japanese Application No. 2021-185094, dated Jan. 17, 2023.

Notice of Decision of Refusal in Japanese Application No. 2021-185094, dated Jul. 18, 2023.

Decision of Dismissal of Amendment in Japanese Application No. 2021-185094, dated Jul. 18, 2023.

Notice of Decision to Grant in Japanese Application No. 2021-185094, dated Jan. 9, 2024.

Office Action in U.S. Appl. No. 15/424,282, mailed Jul. 31, 2018.

Office Action in U.S. Appl. No. 15/424,282, mailed May 15, 2019.

Office Action in U.S. Appl. No. 15/424,282, mailed Dec. 23, 2019.

Office Action in U.S. Appl. No. 15/424,282, mailed May 14, 2020.

Office Action in U.S. Appl. No. 15/424,282, mailed Jan. 25, 2021.

Notice of Allowance in U.S. Appl. No. 15/424,282, mailed Sep. 29, 2021.

Office Action in U.S. Appl. No. 17/587,865, mailed Oct. 5, 2022.

Office Action in U.S. Appl. No. 17/587,865, mailed Mar. 1, 2023.

Notice of Allowance in U.S. Appl. No. 17/587,865, mailed Aug. 29, 2023.

Examination Report in European Patent Application No. 17748271.8, dated Mar. 28, 2024.

* cited by examiner

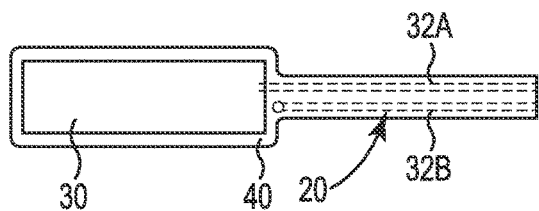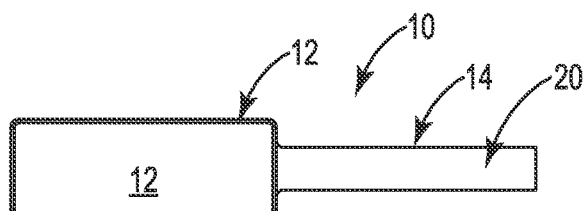
Fig. 1A
Fig. 1B
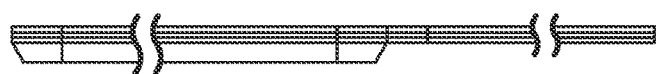
Fig. 1C
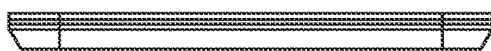 
Fig. 1D
Fig. 1E
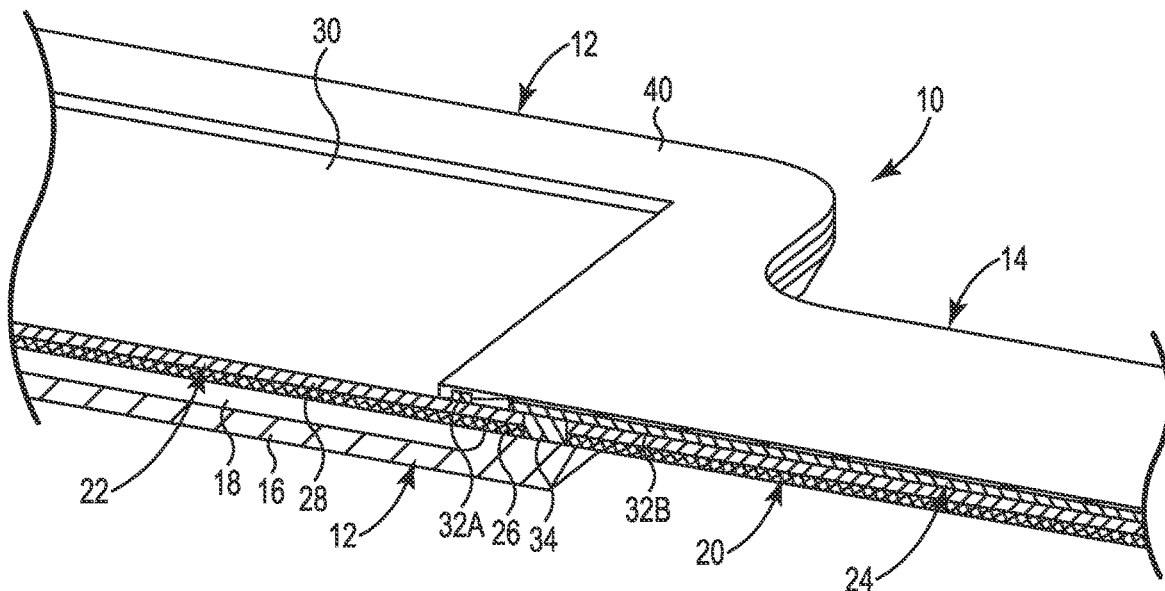
Fig. 1F

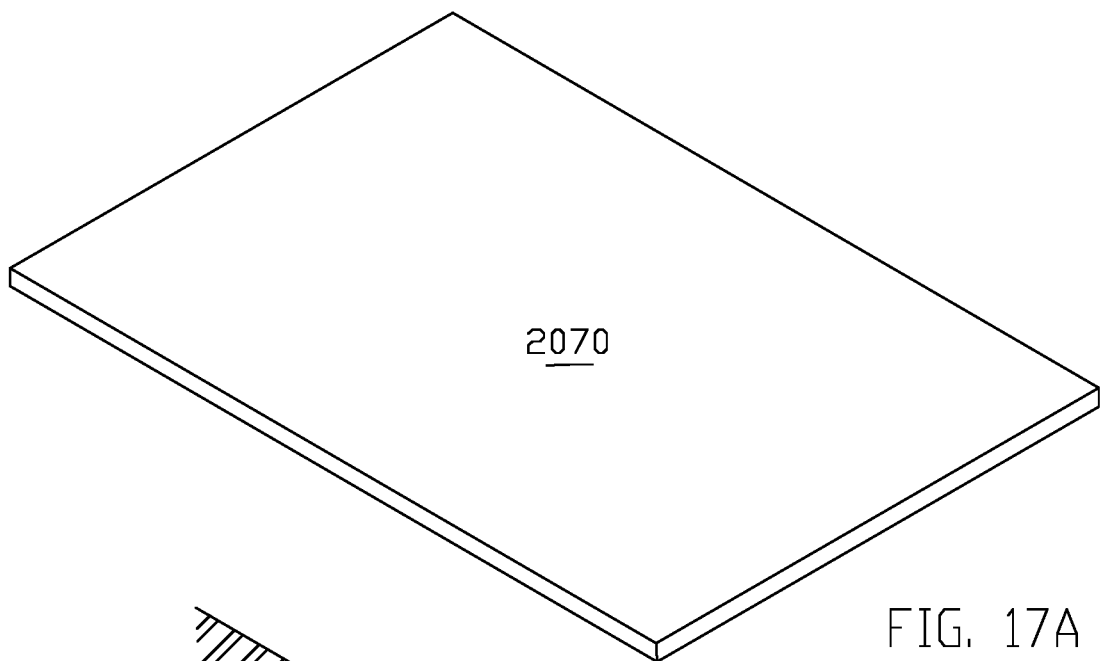
FIG. 17A
FIG. 17B
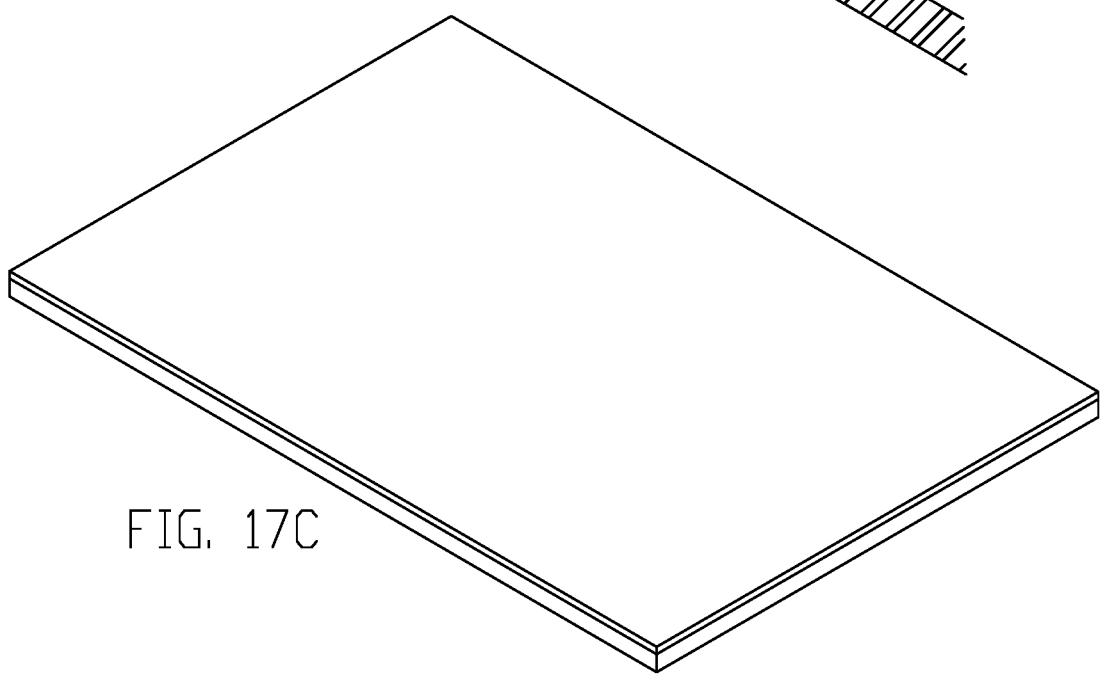
FIG. 17C

2082

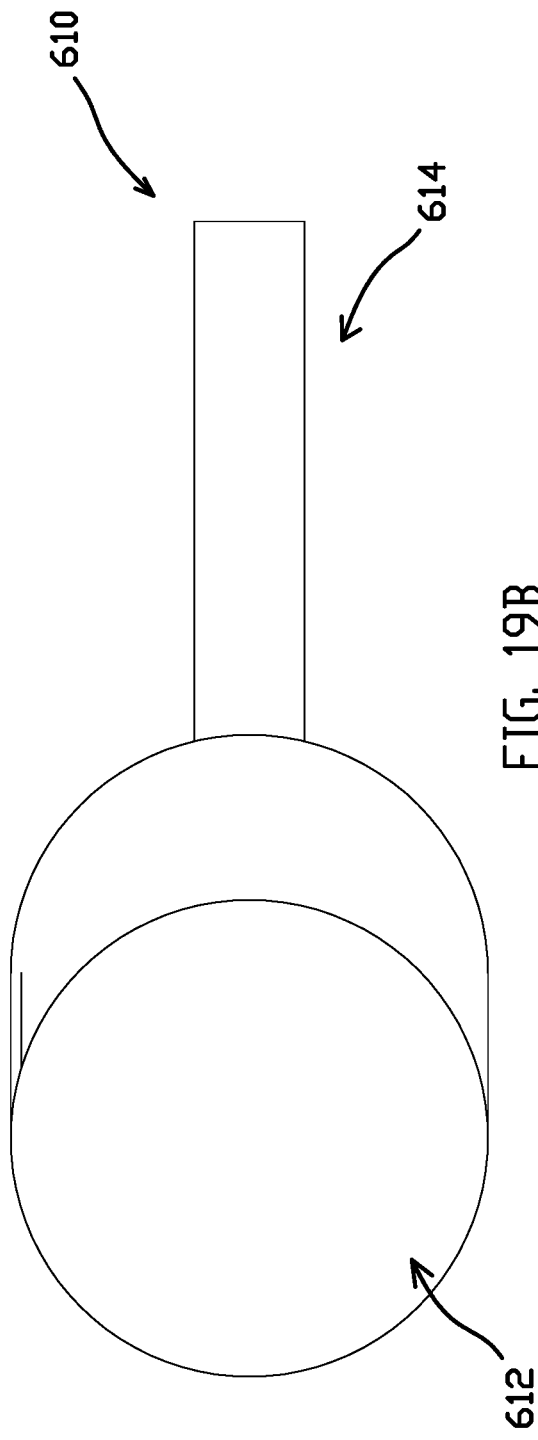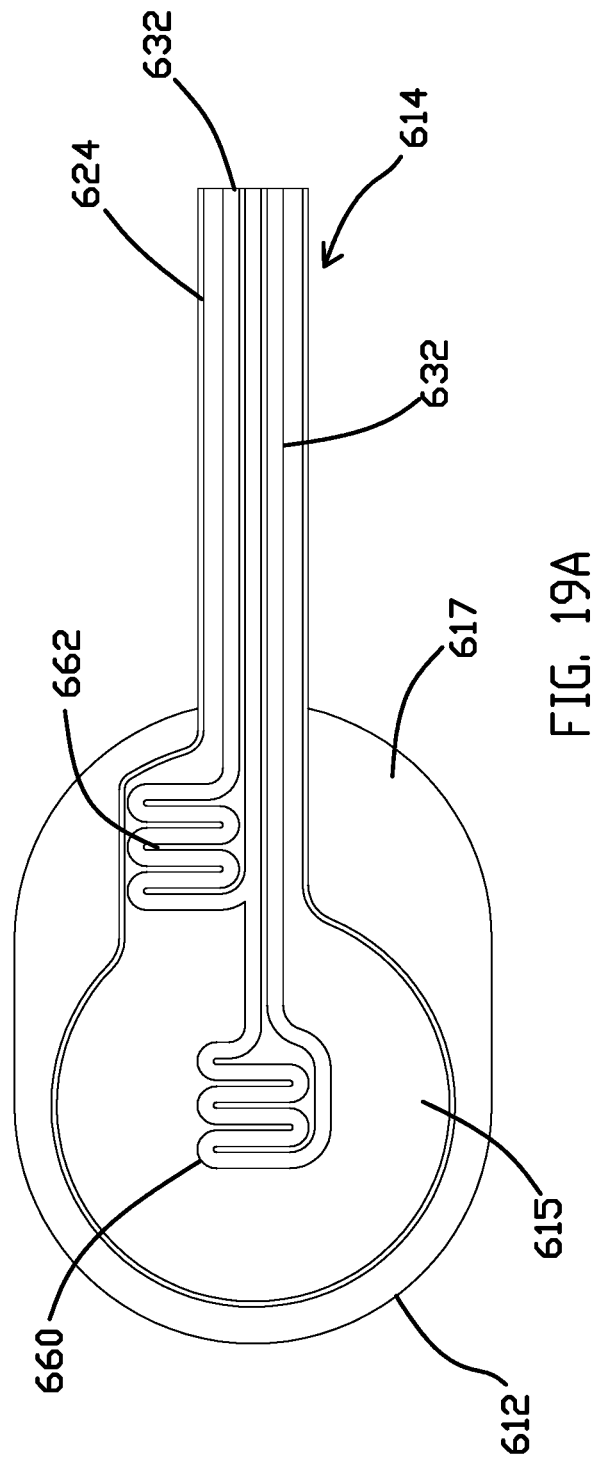
FIG. 19B
FIG. 19A

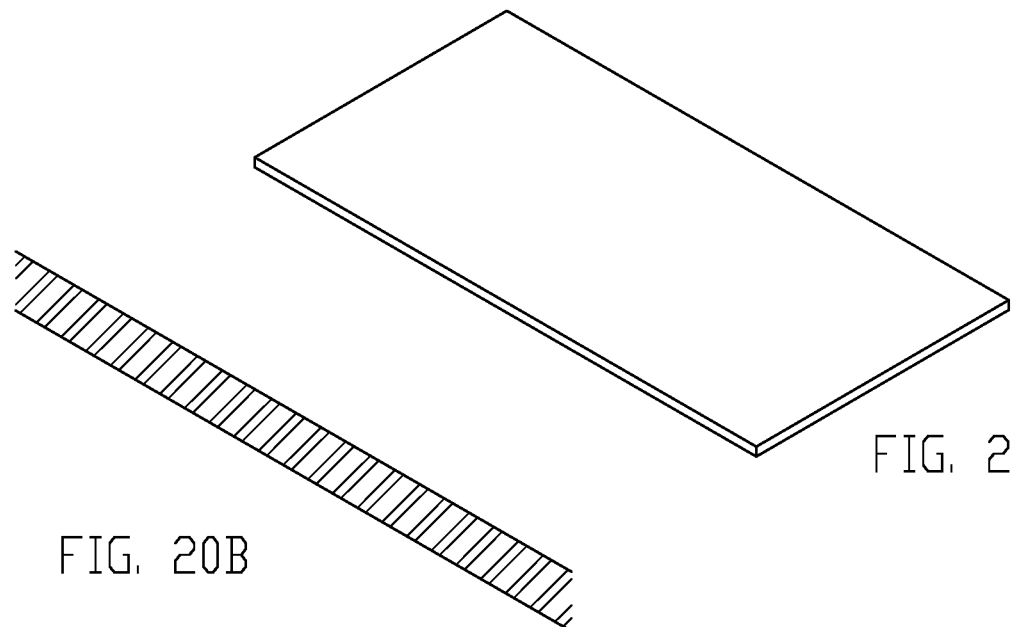
FIG. 20A
FIG. 20B
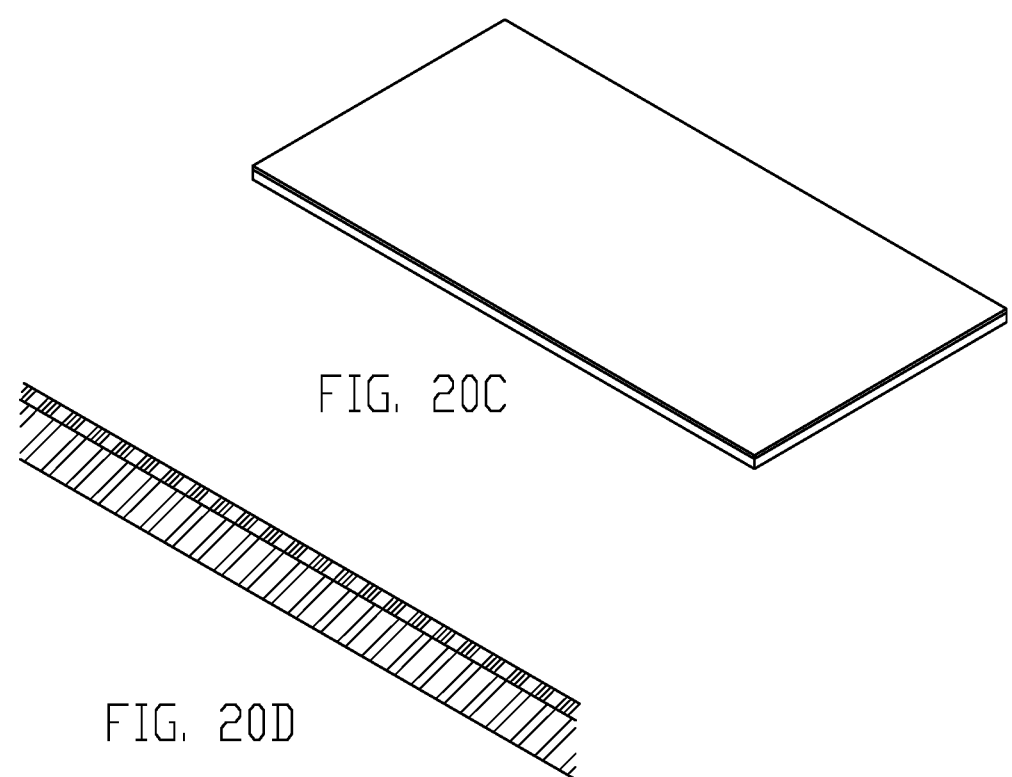
FIG. 20C
FIG. 20D

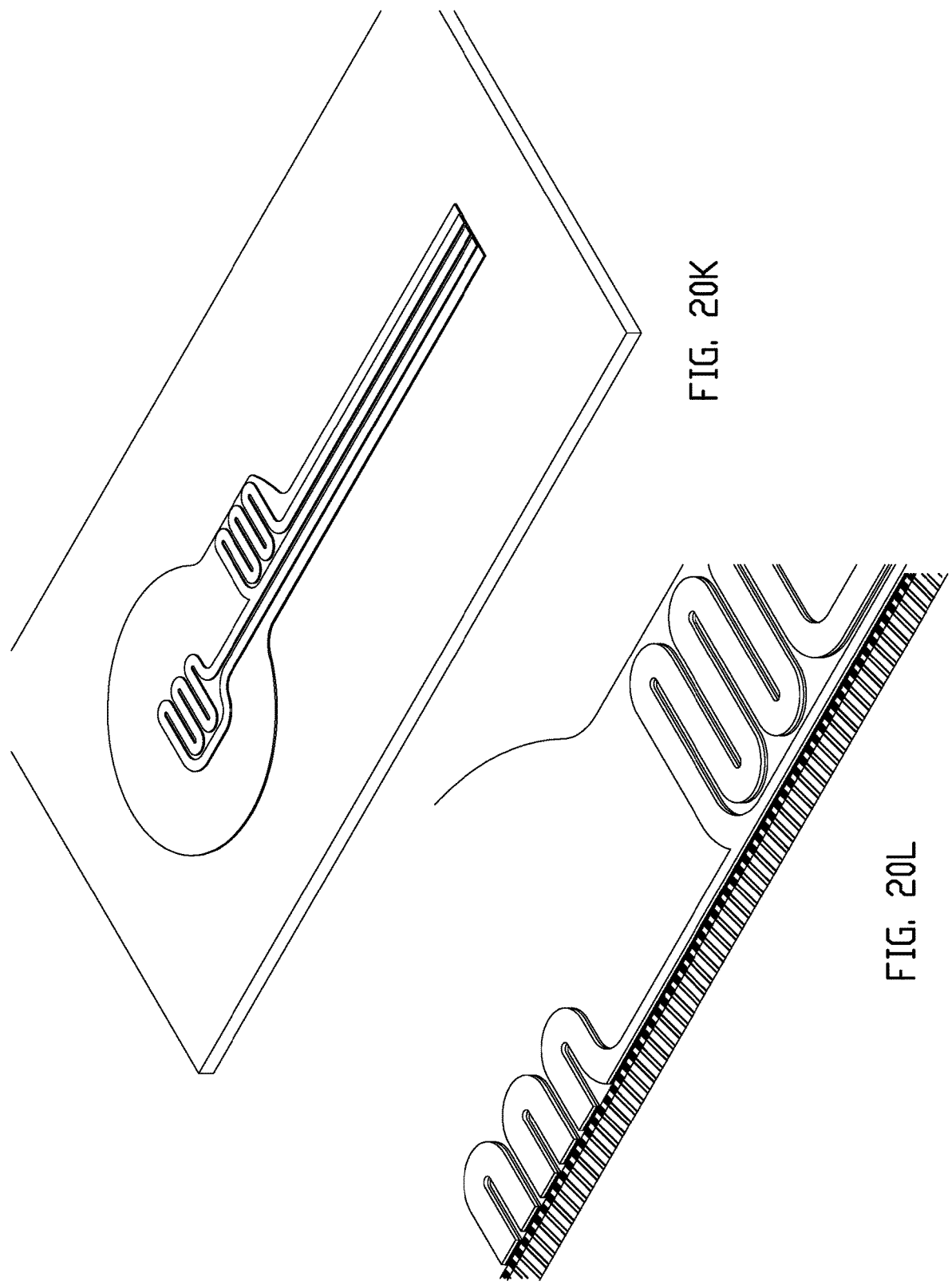

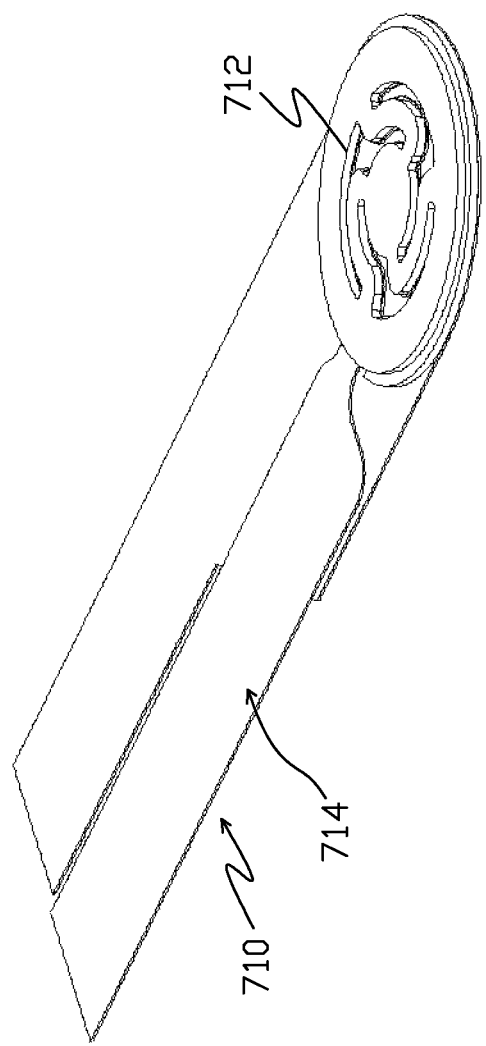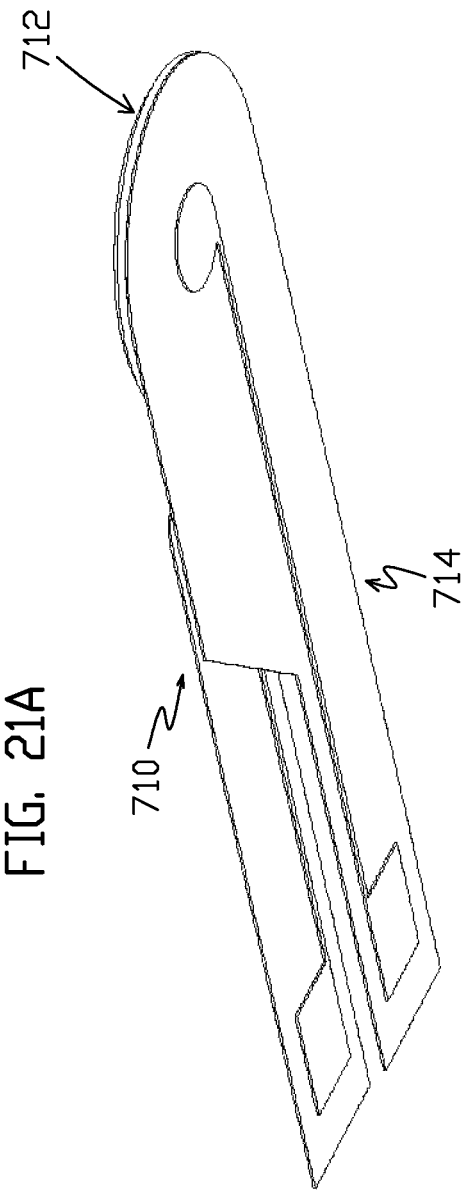
FIG. 21A
FIG. 21B

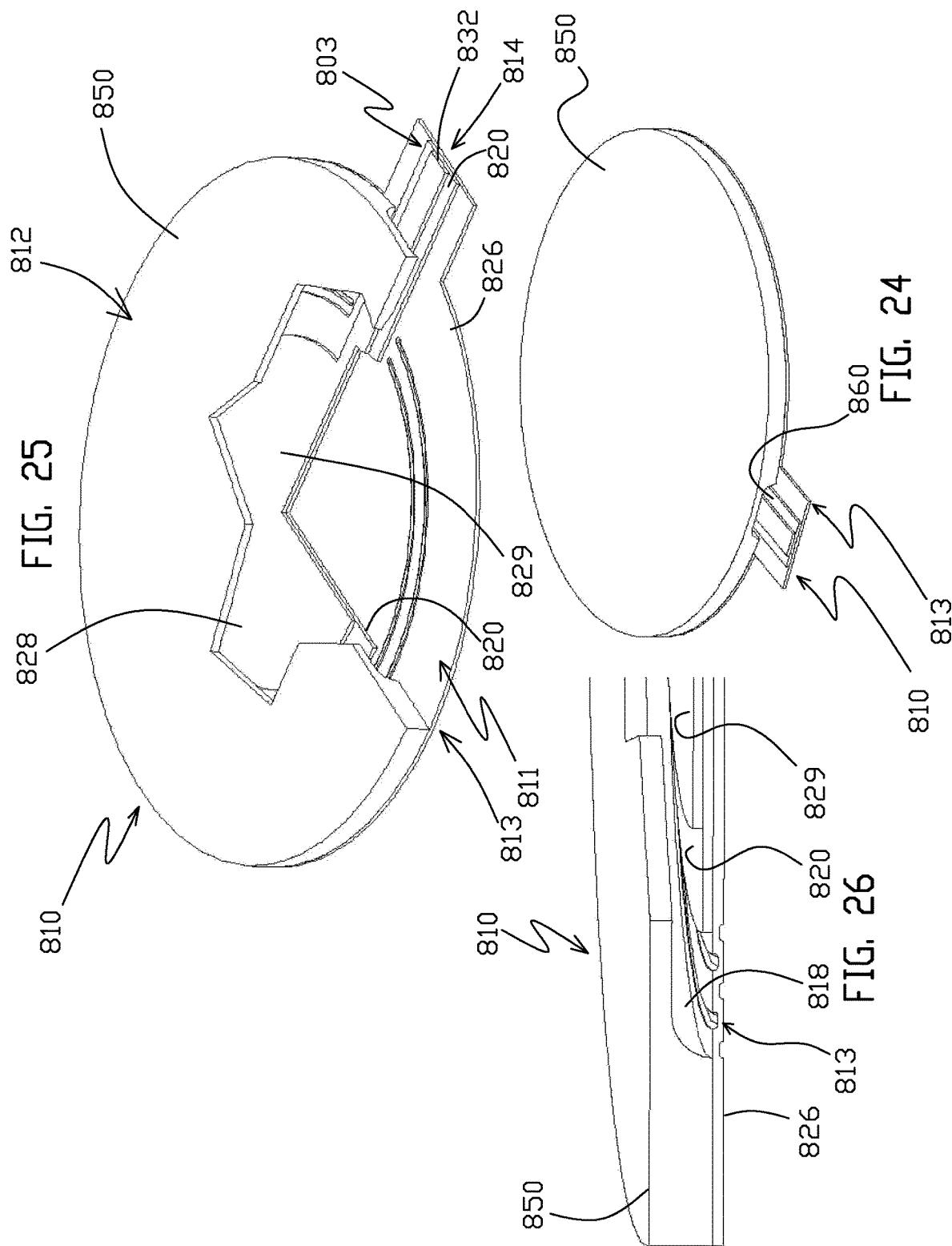

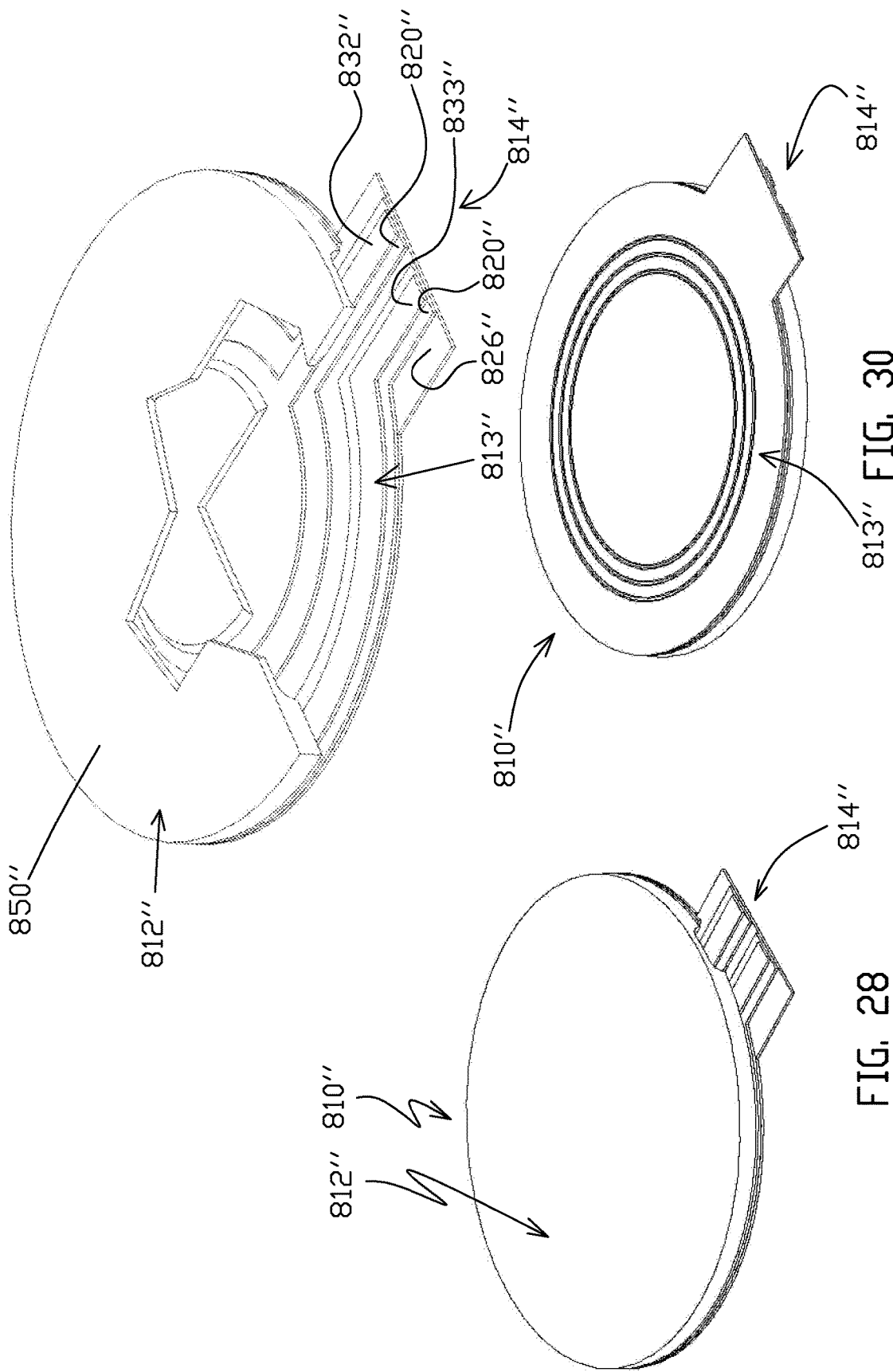

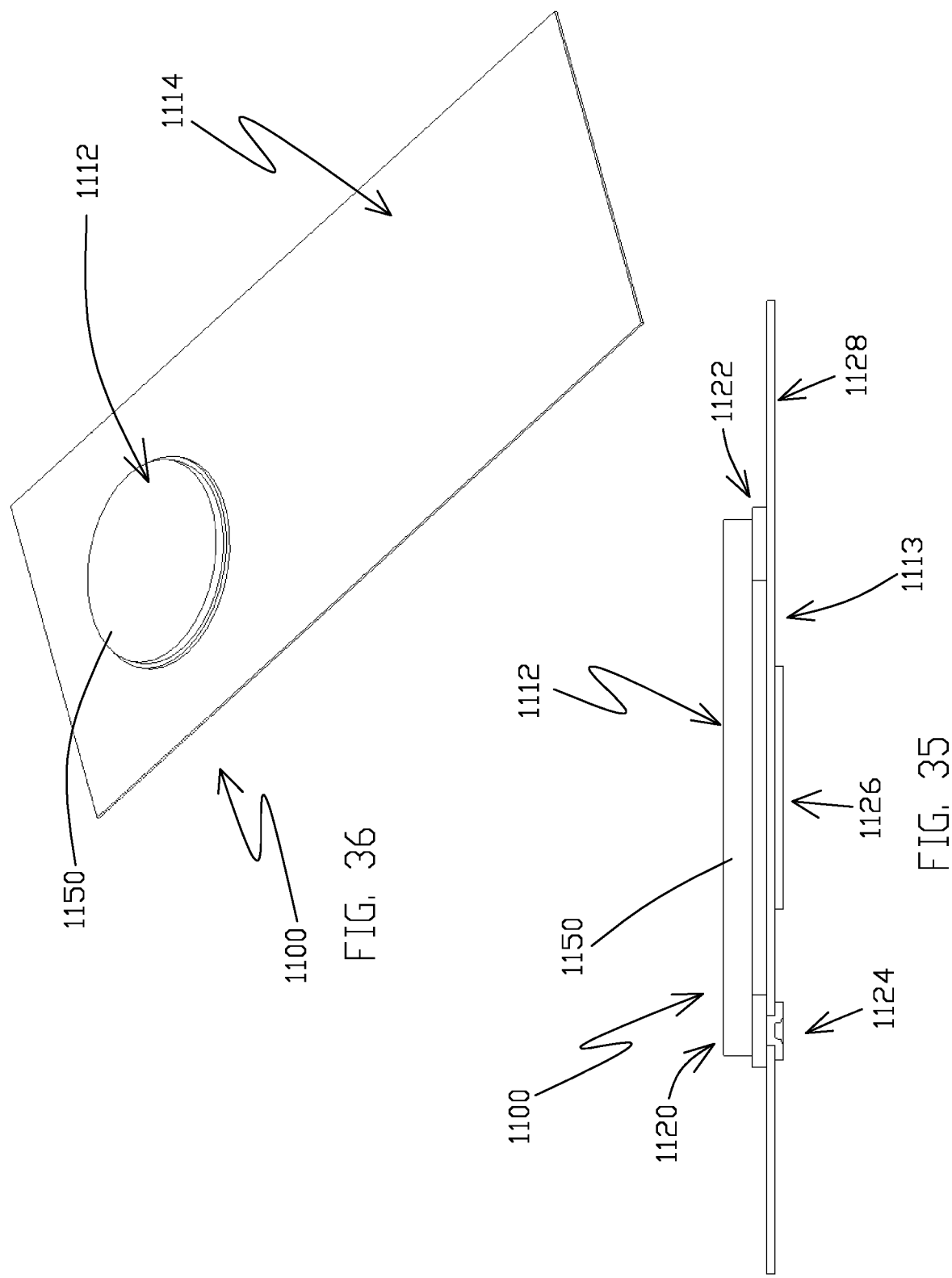

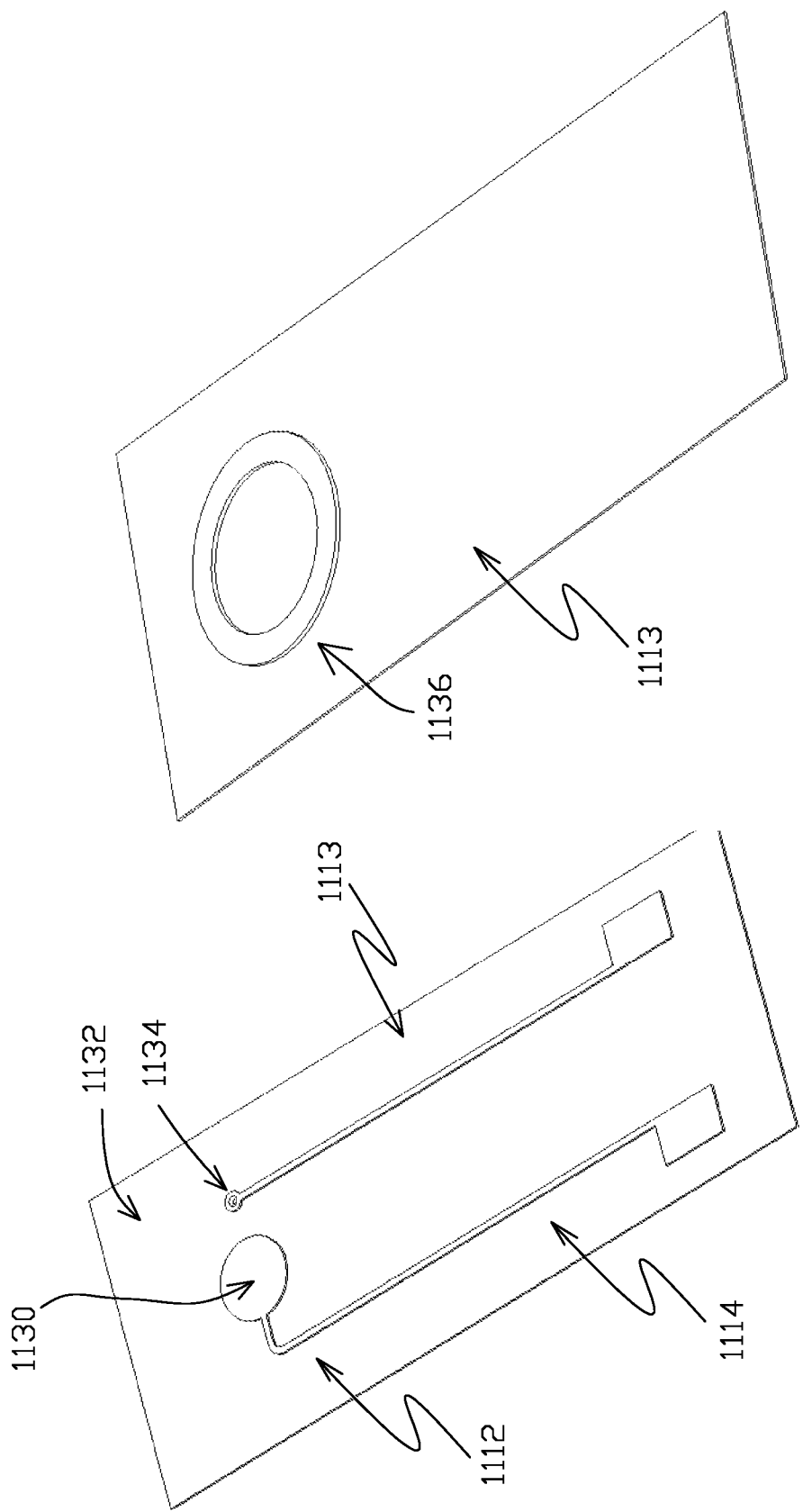

MINIATURE PRESSURE/FORCE SENSOR WITH INTEGRATED LEADS

REFERENCE TO RELATED APPLICATIONS

This application is a continuation of U.S. application Ser. No. 17/587,865, filed Jan. 28, 2022, which is a divisional of U.S. application Ser. No. 15/424,282, filed Feb. 3, 2017, which claims the benefit of the following U.S. Provisional applications, both of which are incorporated herein by reference in their entireties and for all purposes: Ser. No. 62/290,789 filed on Feb. 3, 2016 and entitled Miniature Pressure/Force Sensor with Integrated Leads; and Ser. No. 62/403,765 filed on Oct. 4, 2016 and entitled Miniature Pressure/Force Sensor with Integrated Leads-Additional Embodiments.

FIELD OF THE INVENTION

The invention relates generally to pressure/force sensors having integrated leads, and subtractive, additive and/or semi-additive processes for manufacturing the sensors.

BACKGROUND

Pressure and force sensors (e.g., capacitive-type and strain gauge-type) are known and used in a wide range of applications. There remains, however, a continuing need for improved pressure and force sensors. Advantageous features of such improved sensors can include the ability to use manufacturing processes that enable the efficient and high volume manufacture of the sensors, robust design space capabilities enabling sensors operable over a wide range of pressures and forces, thermal and moisture stability, small size and suitability to a range of applications.

SUMMARY

One embodiment of the invention is a capacitive-type pressure/force sensor including: a diaphragm structure including first and second electrodes; a lead structure integrally formed with at least a portion of the diaphragm structure and extending from the diaphragm structure, the lead structure including first and second traces electrically coupled to the first and second electrodes, respectively; and wherein at least portions of both the diaphragm structure and the lead structure include: a layer (optionally a common layer) of insulating polymer; a conductor layer (optionally a common layer) on layer of insulating polymer, including the first and second traces. In embodiments, the diaphragm structure includes: a void region; and a portion of the insulating polymer extending over the void region, and wherein one of the electrodes is on the portion of the insulating polymer extending over the void region. In embodiments, the electrode on the insulating polymer includes a sputtered conductor layer. In embodiments, the first and second traces include the sputtered conductor layer; and the conductor layer including the first and second traces includes a plated layer on the sputtered conductor layer. In embodiments, the diaphragm structure and optionally at least portions of the lead structure further includes a base, and wherein the base defines the void region and the portion of the insulating polymer extending over the void region extends over at least portions of the base. In embodiments, the base includes (and optionally consists of) metal such as stainless steel. In embodiments, the base includes a partial etched pocket defining the void region. In embodiments, the sputtered conductor layer and the traces are on a side of the insulating polymer layer opposite the base. Embodiments further include at least one conductive via, the via electrically connecting one of the traces to one of the electrodes through the insulating polymer. In embodiments, one of the electrodes includes the metal base, and the via electrically connects one of the traces to the metal base. Embodiments further include a layer of adhesive securing the insulating polymer to the base.

Another embodiment of the invention is a capacitive type pressure/force sensor, including: a diaphragm structure, including: a base member defining a void region; a first diaphragm portion insulating polymer layer on the base member, and optionally on a first side of the base member, and extending across a first side of the void region; a first sputtered conductor layer including an electrode on the first diaphragm portion insulting polymer layer and over the void region; a second diaphragm portion insulating polymer layer on the base member, and optionally on a second side of the base member, extending across a second side of the void region; and a second sputtered conductor layer including an electrode on the second diaphragm portion insulating polymer layer and over the void region; and a lead structure integrally formed with the diaphragm structure and extending from the diaphragm structure, the lead structure including: a lead portion insulating polymer layer (that is optionally common with the first diaphragm portion insulating polymer layer); and first and second traces on the lead portion insulating polymer layer, wherein the first and second traces are electrically coupled to the first and second electrodes, respectively. In embodiments, the first sputtered conductor layer and the first trace are on a first side of the lead portion and first diaphragm portion insulating polymer layer, opposite the common insulating polymer layer from the first void region and the base member. In embodiments, the first and second traces include the first sputtered conductor layer. In embodiments, the base member includes (and optionally consists of) conductive metal such as stainless steel; the second sputtered conductor layer is on a first side of the second diaphragm portion insulating polymer layer and extends over a portion of the conductive metal base member; and the sensor further includes a conductive via electrically connecting the second trace to the conductive metal base member through the insulating polymer layer. In embodiments, the metal base member includes: first and second sections; and a securing structure, optionally one or more welds or adhesive, to mechanically (and optionally electrically) join the first and second sections.

Another embodiment of the invention is a capacitive type pressure/force sensor, including: a diaphragm structure including: a base section (that optionally includes or optionally consists of metal such as stainless steel); a diaphragm insulating polymer layer on at least a portion of the base section; a first conductive electrode on the diaphragm insulating polymer layer; a conductive diaphragm electrode, optionally stainless steel; an adhesive insulating polymer layer joining the conductive diaphragm electrode to the base section; and a void region between the first conductive electrode and the conductive diaphragm electrode; and a lead structure integrally formed with the diaphragm structure, including: a lead insulating polymer layer that is optionally common with the diaphragm insulating polymer layer; and first and second traces on the lead insulating polymer layer, wherein the first and second traces are electrically connected to the first conductive electrode and the conductive diaphragm electrode, respectively. Embodiments further include a conductive via electrically connecting the second trace to the conductive diaphragm electrode through the adhesive insulating polymer layer. Embodiments further include a polymer covercoat over the first and second traces and optionally any and all other portions of the sensor. Embodiments further include an encapsulating coating, optionally one or more of Ti/SiO$_2$, or non-hygroscopic polymer, over at least the diaphragm structure.

Another embodiment of the invention is a strain gauge-type pressure/force sensor including: a diaphragm structure including one or more strain gauges; a lead structure integrally formed with at least a portion of the diaphragm structure and extending from the diaphragm structure, the lead structure including first and second and optionally more traces electrically coupled to the one or more strain gauges; and wherein at least portions of both the diaphragm structure and the lead structure include: a layer (optionally a common layer) of insulating polymer; a conductor layer (optionally a common layer) on layer of insulating polymer, including the first and second traces.

Other embodiments include additive, semi-additive and/or subtractive methods for manufacturing the sensors.

Another embodiment comprises a method for manufacturing the sensors, including: commonly forming the insulating polymer layer of the diaphragm structure and the lead structure; forming the first and second traces on the common insulating polymer layer; and laminating the common polymer layer having the first and second traces thereon to a component of the diaphragm structure or a layer of material from which the component of the diaphragm structure is formed (i.e., forming the traces before laminating the polymer layer to the diaphragm structure). In embodiments, forming the first and second traces includes: sputtering a seed layer on the insulating polymer layer; and plating conductive metal on the seed layer. Embodiments further include: forming the electrode or strain gauge on the common insulating polymer layer; and laminating the common polymer layer having the first and second traces and the electrode or strain gauge thereon to a component of the diaphragm structure or a layer of material from which the component of the diaphragm structure is formed (i.e., forming the traces and electrode or strain gauge before laminating the polymer layer to the diaphragm structure).

Another embodiment comprises a method for manufacturing the sensors, including: forming a component of the diaphragm structure or providing a layer of material from which the component of the diaphragm structure is formed; laminating common polymer layer without the first and second traces to the component of the diaphragm structure or a layer of material from which the component of the diaphragm structure is formed; forming the first and second traces on the common polymer layer after the laminating step. In embodiments, forming the first and second traces includes: sputtering a seed layer on the insulating polymer layer; and plating conductive metal on the seed layer. Embodiments further include: forming an electrode on the common insulating polymer layer; and laminating the common polymer layer having the first and second traces and the electrode thereon to a component of the diaphragm structure or a layer of material from which the component of the diaphragm structure is formed after the laminating step.

Another embodiment comprises a capacitive-type pressure/force sensor including a diaphragm structure comprising: a base portion; a moving portion; spring arms connecting the moving portion to the base portion; an electrode on the moving portion; and a trace extending from the electrode. In embodiments, the base portion, moving portion and spring arms are formed from a spring metal layer; the sensor includes an insulating layer on the spring metal layer; and the trace is on the insulating layer. In embodiments, the trace and insulating layer extend along at least one spring arm.

Another embodiment is a capacitive-type pressure/force sensor including one or more trace members comprising a diaphragm portion and a lead portion, wherein each trace member includes: a base layer that is optionally spring metal such as stainless steel; an insulating layer on the base layer; a conductor layer on the insulating layer opposite the base layer; an electrode in the conductor layer of the diaphragm portion; and a trace in the conductor layer extending from the electrode over the lead portion. Embodiments comprise a sensor including a two trace members of the type recited immediately above, wherein the base electrodes of the trace members face one another in the diaphragm portion. In embodiments, the base layers are connected (e.g., at their peripheries). Embodiments further include a spacer between the base layers. Embodiments include two trace members of the type recited above, wherein the base layers are connected (e.g., at their peripheries) to define a cavity, and the electrode on one of the trace members is opposite the insulating layer from the cavity (i.e., one electrode is outside of the cavity. Embodiments include a trace member of the type recited above and a can over the electrode at the diaphragm portion to define a cavity. In embodiments, the can is metal, functions as an electrode, and is electrically connected to a metal base of the trace member. In embodiments, the trace member includes a trace that is electrically connected to the can. In embodiments, the diaphragm structure includes: a base portion; a moving portion; and spring arms connecting the moving portion to the base portion. In embodiments, the base portion, moving portion and spring arms are formed from a spring metal layer. Embodiments further include a layer of relatively high dielectric constant and/or elastomeric material on the electrode.

BRIEF DESCRIPTION OF THE DRAWINGS

FIGS. 1A, B, C, D, E and F are top, bottom, side, distal end, proximal end and detailed sectional isometric views of a sensor in accordance with embodiments of the invention.

FIGS. 21A and 21B are isometric views of another sensor having flipped two trace assemblies with welded base members in accordance with embodiments of the invention, with FIG. 21A illustrating a first or upper side of the sensor, and FIG. 21B illustrating an opposite second or lower side of the sensor.

FIG. 24 is an isometric view of an integrated lead and can sensor having a diaphragm structure and integrated lead structure in accordance with other embodiments of the invention.

FIG. 25 is detailed isometric view of the sensor, with portions of the can broken away to expose portions of the trace member within the diaphragm structure.

FIG. 26 is a detailed sectional view of a portion of the diaphragm structure of the sensor.

FIGS. 28-30 are isometric illustrations of another sensor in accordance with embodiments of the invention.

FIGS. 35, 36, 37A, 37B, 38A and 38B illustrate and describe a sensor in accordance with yet additional embodiments of the invention.

DESCRIPTION OF EMBODIMENTS OF THE INVENTION

Figure 2A:
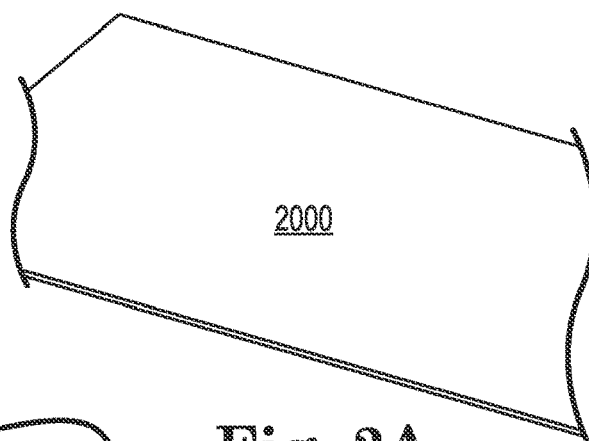
FIGS. 2A-2N illustrate sequences of process steps that can be used to manufacture embodiments of the sensor.

Embodiments of the invention include capacitive-type and strain gauge-type pressure/force sensors having integrated leads. As shown in greater detail in the attached drawing figures, the sensors include a diaphragm structure and the integrated lead structure. In embodiments, at least an insulating polymer layer is common to both the diaphragm and lead structures, and in embodiments the polymer layer and optionally structures such as traces on the polymer layer can be formed by the same process steps at the same times. At least portions of the traces on the lead structures and portions of the electrodes on the diaphragm structures can be formed by the same process steps in embodiments. In other embodiments the polymer layer portions of the diaphragm and lead structures are not common, and can be formed separately (even if adjacent to one another).

The lead structures can be flex structures or flex circuits, and can be formed on base materials including non-metals (e.g., ceramic or other insulating materials) and metals such as stainless steel or other spring metals. The diaphragm structures are also flexible in embodiments. As shown, in embodiments the diaphragm structures include: two polymer (e.g., Kapton) members, one polymer and one metal (e.g., stainless steel) member, or two metal members. Other embodiments include diaphragm structures formed from other materials such as ceramics.

The sensors can be manufactured by conventional additive deposition, semi-additive and/or subtractive processes such as wet (e.g., chemical) and dry (e.g., plasma) etching, electroplating and electroless plating and sputtering processes in connection with photolithography (e.g., use of patterned and/or unpatterned photoresist masks), and lamination processes (e.g., by the application adhesive and/or through the application of pressure and/or heat). Mechanical forming methods (e.g., using punches and forms) can be used. Adhesive and other polymer layers can be coated and cured, or cut from a sheet and laminated, to adjacent layers. Additive and subtractive processes of these types are, for example, known and used in connection with the manufacture of disk drive head suspensions on stainless steel or other bases or substrates (including non-metal bases), and are disclosed generally in the following U.S. patents, all of which are incorporated herein by reference for all purposes: Bennin et al. U.S. Pat. No. 8,885,299 entitled Low Resistance Ground Joints for Dual Stage Actuation Disk Drive Suspensions, Rice et al. U.S. Pat. No. 8,169,746 entitled Integrated Lead Suspension with Multiple Trace Configurations, Hentges et al. U.S. Pat. No. 8,144,430 entitled Multi-Layer Ground Plane Structures for Integrated Lead Suspensions, Hentges et al. U.S. Pat. No. 7,929,252 entitled Multi-Layer Ground Plane Structures for Integrated Lead Suspensions, Swanson et al. U.S. Pat. No. 7,388,733 entitled Method for Making Noble Metal Conductive Leads for Suspension Assemblies, Peltoma et al. U.S. Pat. No. 7,384,531 entitled Plated Ground Features for Integrated Lead Suspensions.

In embodiments, structures such as traces, electrodes and/or strain gauges can be formed on an insulating polymer layer that is common to the diaphragm and lead structures, and the insulating polymer layer can be laminated to other components of the diaphragm structure (or a layer of material from which such other diaphragm components are formed) after those structures (e.g., traces and/or electrodes and/or strain gauges) are formed. In other embodiments, the common insulating polymer layer can be formed on other components of the diaphragm structure (or a layer of material from which such other diaphragm components are formed) before structures such as the traces, strain gauges and/or electrodes are formed on the common insulating polymer layer. The polymer layer and structures (e.g., traces and/or electrodes) thereon can be formed from laminated materials by subtractive processes or by additive processes of the types described above. Via-type electrical connections such as those formed by plating, solder or conductive adhesive can be used to electrically connect the traces to other electrical structures (e.g., electrodes and/or stainless steel structures) through openings in the polymer layers. Other embodiments (not shown) include jumpers that extend over or around an edge of portions of the devices to electrically interconnect structures. Bonding/joining techniques that can be used in addition to those expressly mentioned below includes non-conductive epoxy, conductive epoxy, solder/sintering, laser/resistance welding, crimping/mechanical forming and laser lamination. Although embodiments are described as having stainless steel components for the structural (e.g., base) member, other material and methods such as plastic injection molding polymers and ceramics are used in other embodiments. These materials can be selectively metalized to facilitate fabrication of the capacitor plates and/or conductive routings, or to facilitate other joining techniques.

FIGS. 1A, B, C, D, E and F are top, bottom, side, distal end, proximal end and detailed sectional isometric views of a sensor 10 in accordance with embodiments of the invention. Sensor 10 is a single diaphragm, partial etched cavity device, and can be used to sense relatively low pressures. As shown, the sensor 10 includes a diaphragm structure 12 and an integrated lead structure 14 that extends from the diaphragm structure. Diaphragm structure 12 includes a base 16 having a void region or cavity 18. In embodiments, the base 16 is metal such as stainless steel (SST), and the cavity 18 is a partial etched cavity. In these embodiments, the metal base can function as a first electrode. In other embodiments the base can be formed from other materials such as ceramic materials, and an electrode can be located on the base in the cavity. A flexible and insulating polymer layer 20 includes a diaphragm portion 22 on the base 16 and over cavity 18, and a lead portion 24 on the lead structure 14. The diaphragm portion 22 and lead portion 24 of the polymer layer 20 are common in the illustrated embodiment, and include an adhesive layer 26 (optionally acrylic adhesive) and a dielectric layer 22. A second electrode 30 is located on the diaphragm portion 22 of the polymer layer 20. Leads or traces 32A and 32B extend along the lead portion 24 of the polymer layer 20. Lead 32A is electrically connected to the second electrode 30. Lead 32B is electrically connected to the first electrode (e.g., the base 16 in embodiments shown in FIGS. 1A-F) by a conductive via 34 through the polymer layer 20. In embodiments, the second electrode 30 is a sputtered metal layer, and can be formed during the same process step as a seed layer for the traces 32A and 32B. A polymer or other coating layer 40 can be applied over all or portions of the sensor to encapsulate the device. Traces 32A and 32B can include a plated metal layer on the seed layer. Applications of sensor 10 include, for example, bodily fluid pressure, blood, intraocular and neural sensing. The area of the first and/or second electrodes and/or cavity 18 and other features of the sensor 10 can be adapted to determine the pressure and sensitivity of the device.

Figure 2B:
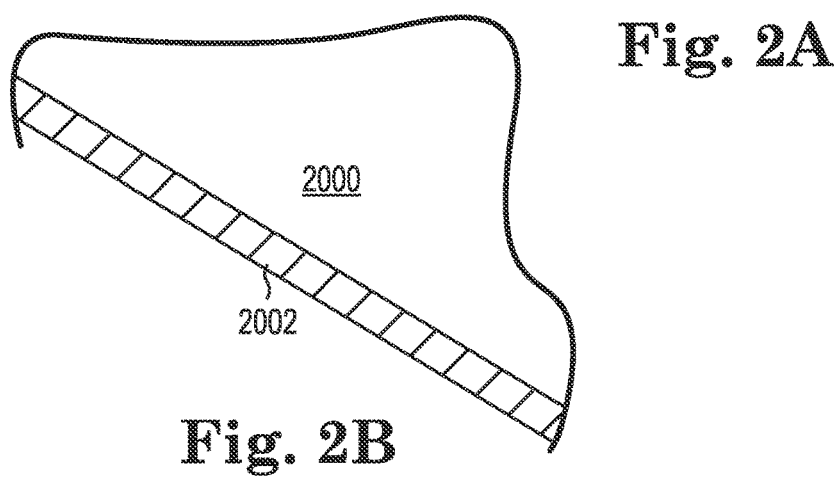
Figure 2C:
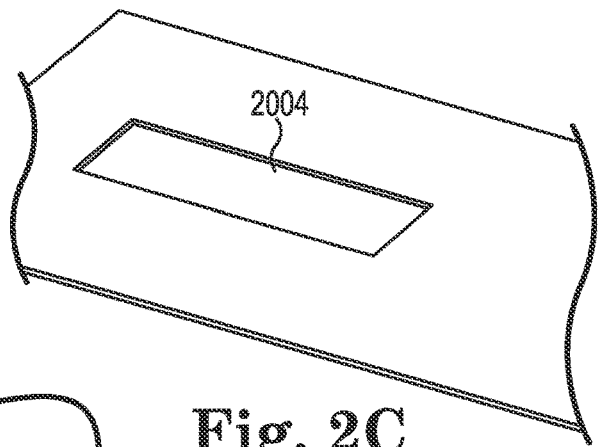
Figure 2D:
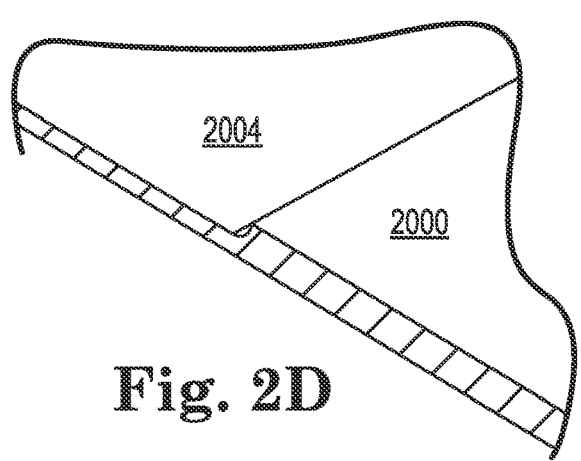
Figure 2E:
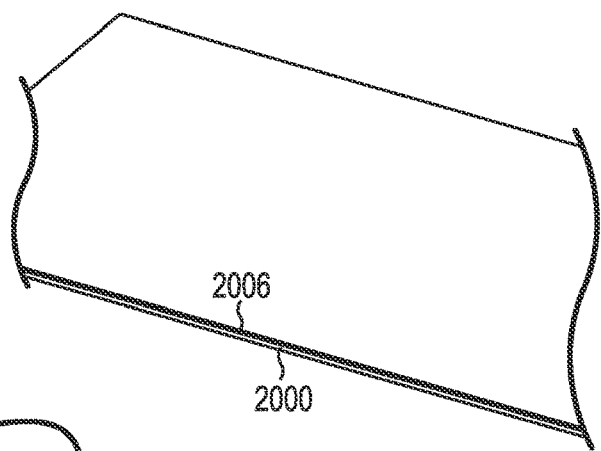
Figure 2F:
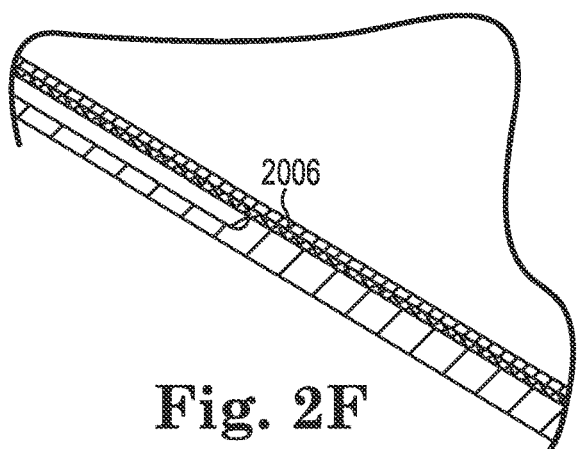
Figure 2G:
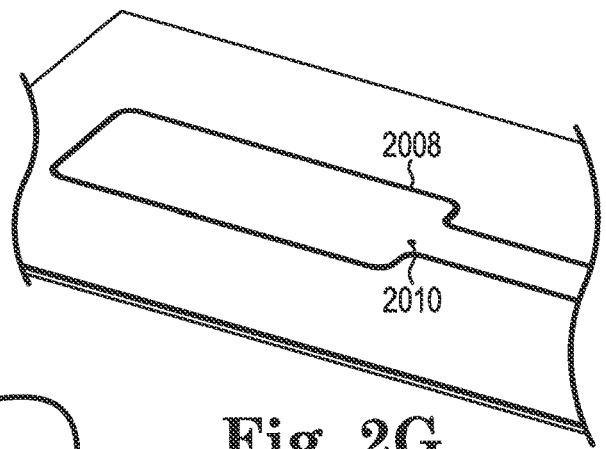
Figure 2H:
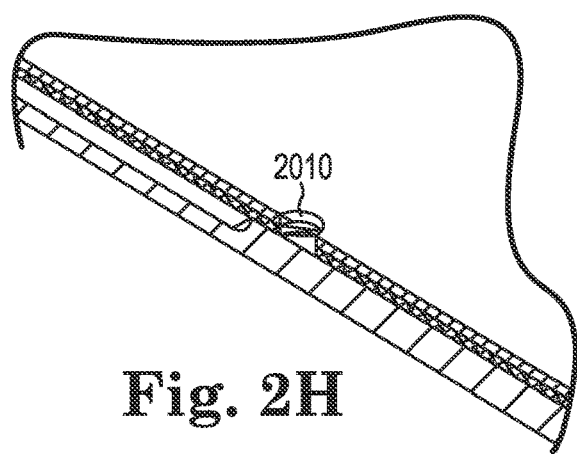
Figure 2I:
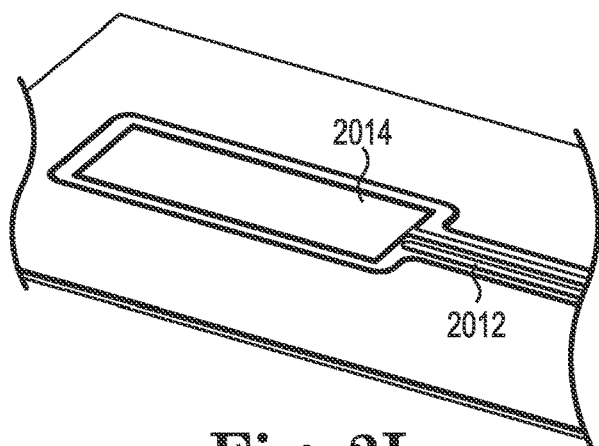
Figure 2J:
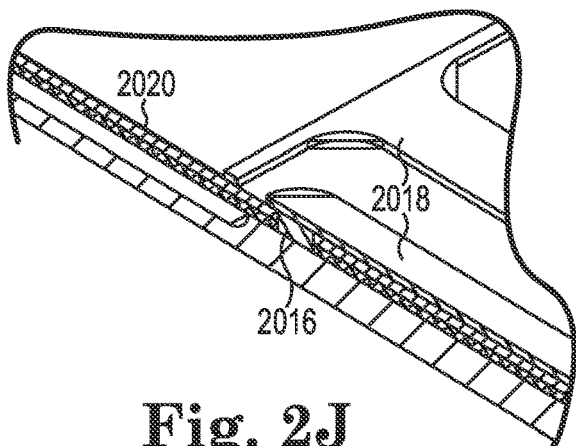
Figure 2K:
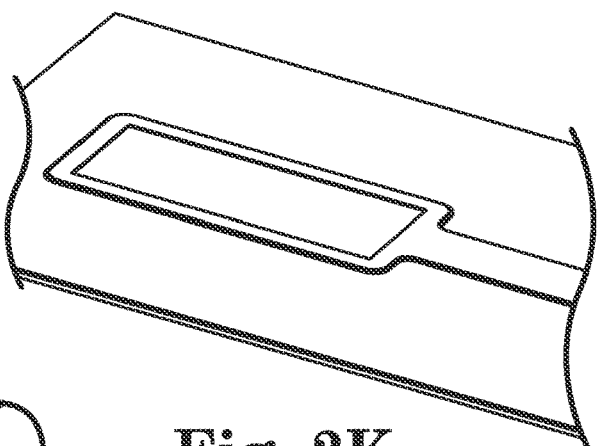
Figure 2L:
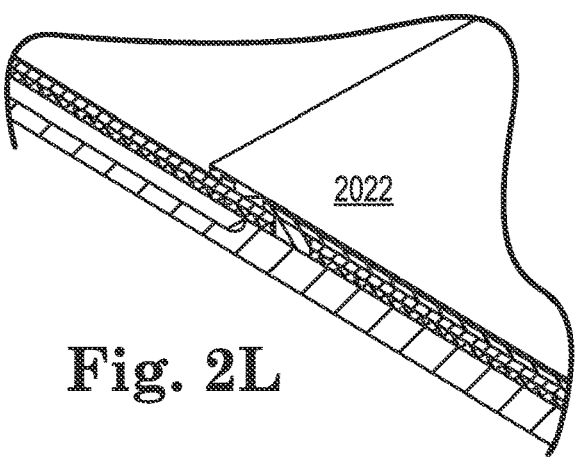
Figure 2M:
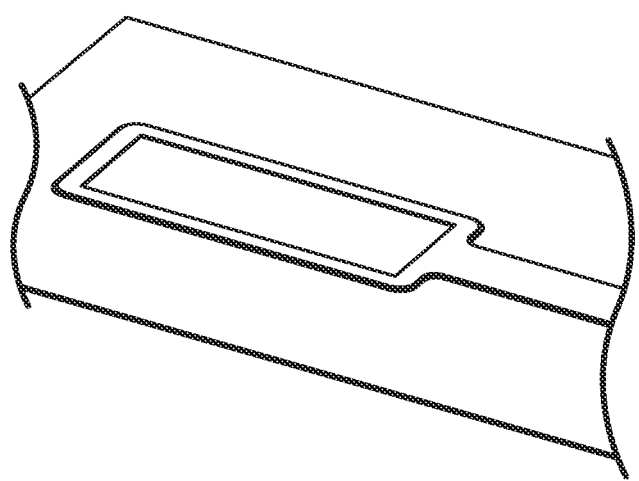
Figure 2N:
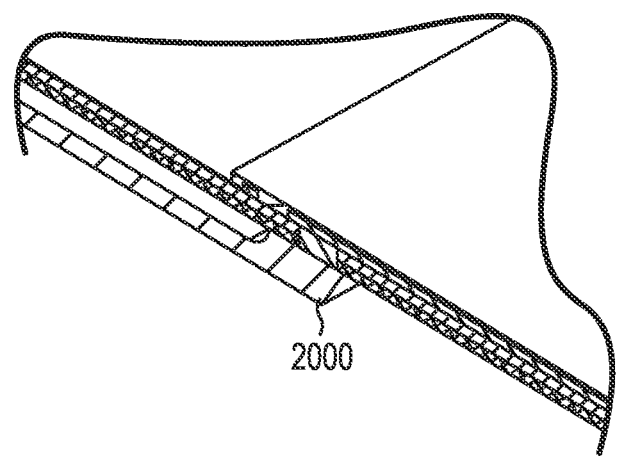
Figure 3A:
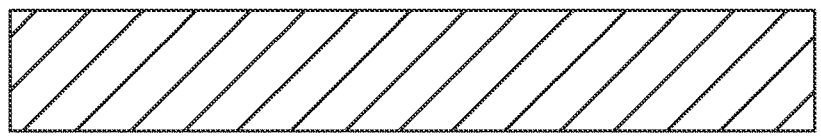
FIGS. 3A-3I illustrate sequences of process steps that can be used to manufacture embodiments of the sensor.
Figure 3B:
Figure 3C:
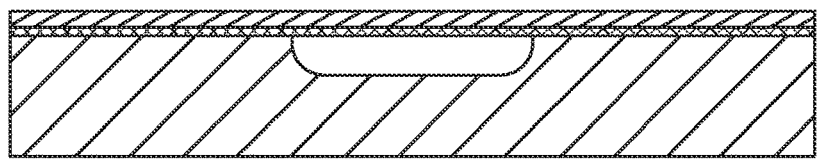
Figure 3D:
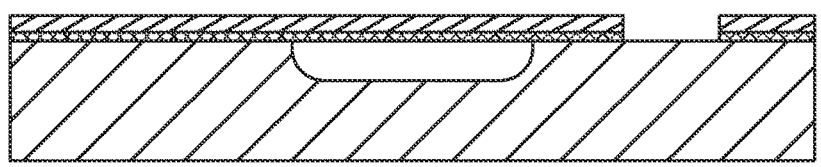
Figure 3E:
Figure 3F:
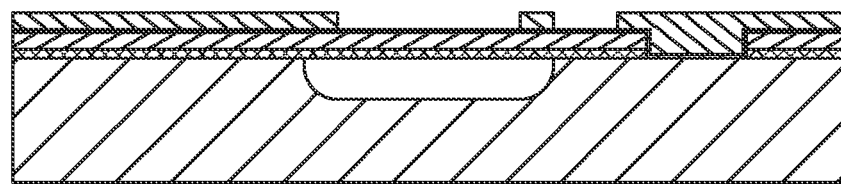
Figure 3G:
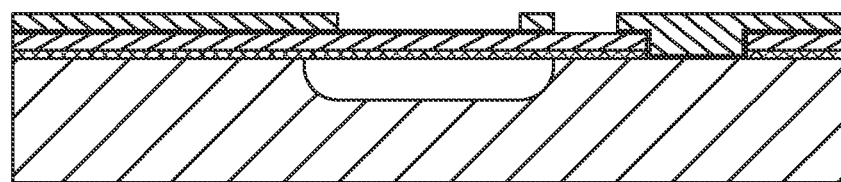
Figure 3H:
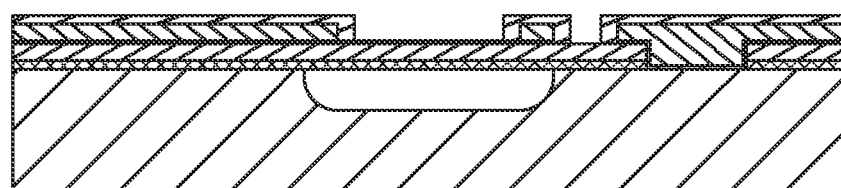
Figure 3I:
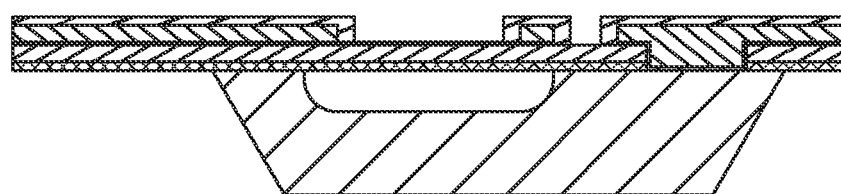

FIGS. 2A-2N and FIGS. 3A-3I illustrate sequences of process steps that can be used to manufacture embodiments of sensor 10. In particular, FIG. 2A shows a stainless steel (SST) layer 2000. FIG. 2B shows a stainless steel layer 2000 and an edge 2002 of the layer. FIG. 2C shows an etched cavity 2004 in the stainless steel layer 2000. FIG. 2D is a detailed illustration of the stainless steel layer 2000 and etched cavity 2004. FIG. 2E illustrates a polymer layer 2006 applied to the stainless steel layer 2000. FIG. 2F illustrates the polymer layer 2006 (including an adhesive layer) on the etched stainless steel layer 2000. FIG. 2G illustrates an etched perimeter/boundary 2008 and formed via opening 2010. FIG. 2H is a detailed illustration showing the via opening 2010. FIG. 2I shows plated traces 2012 and optionally electrode. A via contact can be formed on the structure shown in FIG. 2I. FIG. 2I also shows sputtered seed layer 2014 for electrodes and traces. FIG. 2J shows via contact (plated) 2016, plated traces 2018 and seed layer 2020. FIG. 2K shows an applied covercoat and/or encapsulant. FIG. 2L shows a structure having covercoat/encapsulant 2022. FIG. 2N shows the stainless steel layer 2000 and etching/forming the stainless steel base. FIG. 3A shows the stainless steel base layer. FIG. 3B shows the stainless steel cavity partial etch. FIG. 3C shows the laminated dielectric/adhesive. FIG. 3D shows the laser cut via to stainless steel. FIG. 3E shows the sputtered seed layer. FIG. 3F shows the plated conductor traces. FIG. 3G shows the etched seed layer. FIG. 3H shows a coated/etched dielectric covercoat. FIG. 3I shows the etched base stainless steel.

Figure 4A:
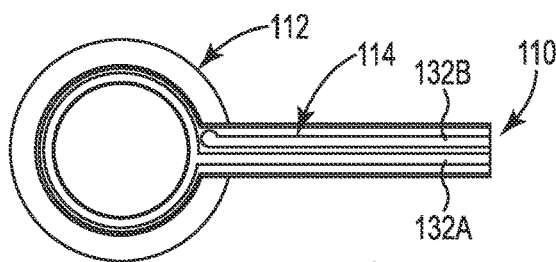
FIGS. 4A, B, C, D, E and F are top, bottom, side, distal end, proximal end and detailed sectional isometric views of another sensor in accordance with embodiments of the invention.
Figure 4B:
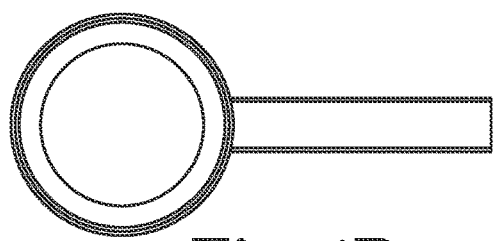
Figure 4C:
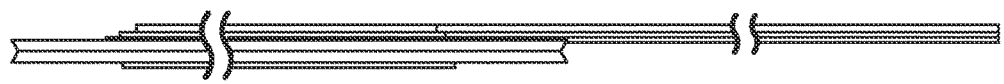
Figure 4D:
Figure 4E:
Figure 4F:
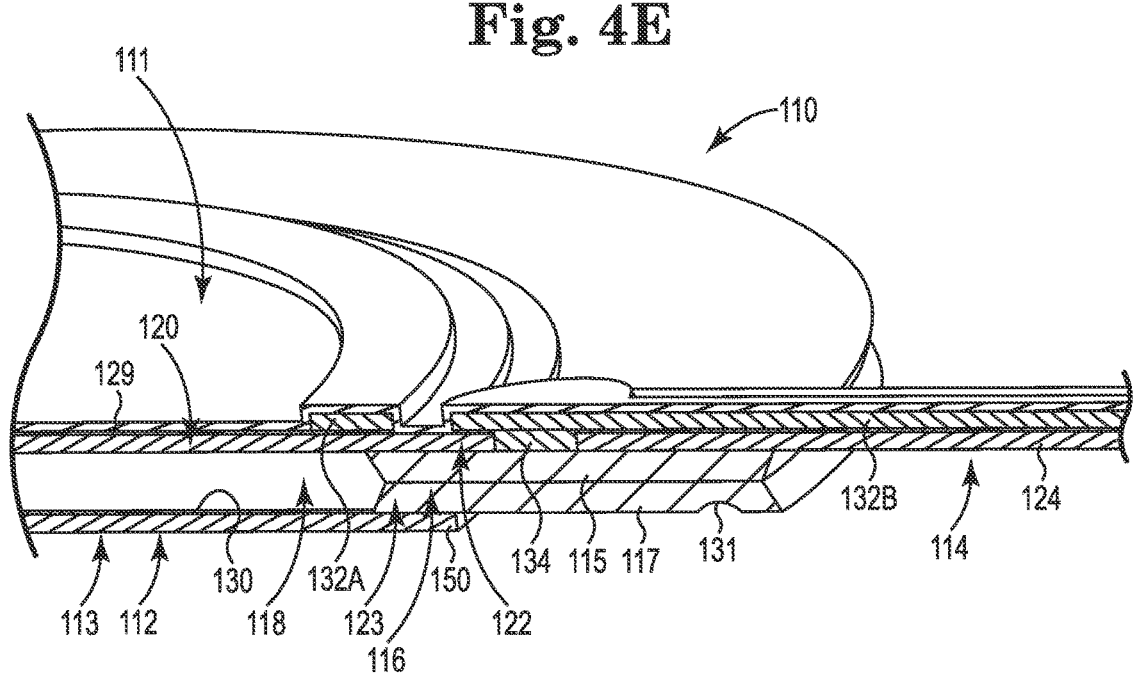

FIGS. 4A, B, C, D, E and F are top, bottom, side, distal end, proximal end and detailed sectional isometric views of a sensor 110 in accordance with embodiments of the invention. Sensor 110 is a dual diaphragm, welded and etched device in embodiments, and can be used to sense relatively low pressures. As shown, the sensor 110 includes a diaphragm structure 112 and an integrated lead structure 114. Diaphragm structure 112, which has a first diaphragm portion 111 and a second diaphragm portion 113, include a ring or other shaped base member 116 defining a void region or cavity 118. In the illustrated embodiment the base member 116 is formed from first and second sections 115 and 117, respectively, which can be stainless steel (SST). A flexible and insulating polymer layer 120 includes a first diaphragm portion 122 on the first section 115 of the base member 116 and over cavity 118 (i.e., on a first diaphragm portion 111), and a lead portion 124 on the lead structure 114. The diaphragm portion 122 and lead portion 124 of the polymer layer 120 are common in the illustrated embodiment. A first electrode 129 is located on the first diaphragm portion 111, and is on the side of the polymer layer 120 opposite the cavity 118 in the illustrated embodiment. In other embodiments the first electrode 129 is on the side of the polymer layer 120 facing the cavity 118. A first lead or trace 132A extends over the polymer layer 120 from the lead structure 114 to the diaphragm structure 112, where it electrically connects to the first electrode 129. Second lead or trace 132B extends over the polymer layer 120 from the lead structure 114 to the diaphragm structure 112, where it electrically connects to the first section 115 of the base member 116 by a conductive via 134 through the polymer layer 120. In embodiments, the first electrode 129 is a sputtered metal layer, and can be formed during the same process step as a seed layer for the traces 132A and 132B. A polymer or other cover coat or coating layer 140 can be applied over all or portions of the sensor to encapsulate the device. Traces 132A and 132B can include a plated metal layer on the seed layer.

A second diaphragm portion 123 includes an insulating polymer layer 150 on the second section 117 of the base member 116 and over cavity 118. A second electrode 130 is located on the second diaphragm portion 123, and is on the side of the polymer layer 150 facing the cavity 118. The second electrode 130 also extends into contact with the section 117 of the base member 116 in this embodiment. First and second sections 115 and 117 of the base member 116 are joined (e.g., by welds such as 131 or conductive adhesive). The second electrode 130 is electrically connected to the trace 132B through the via 134 and the base member 116 (or optionally other structures). In other embodiments, the second electrode 130 is located on the side of the polymer layer 150 opposite the cavity 118, and is electrically connected to a trace such as 132B by other contact structures. In embodiments, the first diaphragm portion 122 and lead structure 114 are formed separately from the second diaphragm portion 123, and assembled together by joining the sections 115 and 117 of the base member 116 as described above. All or portions of the sensor 110 can be encased or encapsulated (e.g., by sputtering) in a bio-compatible or other material such as Ti and/or SiO2 to prevent or minimize moisture/gas migration into the cavity 118. Alternatively to the covercoat layer 140, or in addition to the covercoat layer or encapsulating layer, a gas and/or moisture barrier can be formed by encapsulating all or portions of the sensor 110 in polymer such as Parylene. Sensor 110 can be relatively small (e.g., compared to sensor 10), yet provide equivalent sensitivity. Design variables can include the thicknesses and sizes of the base member sections, polymer layers and covercoat.

Figure 5A:
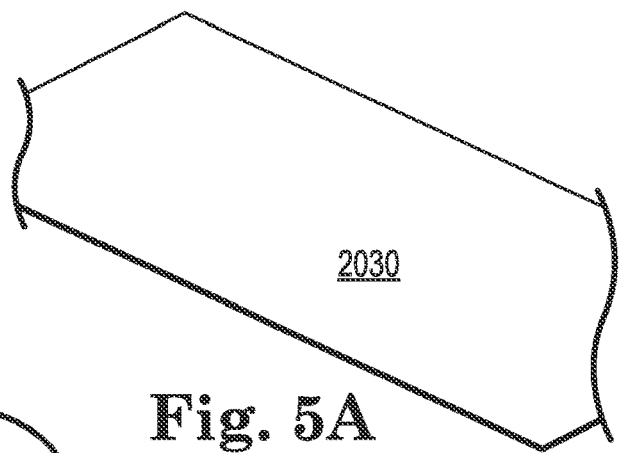
FIGS. 5A-5S illustrate sequences of process steps that can be used to manufacture embodiments of the sensor.
Figure 5B:
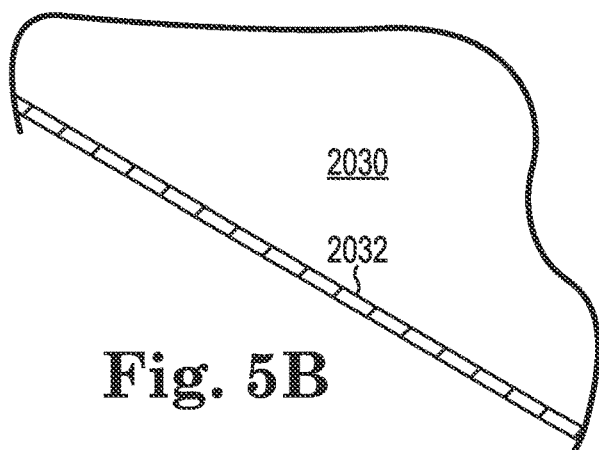
Figure 5C:
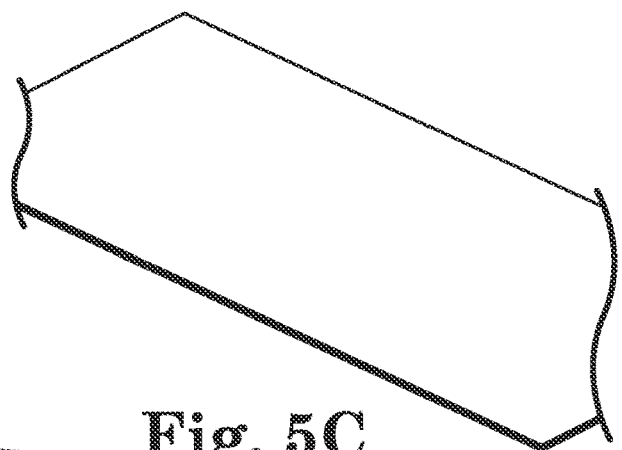
Figure 5D:
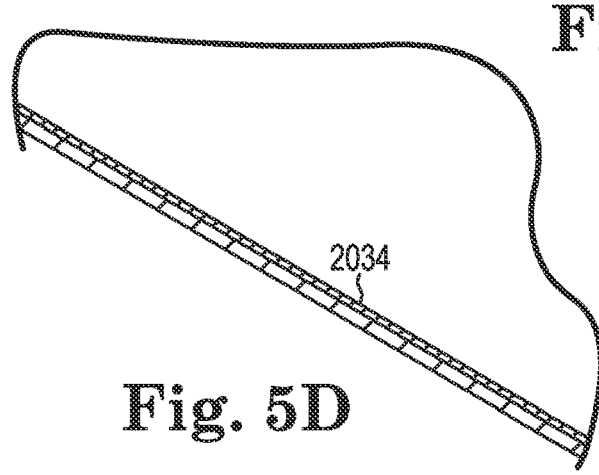
Figure 5E:
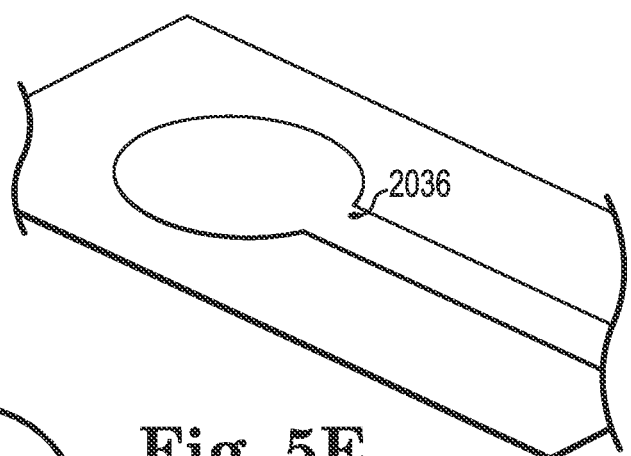
Figure 5F:
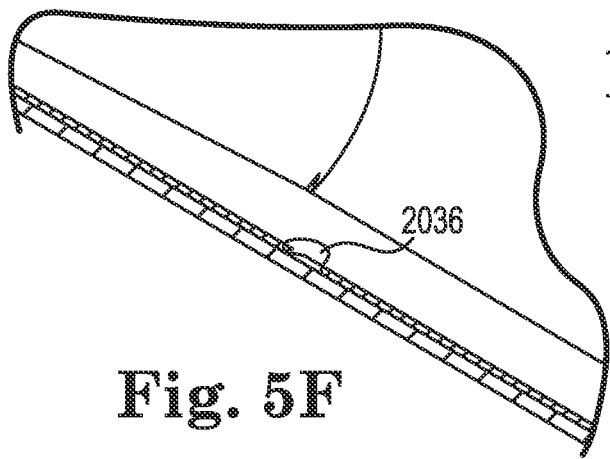
Figure 5G:
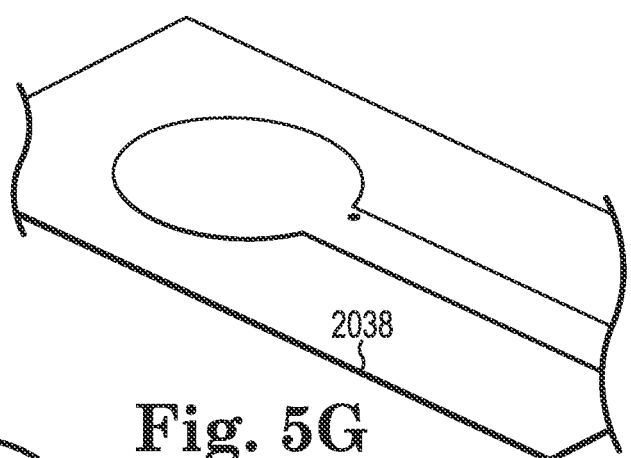
Figure 5H:
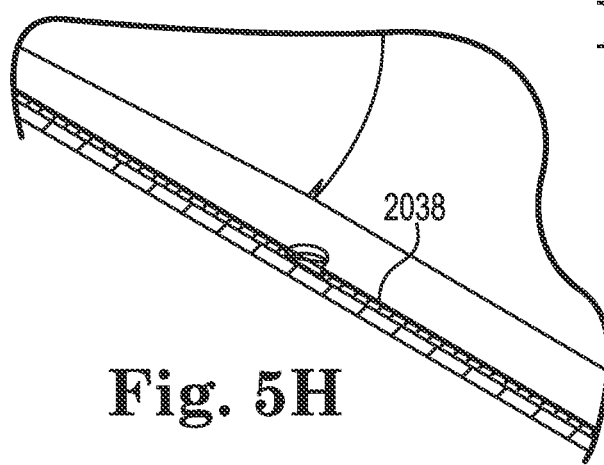
Figure 5I:
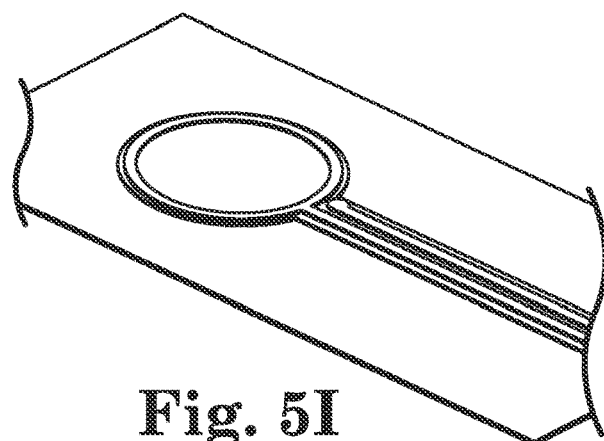
Figure 5J:
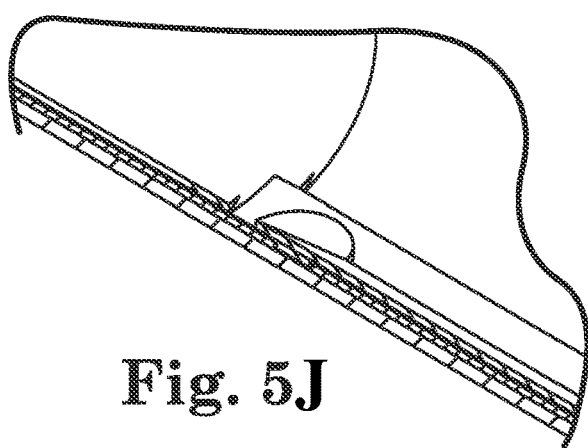
Figure 5K:
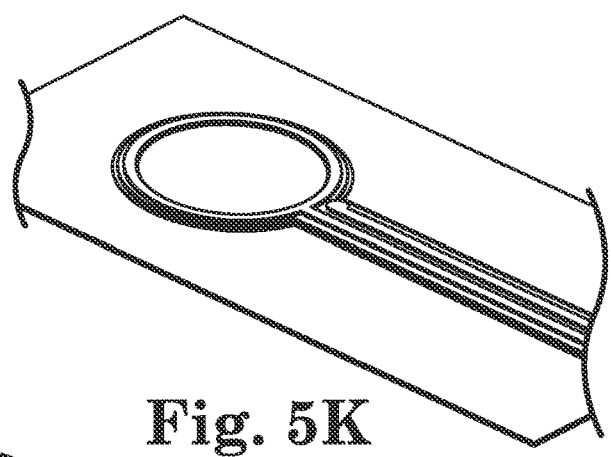
Figure 5L:
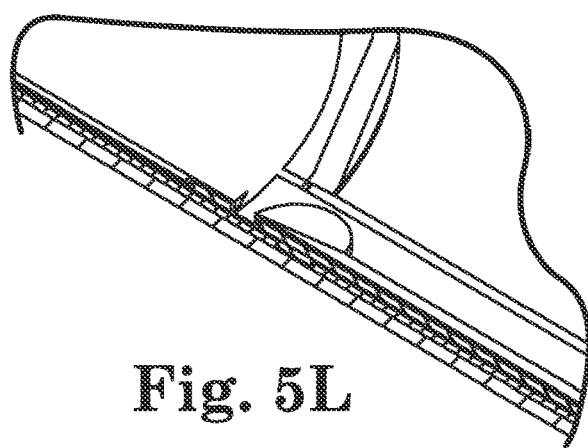
Figure 5M:
Figure 5N:
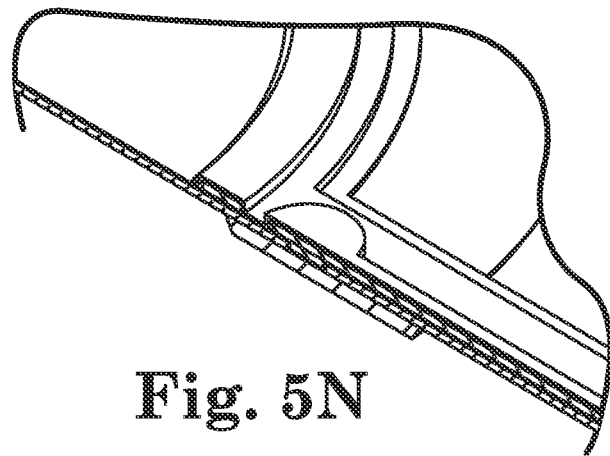
Figure 5O:
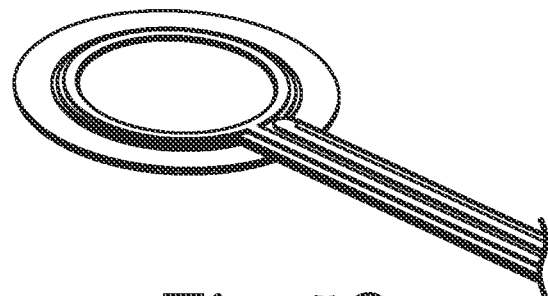
Figure 5P:
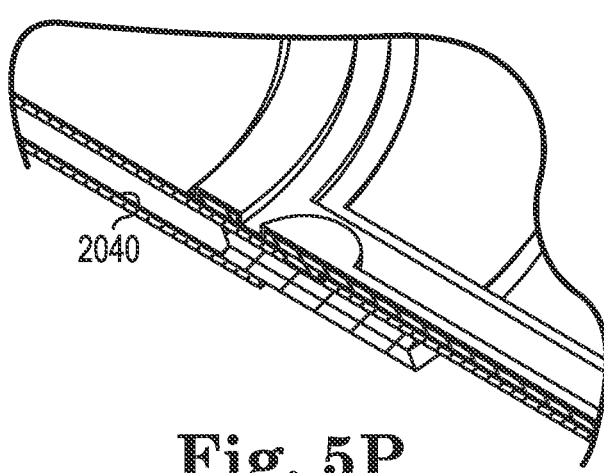
Figure 5Q:
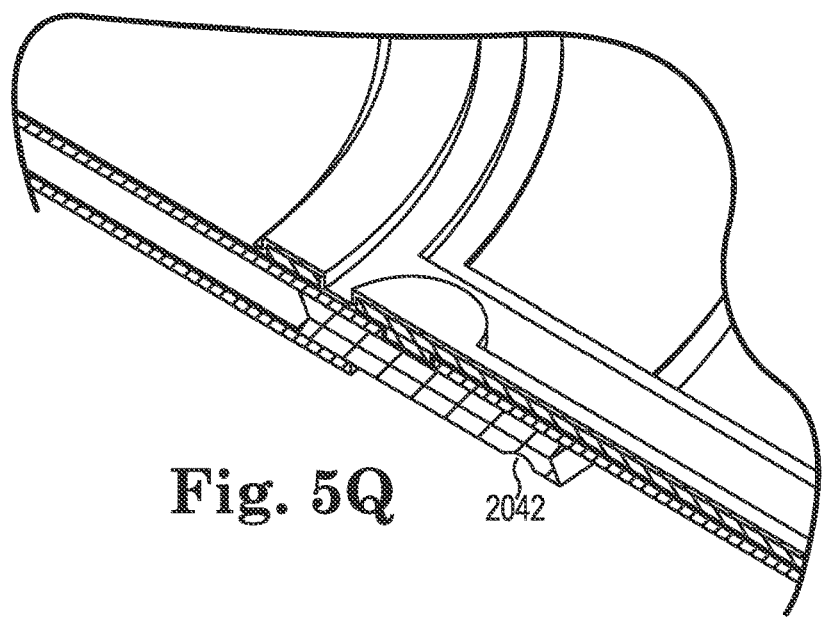
Figure 5R:
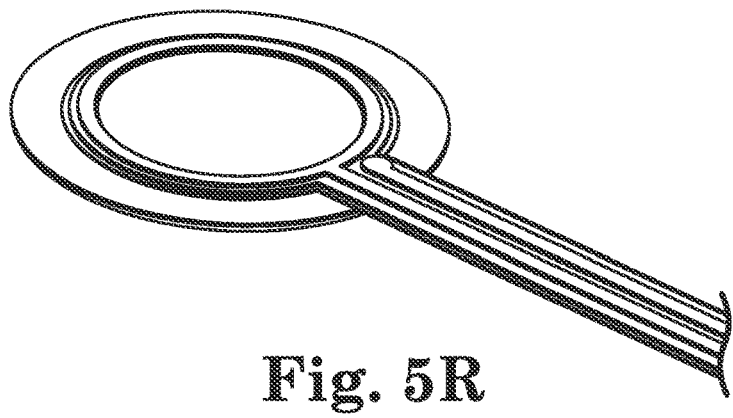
Figure 5S:
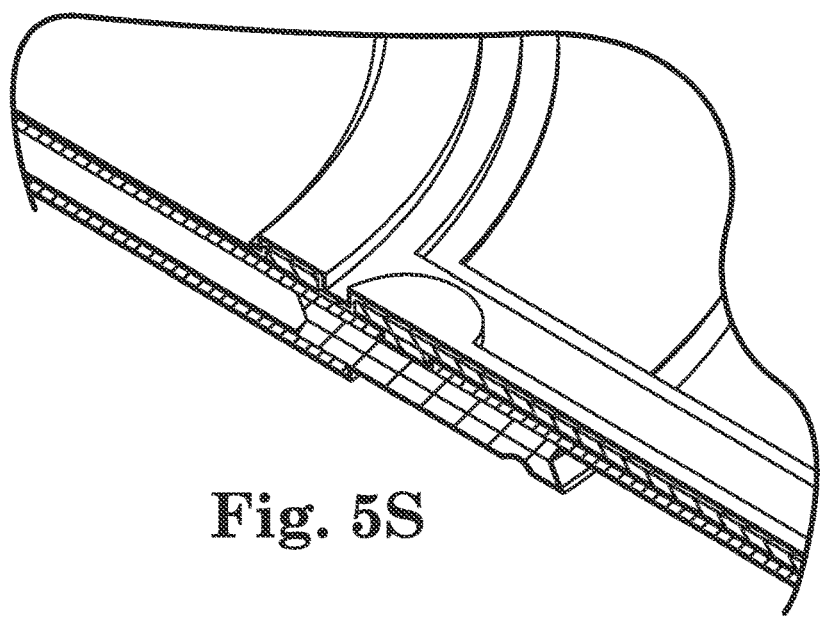
Figure 6A:
FIGS. 6A-6K illustrate sequences of process steps that can be used to manufacture embodiments of the sensor.
Figure 6B:
Figure 6C:
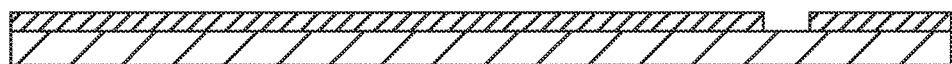
Figure 6D:
Figure 6E:
Figure 6F:
Figure 6G:
Figure 6H:
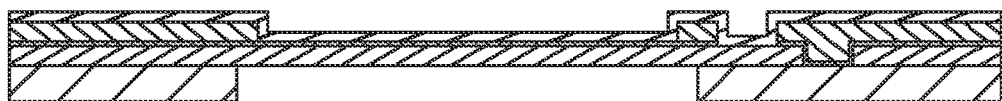
Figure 6I:
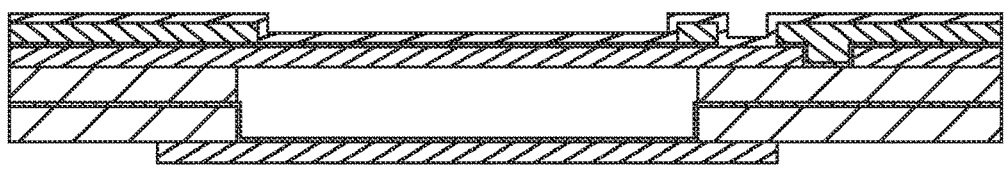
Figure 6J:
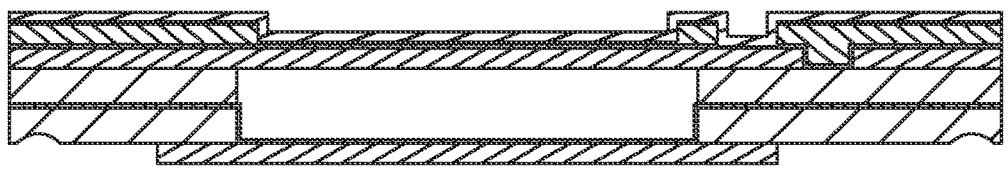
Figure 6K:
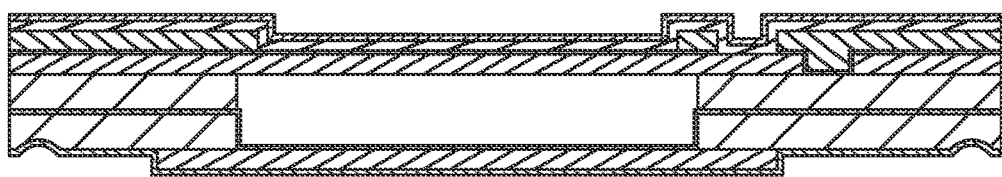

FIGS. 5A-5S and FIGS. 6A-6K illustrate sequences of process steps that can be used to manufacture embodiments of sensor 110. In particular, FIG. 5A shows the stainless steel layer 2030. FIG. 5B shows the stainless steel layer 2030 and the edge 2032 of the stainless steel layer. FIG. 5C shows applying/forming the polymer layer. FIG. 5D shows the polymer layer 2034. FIG. 5E shows forming the boundary of the polymer layer and via opening 2036 on the first diaphragm portion and lead structure. FIG. 5F shows the via opening 2036. FIG. 5G shows sputtering the seed layer 2038. FIG. 5H shows the seed layer 2038. FIG. 5I shows plating the traces. FIG. 5K shows applying the cover coat. FIG. 5M shows forming the base member of the first diaphragm portion of the diaphragm structure. FIG. 5O shows manufacturing the second diaphragm portion of the diaphragm structure and attaching to the first diaphragm portion and lead structure. FIG. 5P shows the electrode 2040. FIG. 5Q shows the weld 2042. FIG. 5R shown encapsulating the device. FIG. 6A shows the base metal (stainless steel or other). FIG. 6B shows coating the dielectric (photosensitive or other). FIG. 6C shows etching the dielectric. FIG. 6D shows sputtering the seed layer. FIG. 6E shows plating conductor traces. FIG. 6F shows etching the seed layer. FIG. 6G shows coating/etching the dielectric covercoat. FIG. 6H shows etching the stainless steel. FIG. 6I shows sputtering the seed layer on the lower diaphragm and mount (made similarly to the top portion without plated conductors/covercoat). FIG. 6J shows laser welding. FIG. 6K shows applying a moisture/gas barrier (PVD Parylene or sputtered metallic).

Figure 7A:
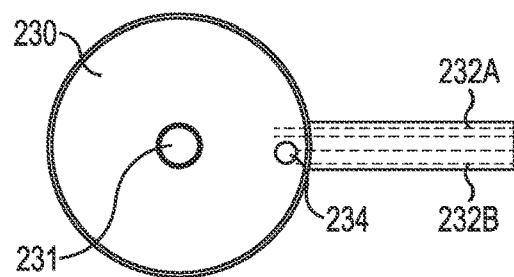
FIGS. 7A, B, C, D, E, F and G are top, bottom, side, distal end, proximal end, isometric and detailed sectional isometric views of another sensor in accordance with embodiments of the invention.
Figure 7B:
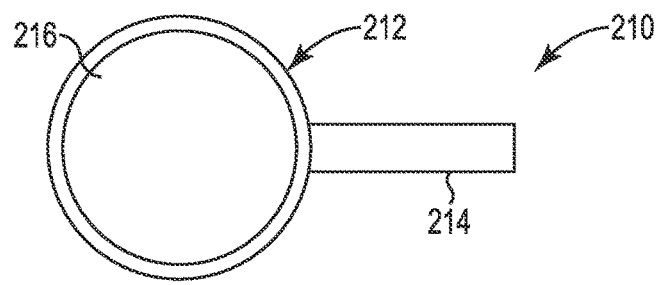
Figure 7C:
Figure 7D:
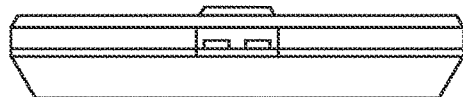
Figure 7E:
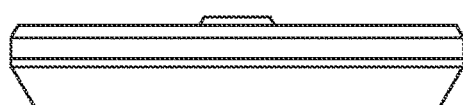
Figure 7F:
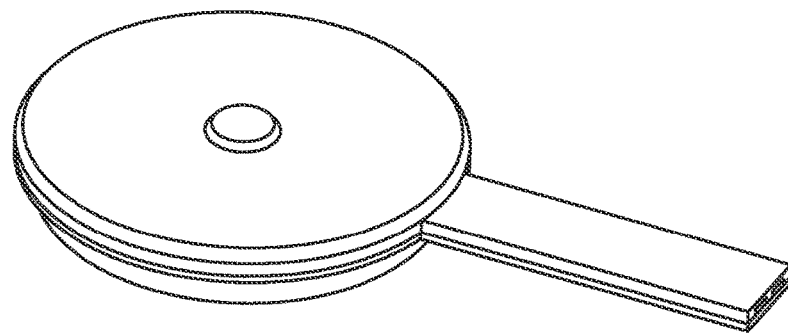
Figure 7G:
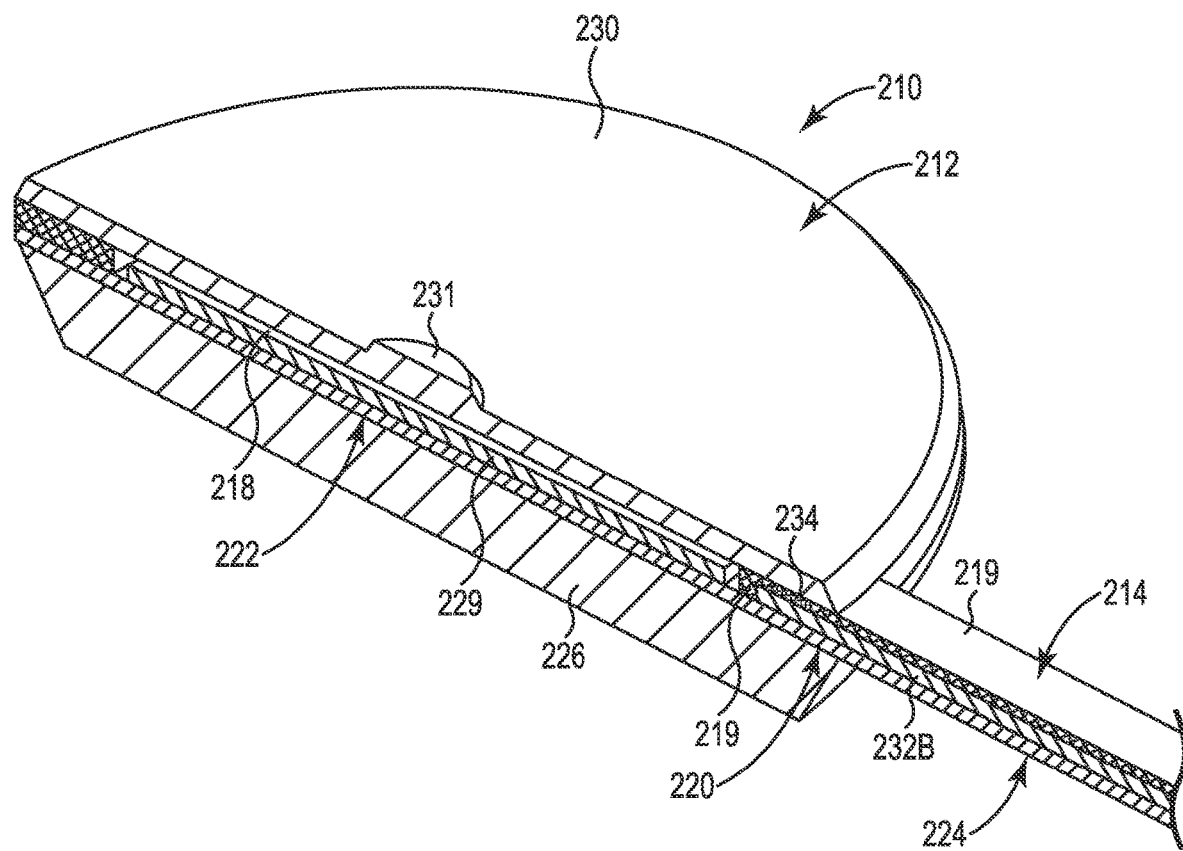
Figure 8A:
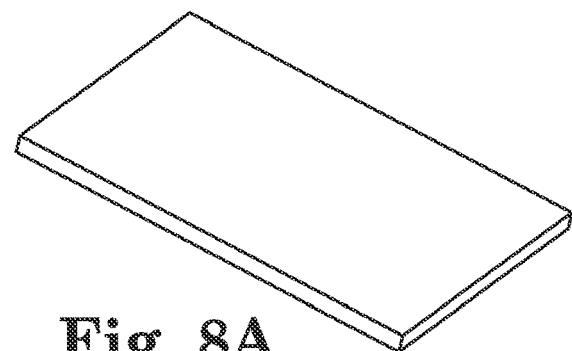
FIGS. 8A-8P illustrate sequences of process steps that can be used to manufacture embodiments of the sensor.
Figure 8B:
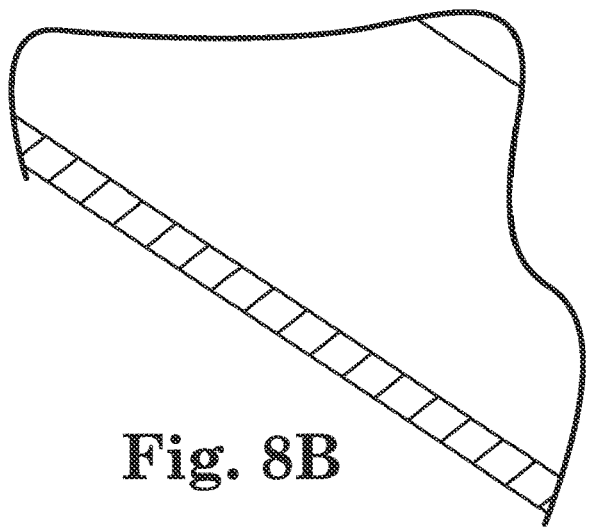
Figure 8C:
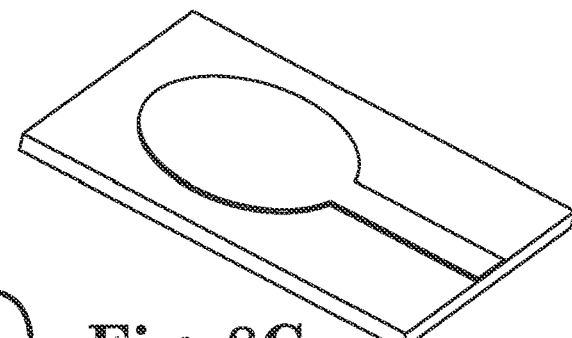
Figure 8D:
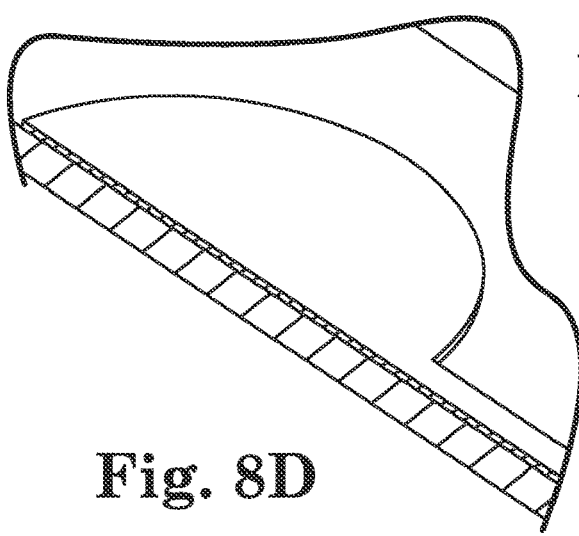
Figure 8E:
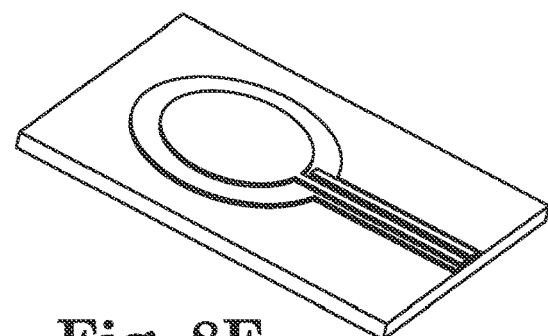
Figure 8F:
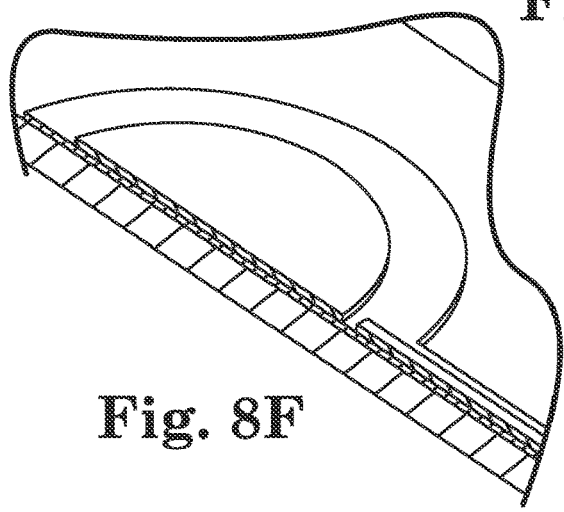
Figure 8G:
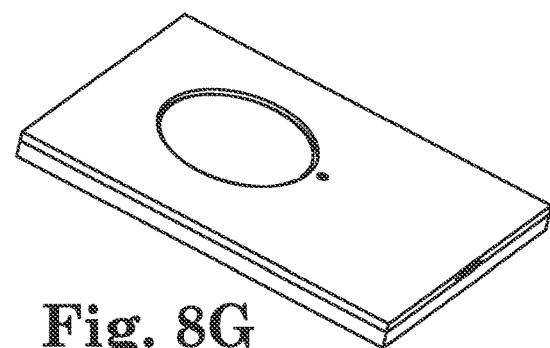
Figure 8H:
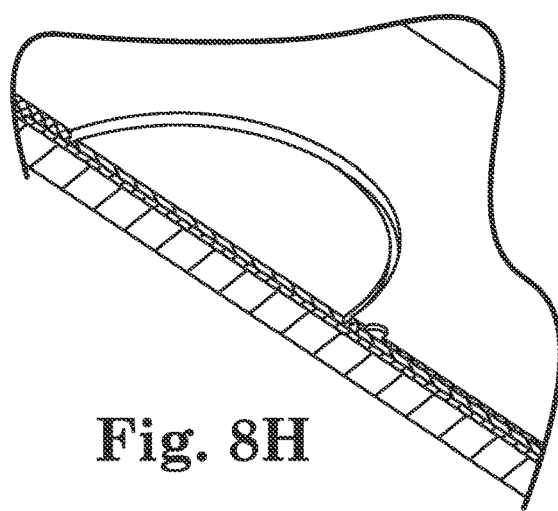
Figure 8I:
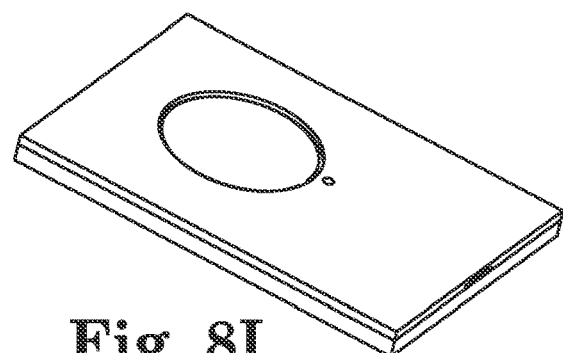
Figure 8J:
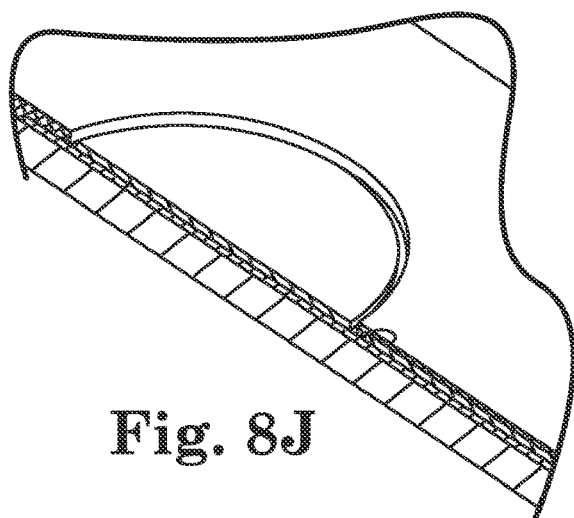
Figure 8K:
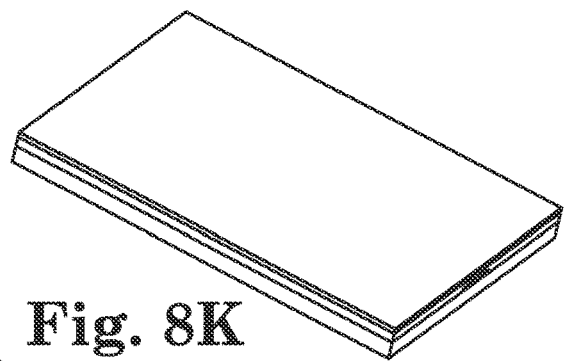
Figure 8L:
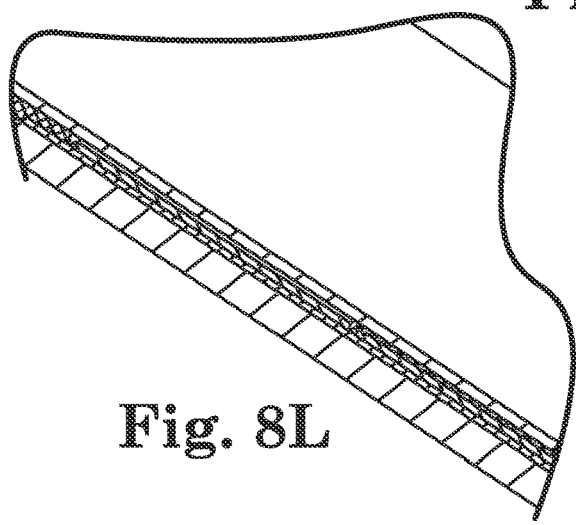
Figure 8M:
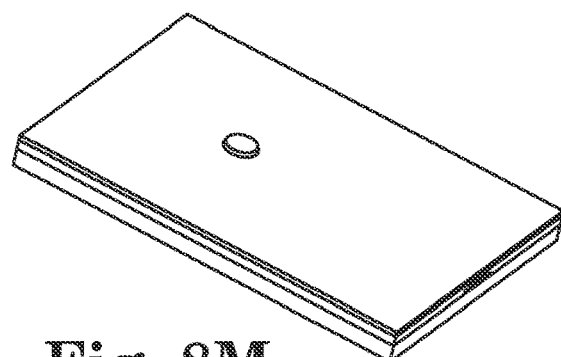
Figure 8N:
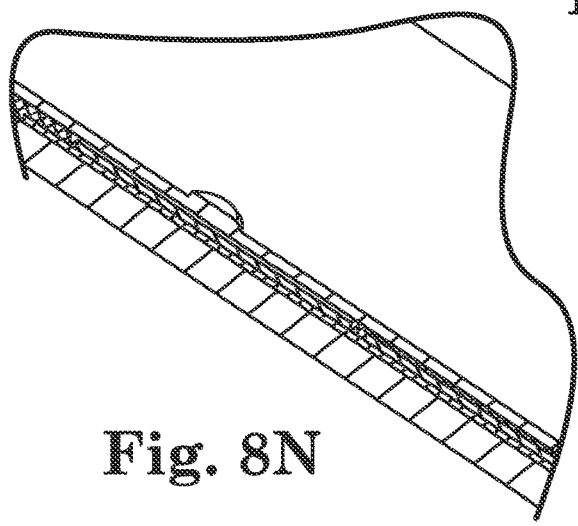
Figure 8O:
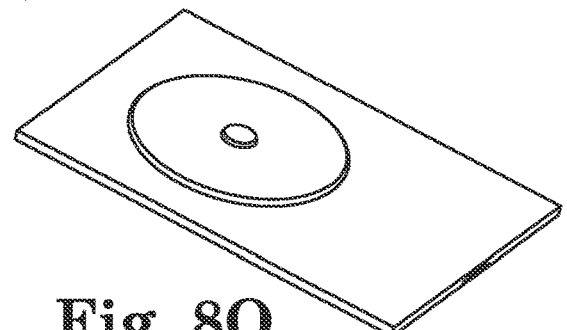
Figure 8P:
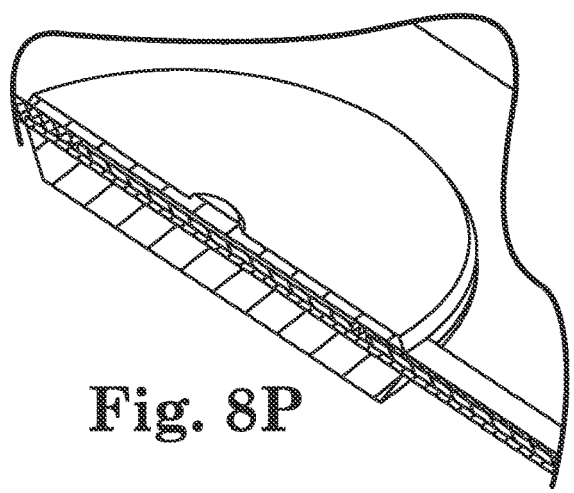

FIGS. 7A, B, C, D, E, F and G are top, bottom, side, distal end, proximal end, isometric and detailed sectional isometric views of a sensor 210 in accordance with embodiments of the invention. Sensor 210 can be used in relatively high pressure applications. As shown, the sensor 210 includes a diaphragm structure 212 and an integrated lead structure 214. Diaphragm structure 212 includes a base 216. In embodiments, base 216 is metal such as stainless steel (SST). A flexible and insulating (i.e., dielectric) polymer layer 220 includes a diaphragm portion 222 on or over the base 216 and a lead portion 224 on or over the lead structure 214. The diaphragm portion 222 and lead portion 224 of the polymer layer 220 are common in the illustrated embodiment. A first electrode 229 is located on the side of the polymer layer 220 opposite the base 216. Leads or traces 232A and 232B extend along the lead portion 224 of the polymer layer 220. Lead 232A is electrically connected to the first electrode 229. The diaphragm structure 212 also includes a member 230 over the diaphragm portion 222 and joined to the base 216 and any intervening layers (e.g., polymer layer 220 in the illustrated embodiment) by an adhesive insulating polymer layer 219. A cavity 218 is defined in the diaphragm structure 212 between the base 216 (and electrode 229) and the member 230. In embodiments, the member 230 is metal such as stainless steel. In these embodiments the member 230 can function as a second electrode. Lead 232B is electrically connected to the second electrode (e.g., the member 230 in embodiments shown in FIGS. 7A-F) by a conductive via 234 through the adhesive polymer layer 219. In other embodiments, the member 230 can be formed from other materials such as ceramic materials, and an electrode can be located on the member in the cavity. In embodiments, the first electrode 229 includes sputtered and optionally plated metal layers, and can be formed on the polymer layer 220 during the same process steps as the traces 232A and 232B. Covercoat and/or encapsulation layers such as those described above can be applied over all or parts of the sensor 210. Sensor 210 offers a wide range of design variables that can be advantageously used to determine parameters such as the sensitivities and ranges of pressures of the device. For example, the thicknesses, including those of partial etched regions, of the base 216 and the member 230 can be determined. Thickness of the sputtered and/or plated conductor layers forming the electrode 229 and traces 232A and 232B, polymer layer 220 and/or adhesive polymer layer also can be determined for these purposes. The illustrated embodiments include a button on the member 230, and the height of the button can be used to self-limit deflection of the member. The stiffness of the diaphragm structure 212 can remove drift due to temperature and background pressure changes. Embodiments with a rigid base 216 can be relatively efficiently and effectively mounted to other structures. In yet other embodiments the electrode 229 can be replaced with a partial-etched mesa on the base 216, and the base 216 used as an electrode.

Figure 9A:
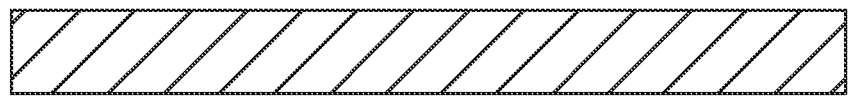
FIGS. 9A-9L illustrate sequences of process steps that can be used to manufacture embodiments of the sensor.
Figure 9B:
Figure 9C:
Figure 9D:
Figure 9E:
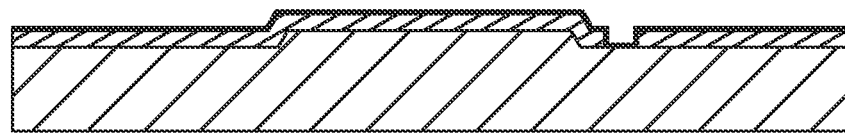
Figure 9F:
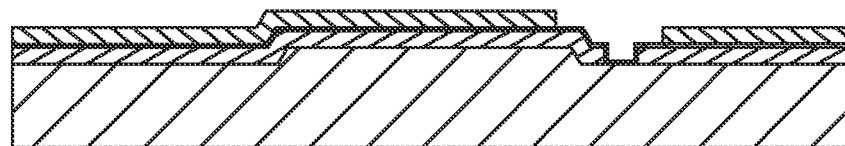
Figure 9G:
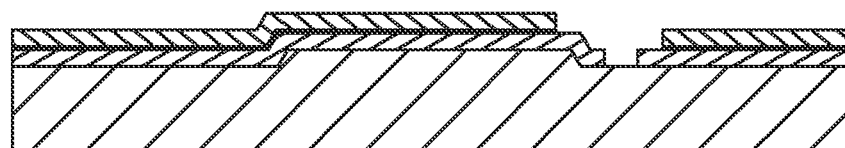

FIGS. 8A-8P and FIGS. 9A-9L illustrate sequences of process steps that can be used to manufacture embodiments of sensor 210. In particular, FIG. 9A illustrates the base stainless steel. FIG. 9B illustrates a partial etch. FIG. 9C illustrates coating the dielectric. FIG. 9D illustrates etching/developing the dielectric. FIG. 9E illustrates sputtering the seed layer. FIG. 9F illustrates plating the conductors. FIG.

Figure 9H:
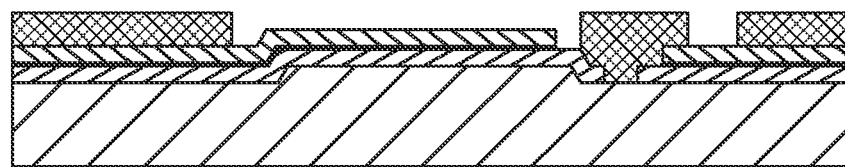
Figure 9I:
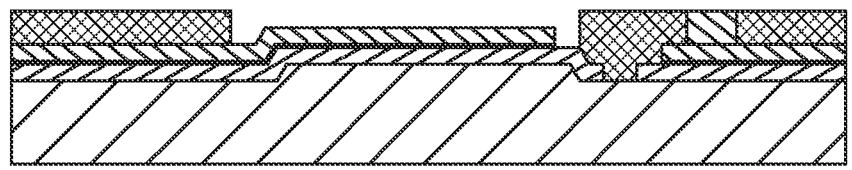
Figure 9J:
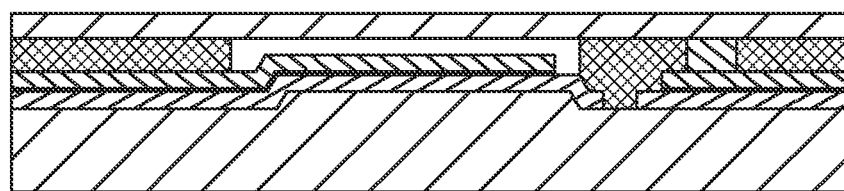
Figure 9K:
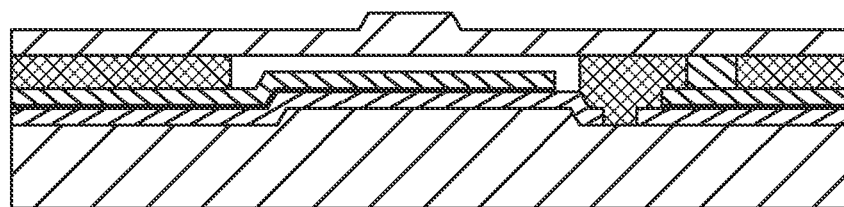
Figure 9L:
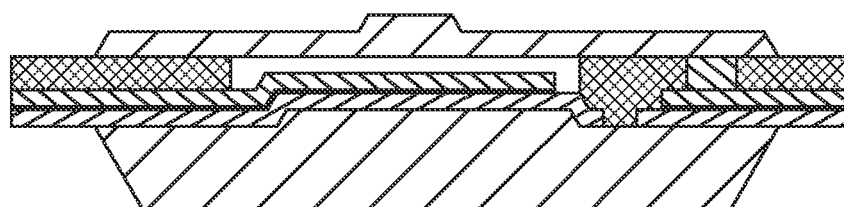

9G illustrates etching the seed layer. FIG. 9H illustrates laminating pre-cut sheet adhesive. FIG. 9I illustrates applying conductive epoxy to a via hole. FIG. 9J illustrates laminating the top stainless steel/cure adhesive and epoxy. FIG. 9K illustrates the optional step of partial etching a force concentrator feature. FIG. 9L illustrates etching the stainless steel and laser cutting sheet adhesive.

Figure 10A:
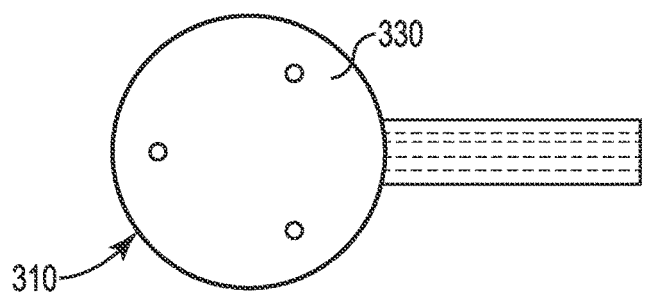
FIGS. 10A, B, C, D, E and F are top, bottom, side, distal end, proximal end and isometric views of a cluster sensor in accordance with other embodiments of the invention.
Figure 10B:
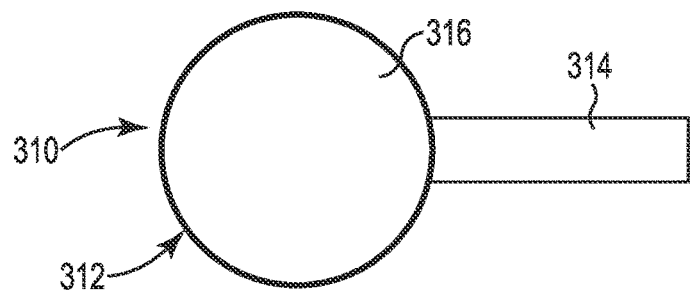
Figure 10C:
Figure 10D:
Figure 10E:
Figure 10F:
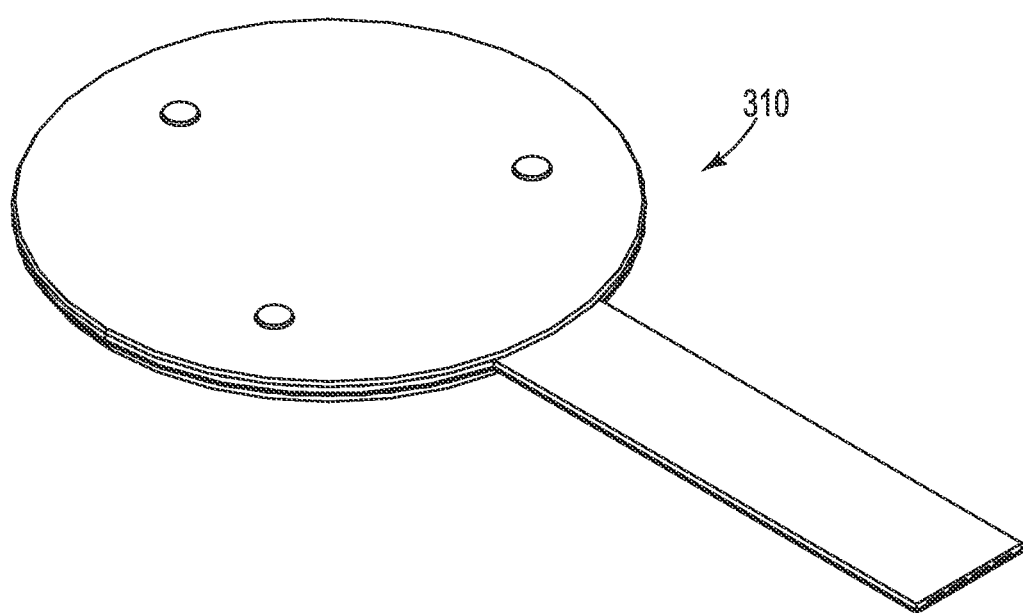

FIGS. 10A, B, C, D, E and F are top, bottom, side, distal end, proximal end and isometric views of a cluster sensor 310 in accordance with embodiments of the invention. FIGS. 11A-11O and 12A-12I illustrate sequences of process steps that can be used to manufacture embodiments of sensor 310. Sensor 310 is a tri-axis sensor that includes multiple (i.e., three) sensors similar in structure and operation to those of sensor 210 that are integrated into a common diaphragm structure 312 and lead structure 314. Certain features of sensor 310 that are similar to those of sensor 210 are indicated by similar reference numbers. In embodiments, sensor 310 has a single stainless steel (SST) diaphragm structure and is capable of being used in relatively high pressure applications. Embodiments of the sensor includes a common base 316 and a polymer layer 320 having electrodes 3291, 3292 and 3293, and traces 332A1, 332A2, 332A3 and 323B. Trace 323B can be coupled to the diaphragm member 330 by a conductive via. Covercoat and/or encapsulation layers such as those described above can be applied over all or parts of the sensor 310. Sensor 310 can be manufactured using processes similar to those described above in connection with sensors 10, 110 and 210.

Figure 11A:
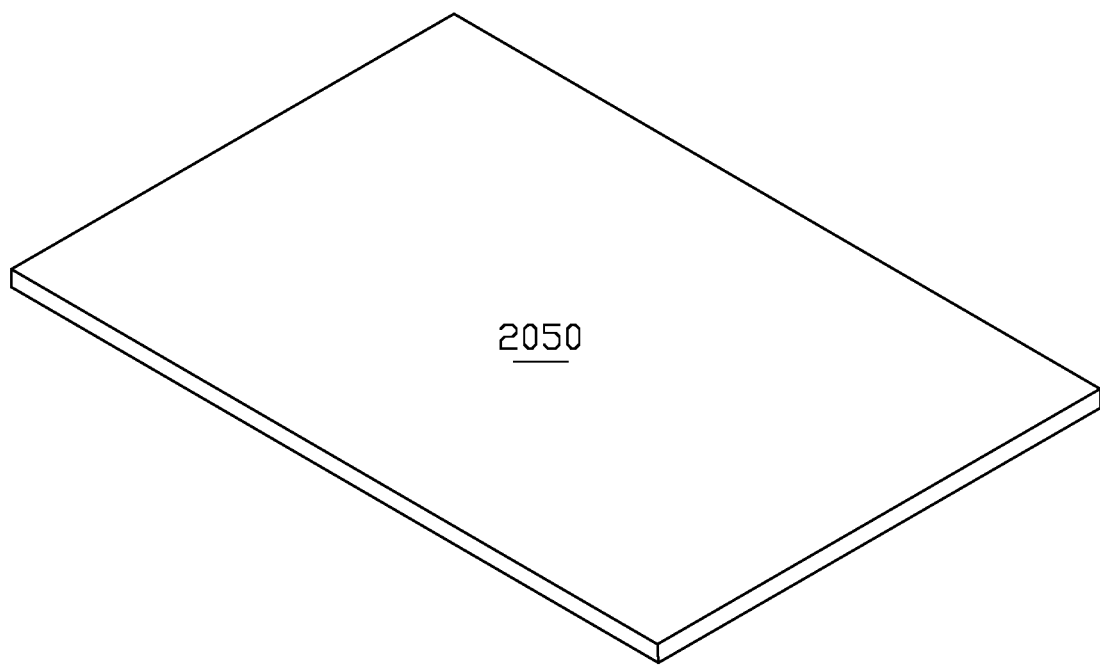
FIGS. 11A-11O illustrate sequences of process steps that can be used to manufacture embodiments of the sensor.
Figure 11B:
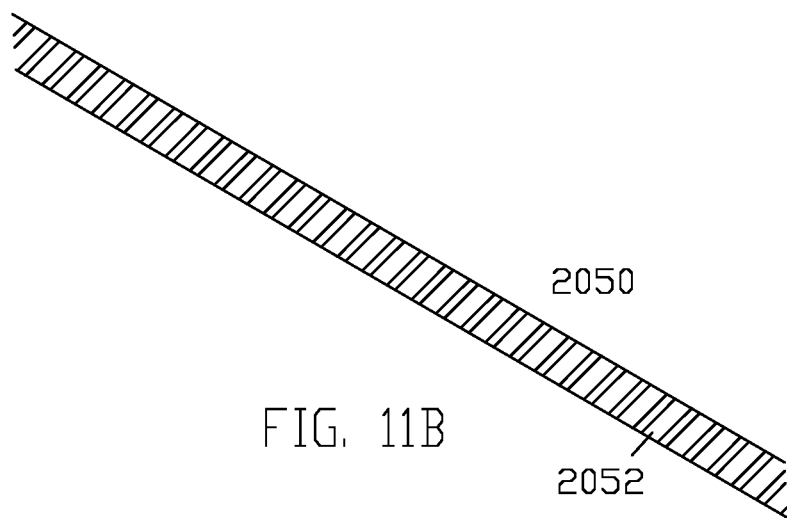
Figure 11C:
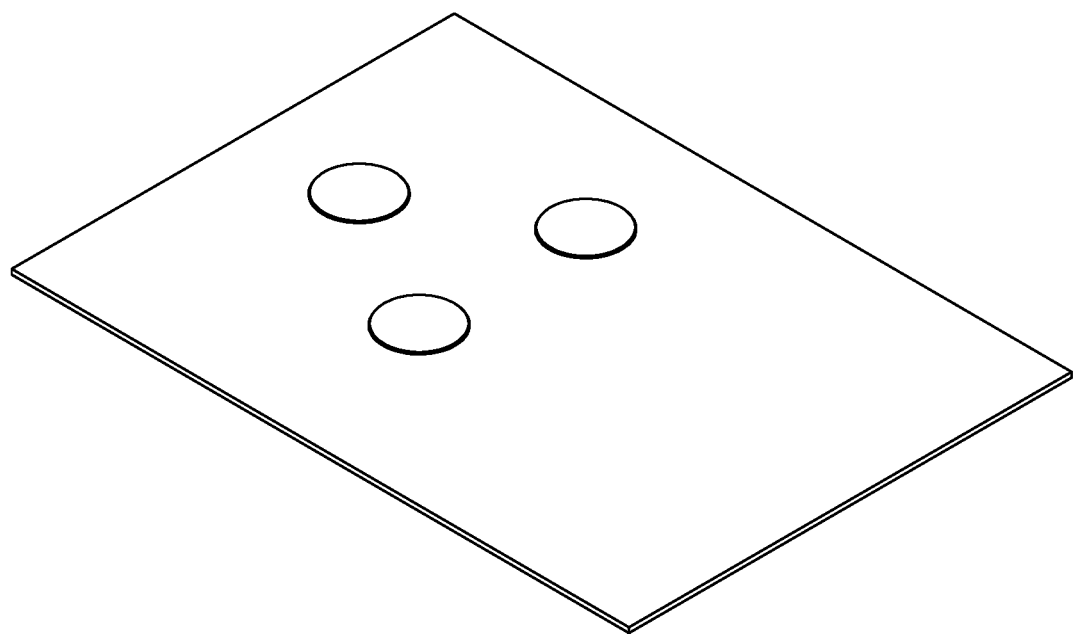
Figure 11D:
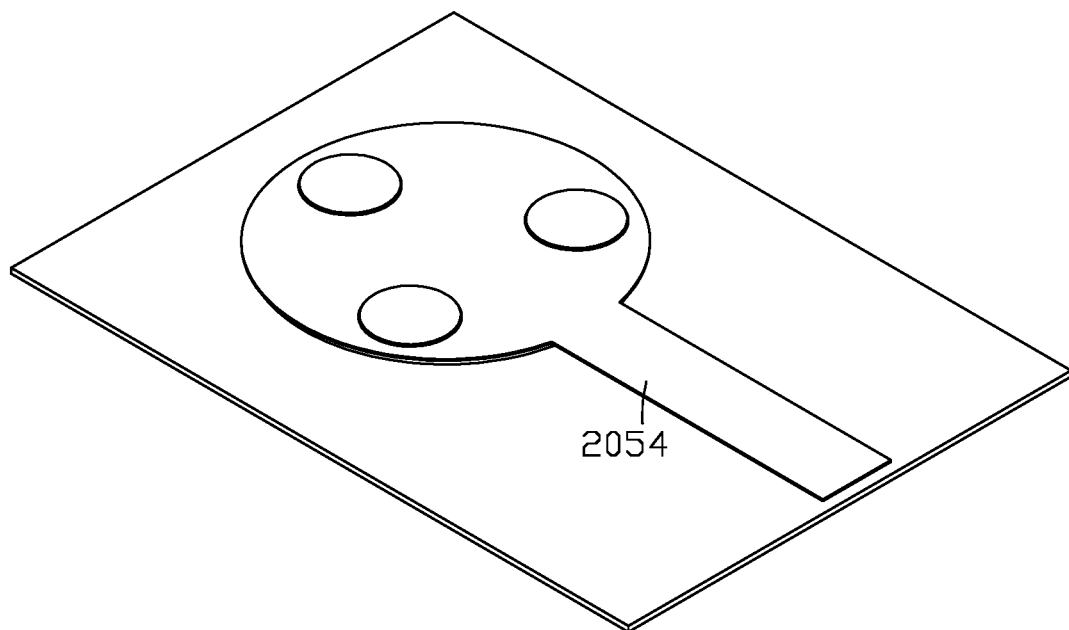
Figure 11E:
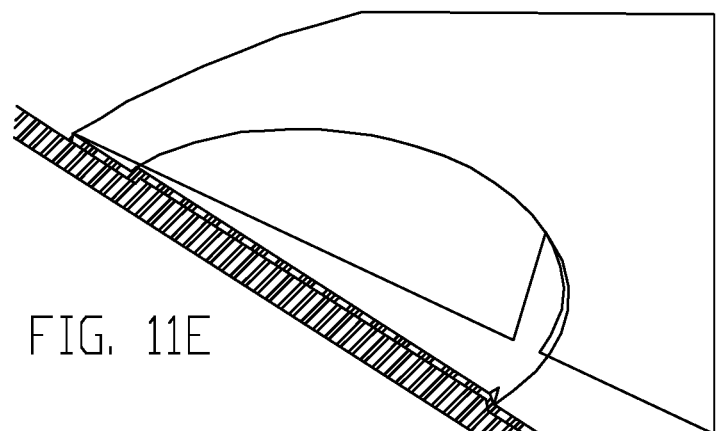
Figure 11F:
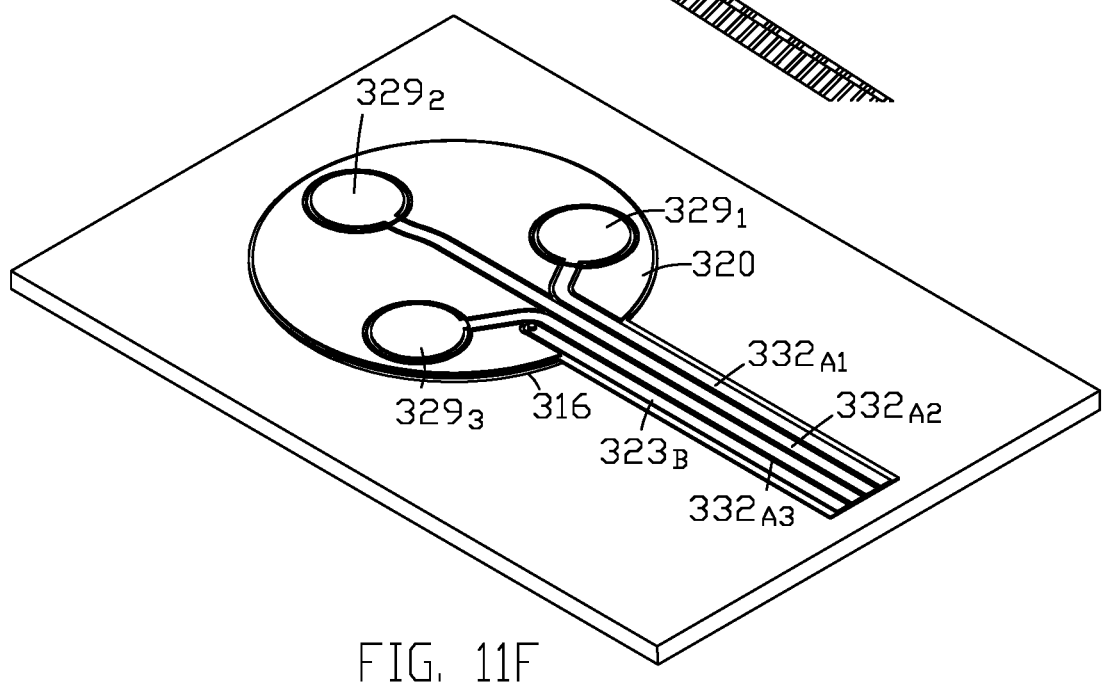
Figure 11G:
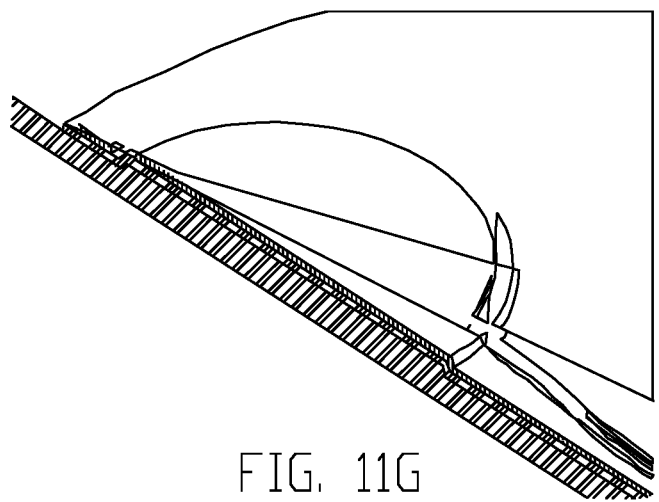
Figure 11H:
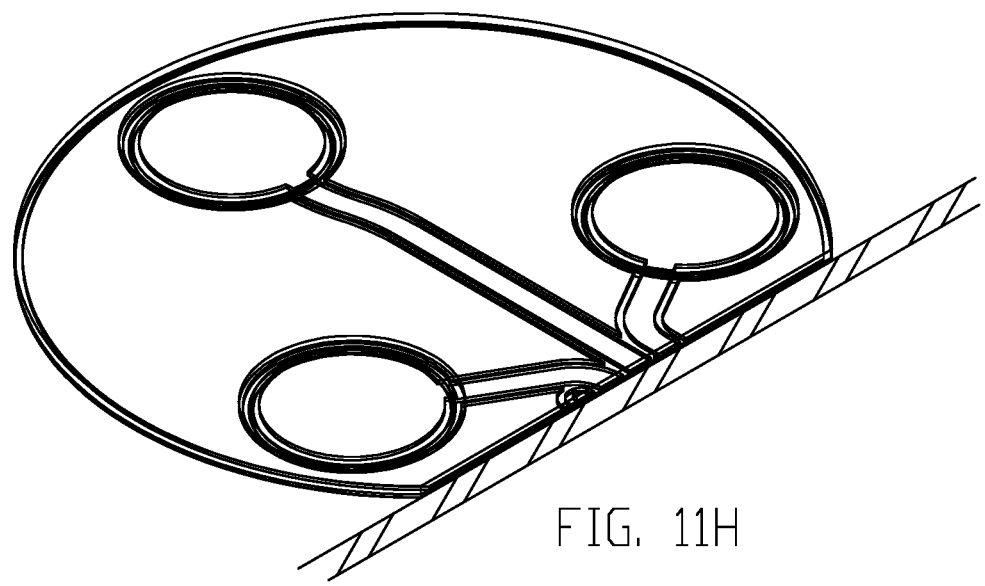
Figure 11I:
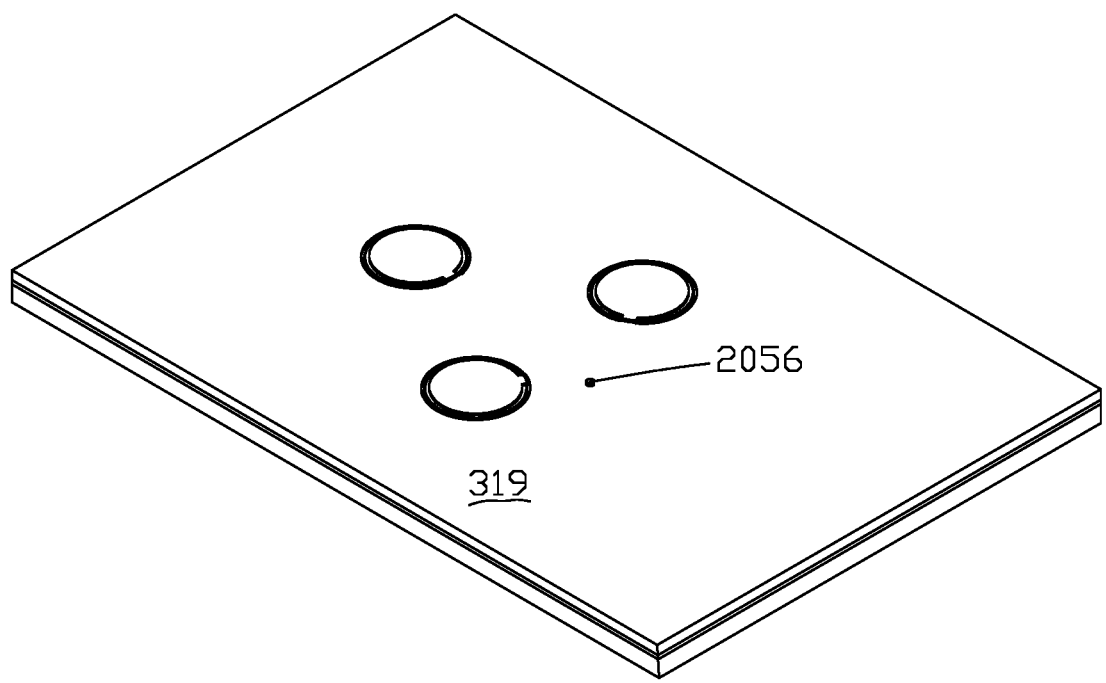
Figure 11J:
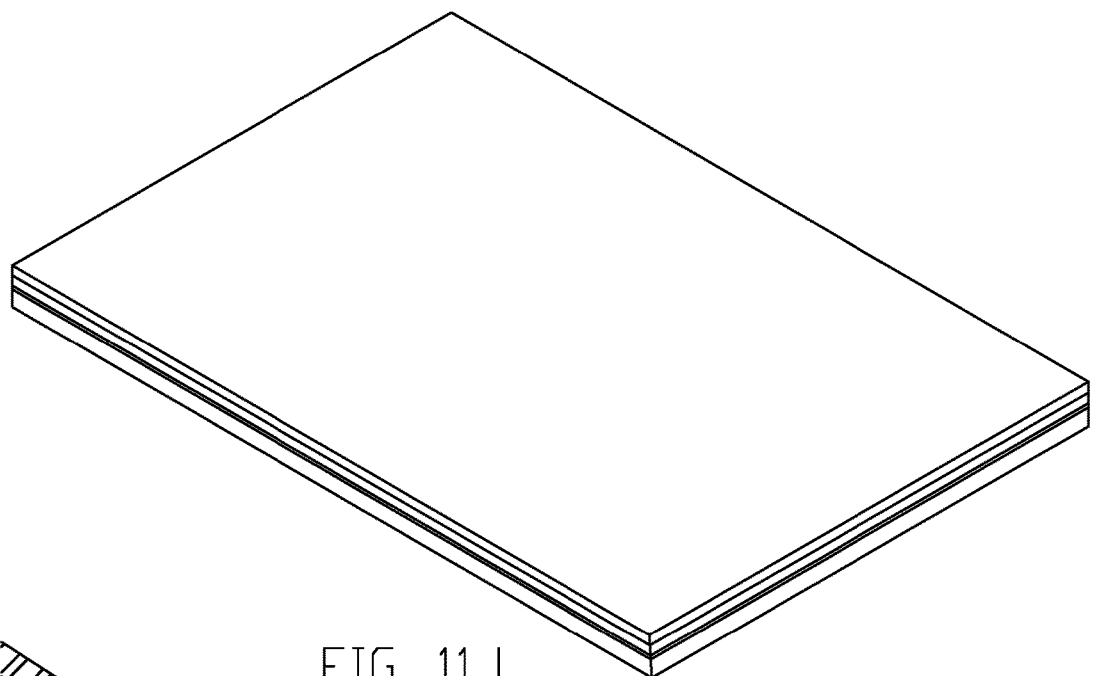
Figure 11K:
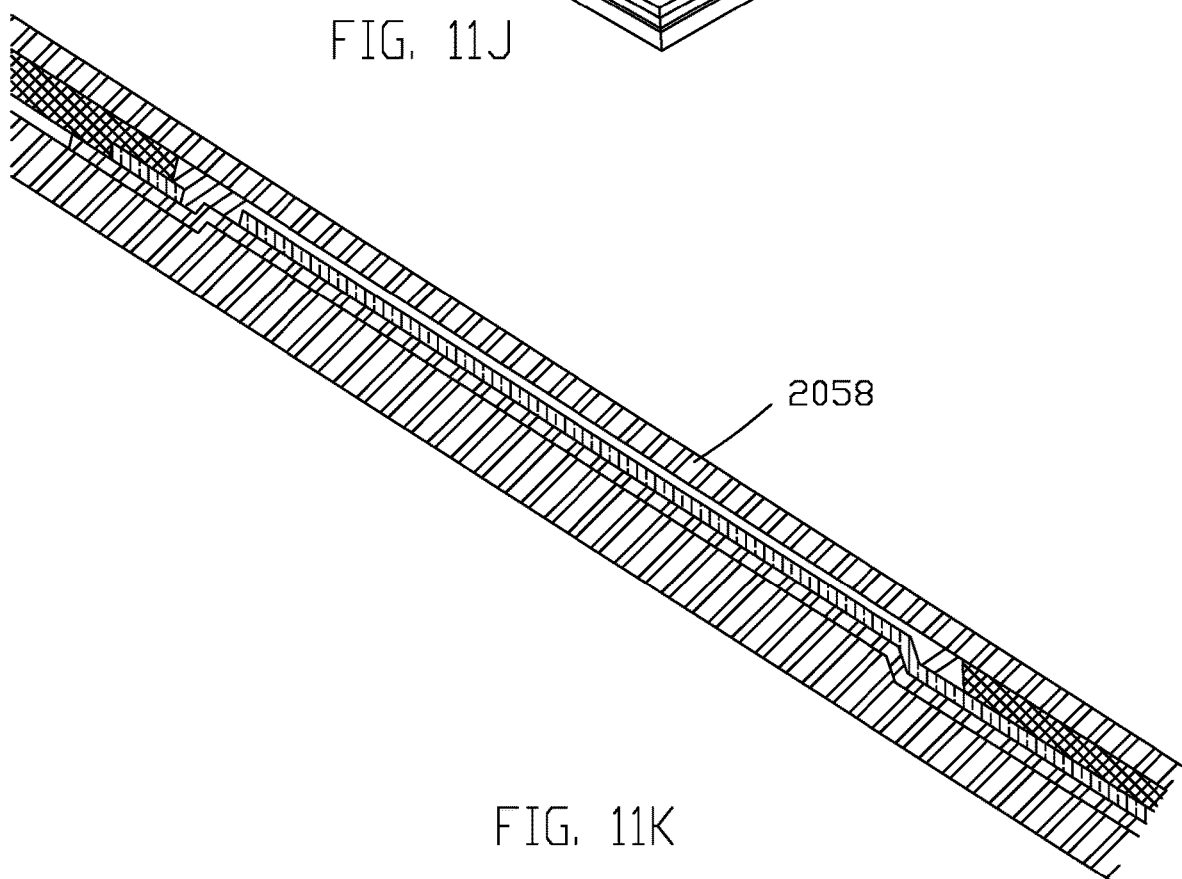
Figure 11L:
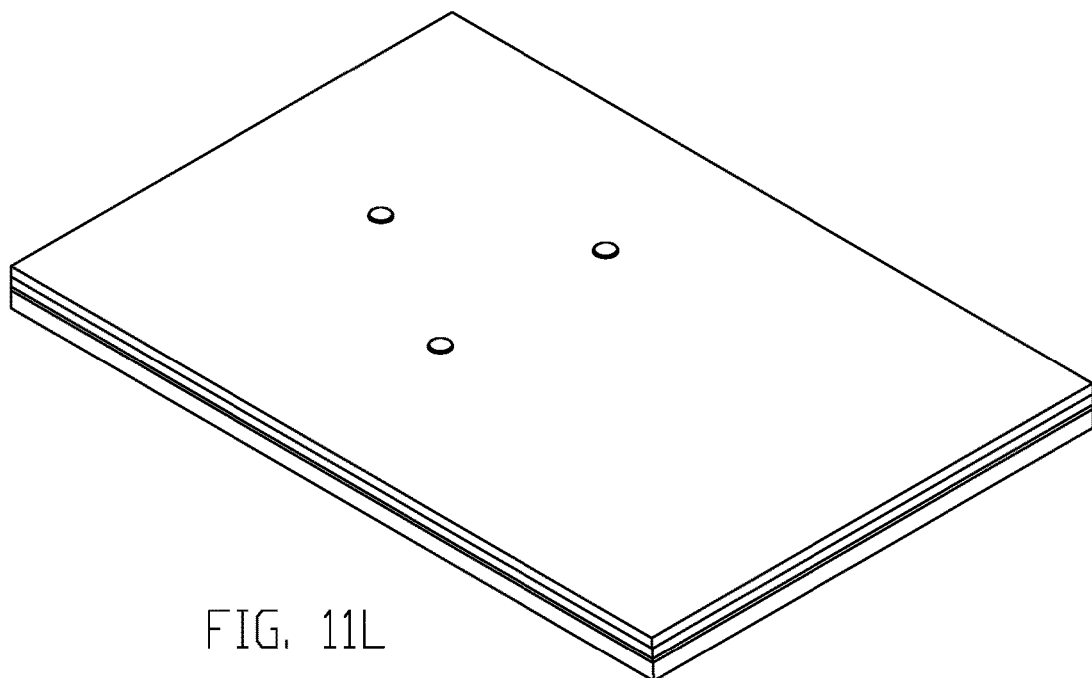
Figure 11M:
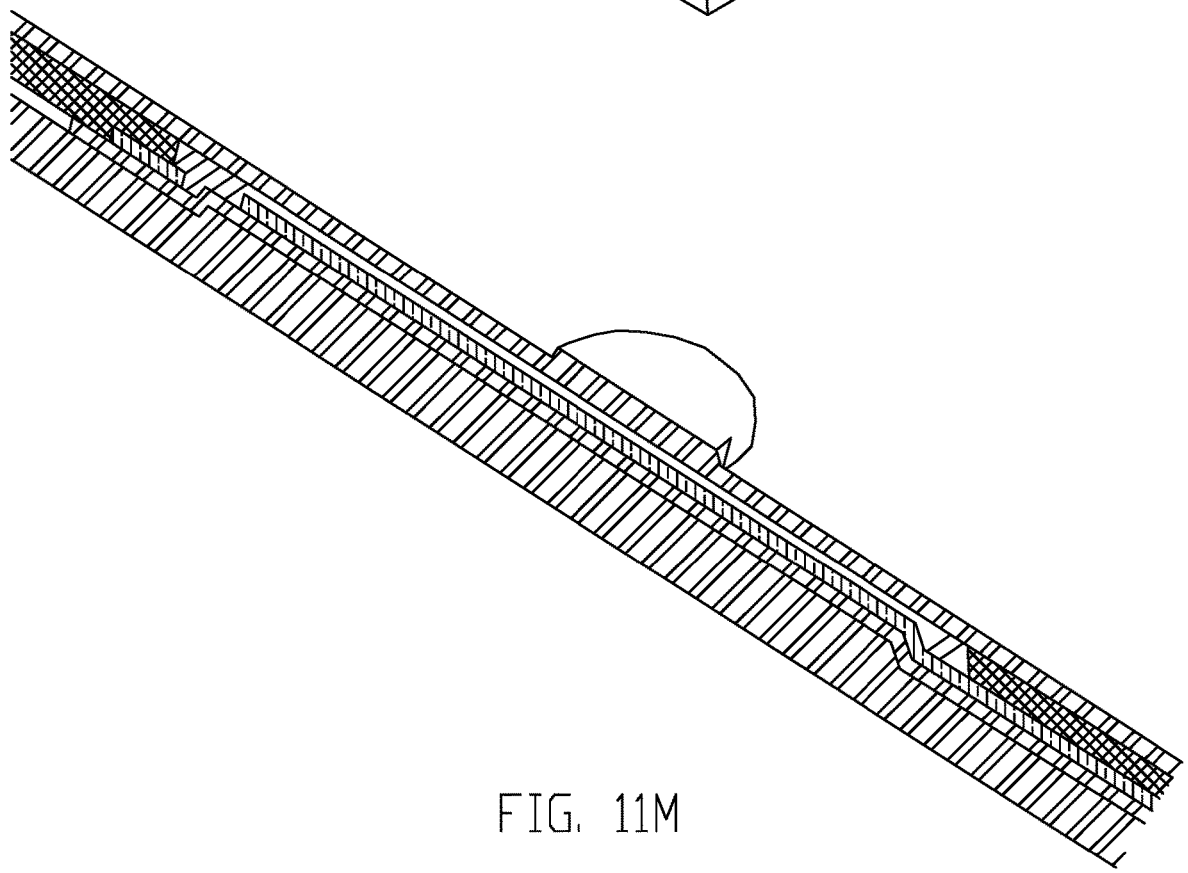
Figure 11N:
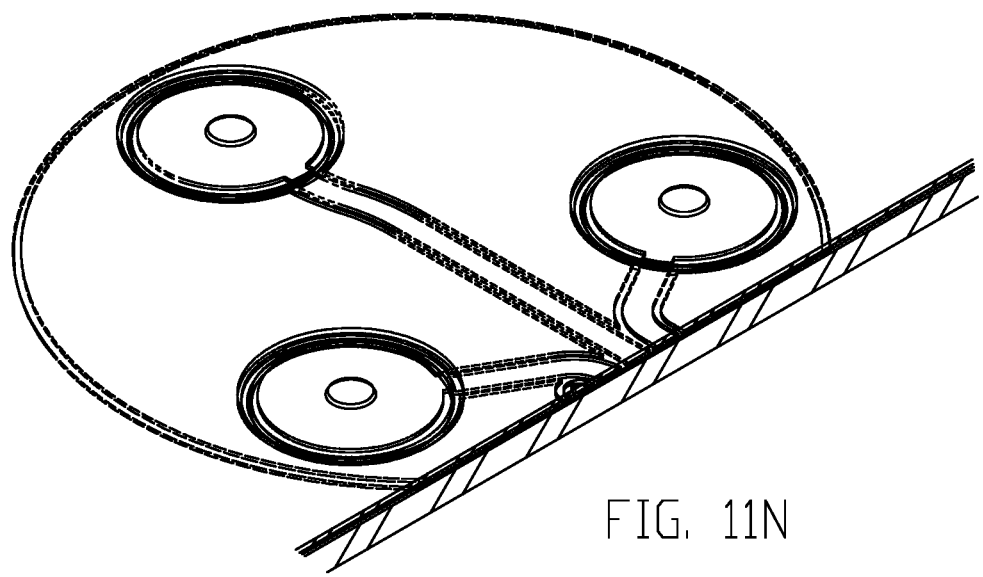
Figure 11O:
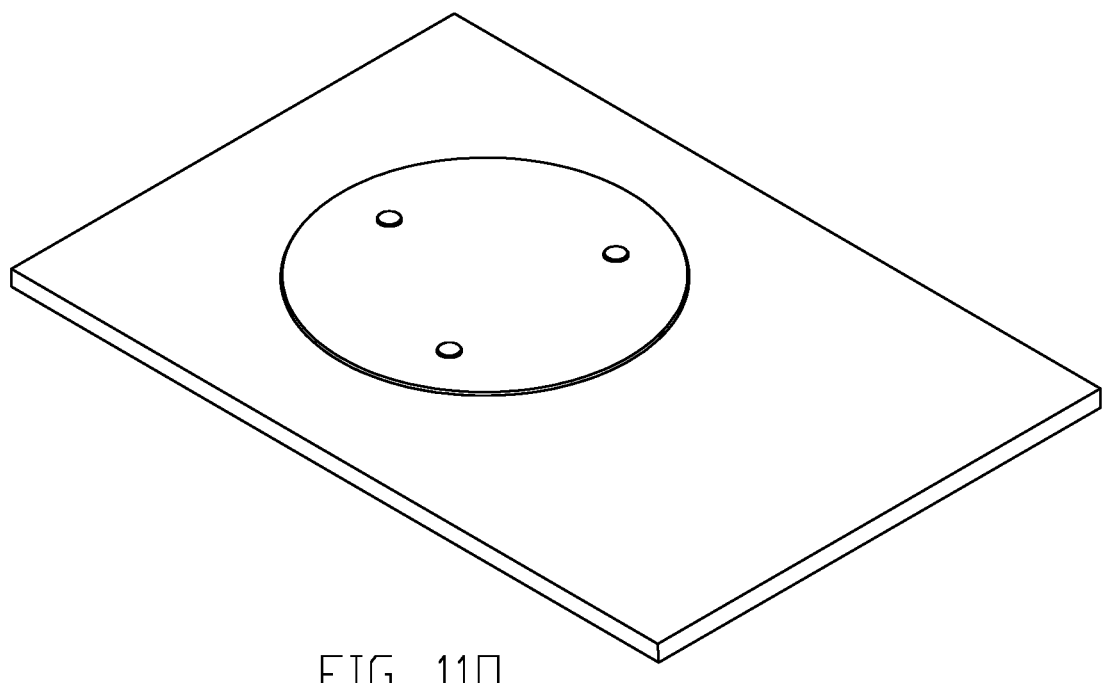
Figure 12A:
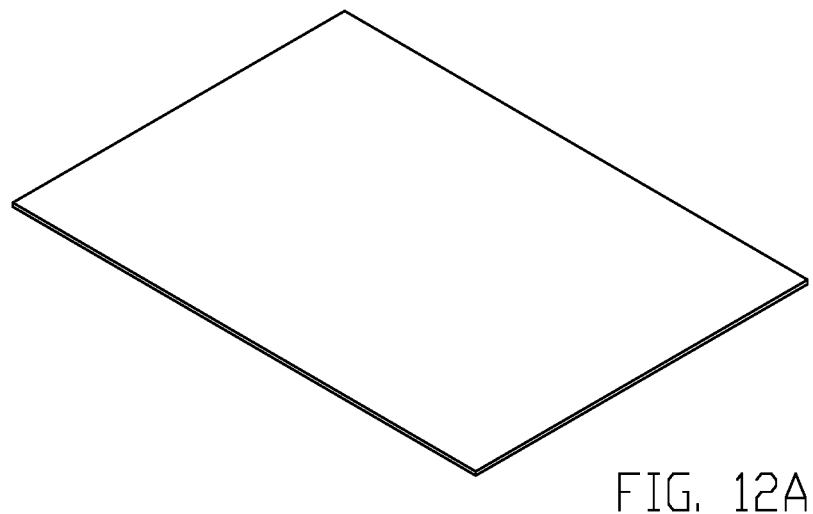
FIGS. 12A-12I illustrate sequences of process steps that can be used to manufacture embodiments of the sensor.
Figure 12B:
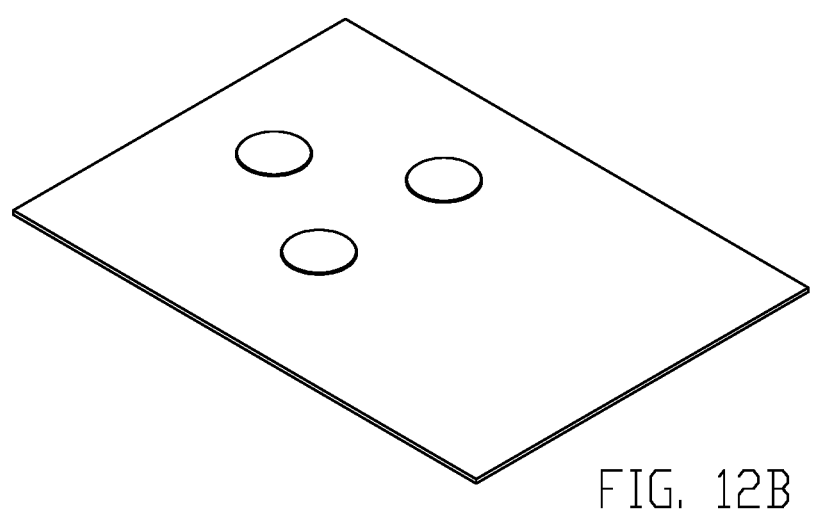
Figure 12C:
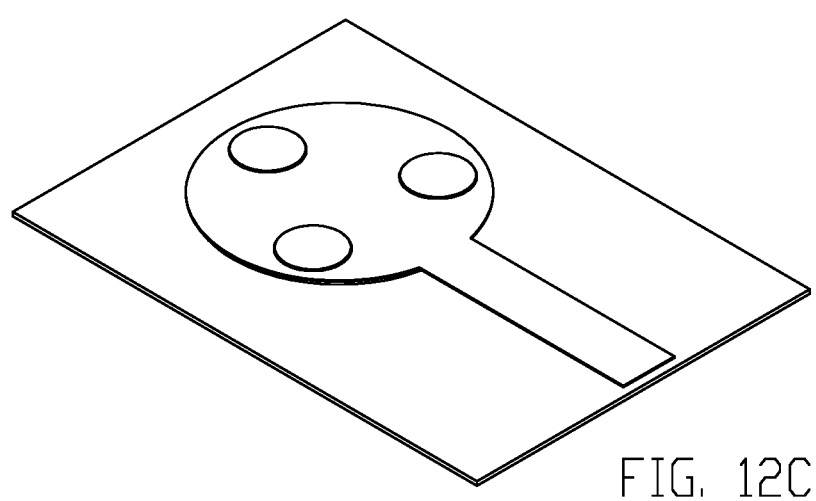
Figure 12D:
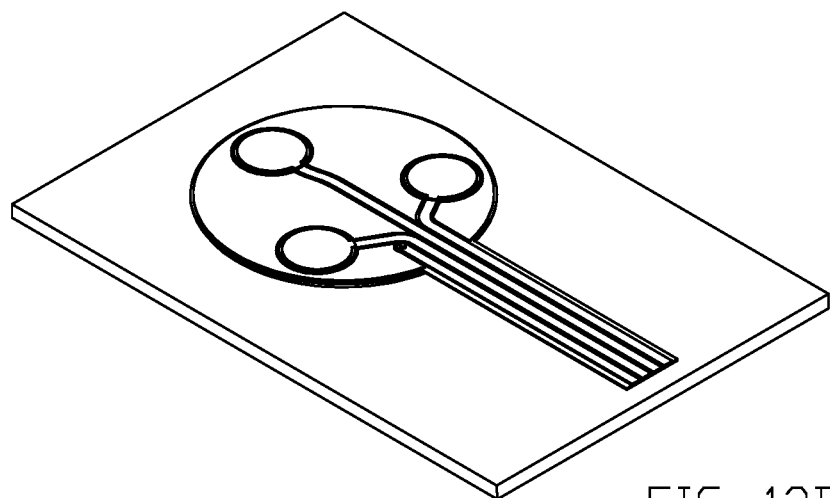
Figure 12E:
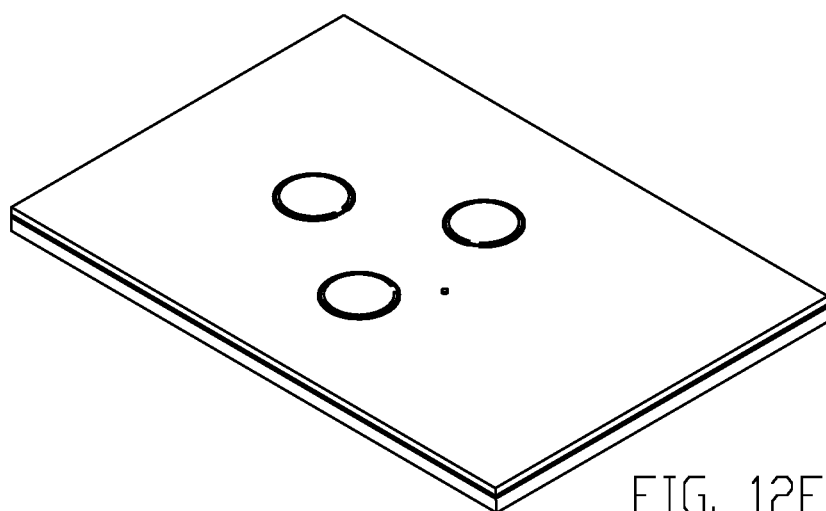
Figure 12F:
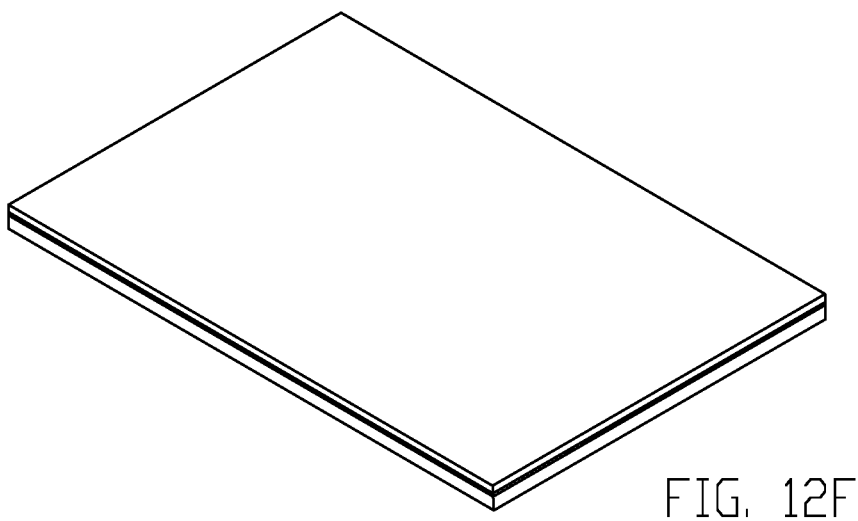
Figure 12G:
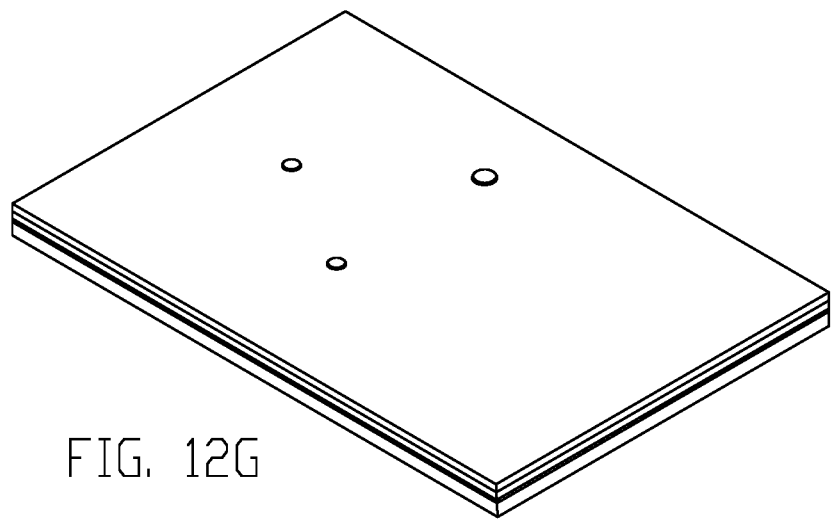
Figure 12H:
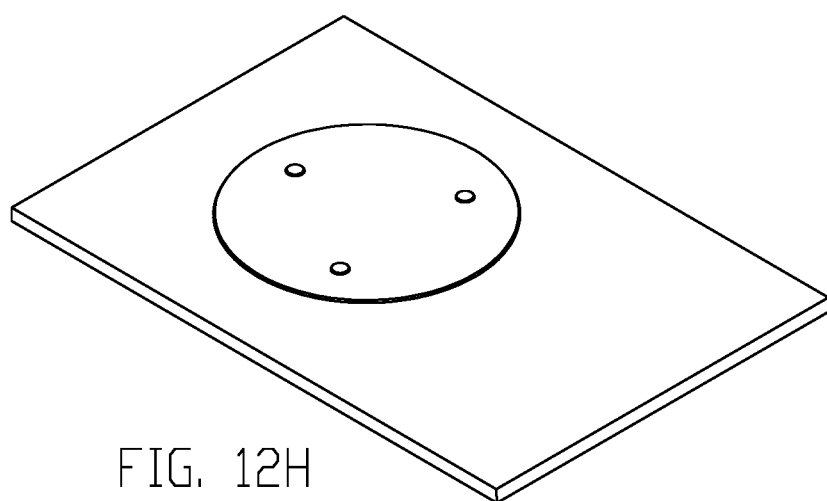
Figure 12I:
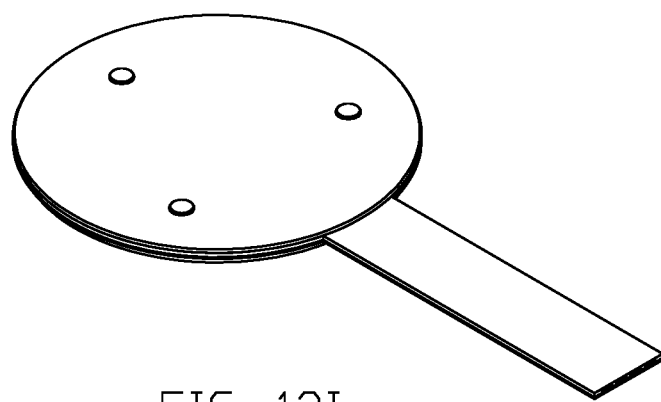

In particular, FIG. 11A shows the stainless steel layer 2050. FIG. 11B shows the stainless steel layer 2050 and the edge 2052. FIG. 11C shows partial etching the stainless steel layer to form mesas for electrodes. FIG. 11D shows applying the polymer layer 2054. FIG. 11F shows forming electrodes on mesas and traces to electrodes. FIG. 11I shows a conductive via 2056 through an opening and applying an adhesive layer and forming a via opening. FIG. 11J shows applying an upper stainless steel layer. FIG. 11K shows the upper stainless steel layer 2058. FIG. 11L shows partial etching the stainless steel layer to form buttons. FIG. 11O shows removing excess from the upper layer. FIG. 12A shows the base stainless steel. FIG. 12B shows the optional step of partial etching the stainless steel. FIG. 12C shows coating/etching the dielectric layer. FIG. 12D shows sputtering the seed layer and plating conductors. FIG. 12E shows laminating pre-cut sheet adhesive. FIG. 12F shows laminating top stainless steel and curing adhesive/epoxy. FIG. 12G shows partial etching force concentrator features. FIG. 12H shows etching stainless steel layers. FIG. 12I shows laser cutting sheet adhesive to final shape.

Figure 13A:
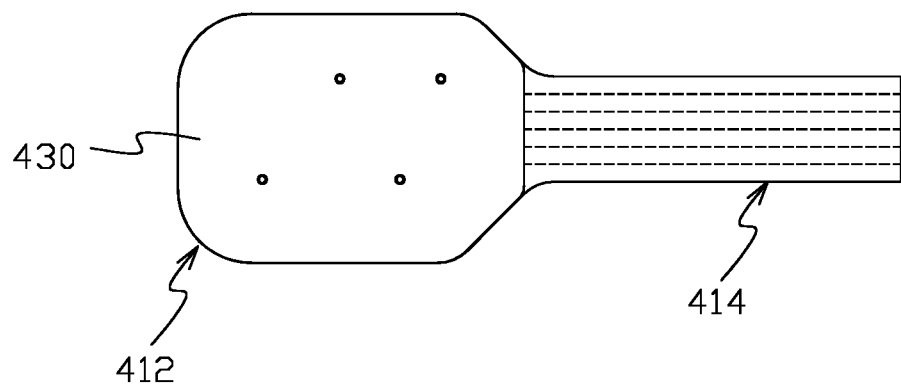
FIGS. 13A, B, C, D, E and F are top, bottom, side, distal end and proximal end views of a cluster sensor in accordance with other embodiments of the invention.
Figure 13B:
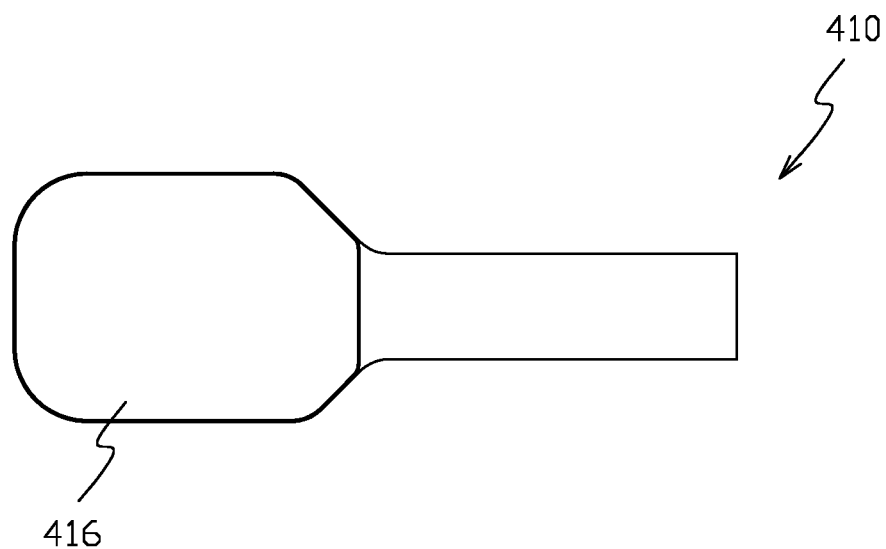
Figure 13D:
Figure 13C:
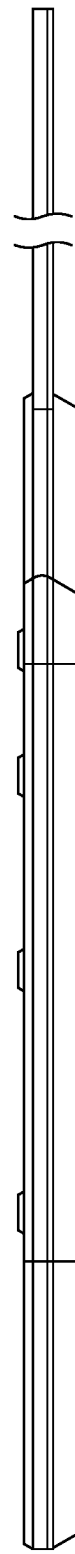
Figure 13E:
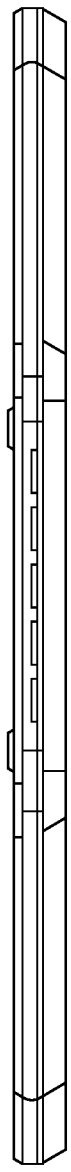
Figure 13F:
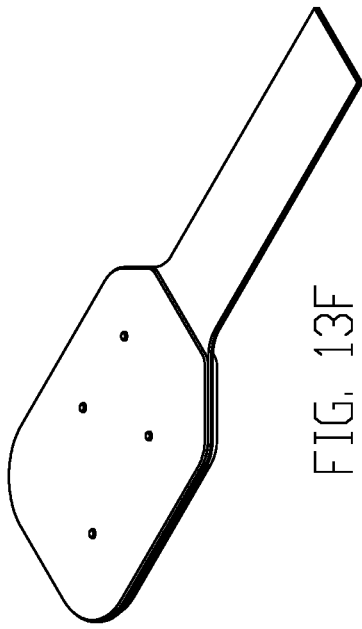

FIGS. 13A, B, C, D, E and F are top, bottom, side, distal end and proximal end views of a cluster sensor 410 in accordance with embodiments of the invention. Similar to sensor 310, sensor 410 includes multiple (i.e., four) sensors similar in structure and operation to those of sensors 210 that are integrated into a common diaphragm structure 412 and lead structure 414. Features of at least some of the individual sensors in the sensor 410 have different sizes (e.g., diameters and/or thicknesses), enabling the different sensors to operate at different sensitivities. Certain features of sensor 410 that are similar to those of sensor 210 are indicated by similar reference numbers. Covercoat and/or encapsulation layers such as those described above can be applied over all or parts of the sensor 410. Sensor 410 can be manufactured using processes similar to those described above in connection with sensors 10, 110, 210 and 310.

Figure 14A:
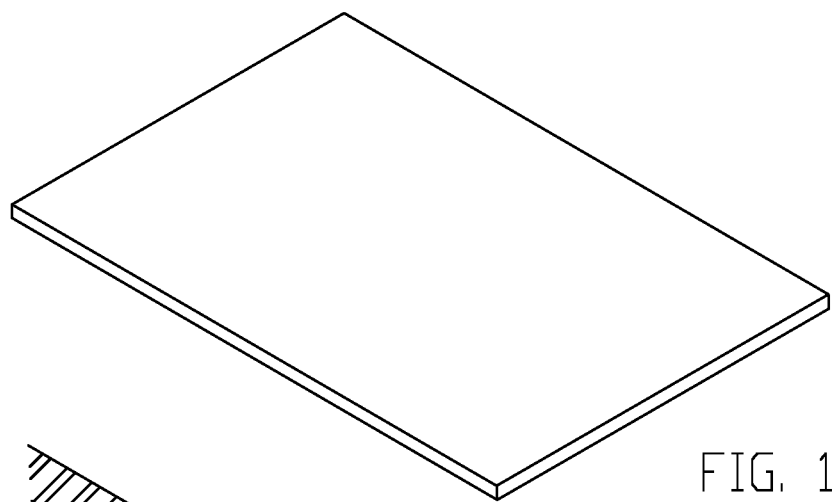
FIGS. 14A-14Q illustrate sequences of process steps that can be used to manufacture embodiments of the sensor.
Figure 14B:
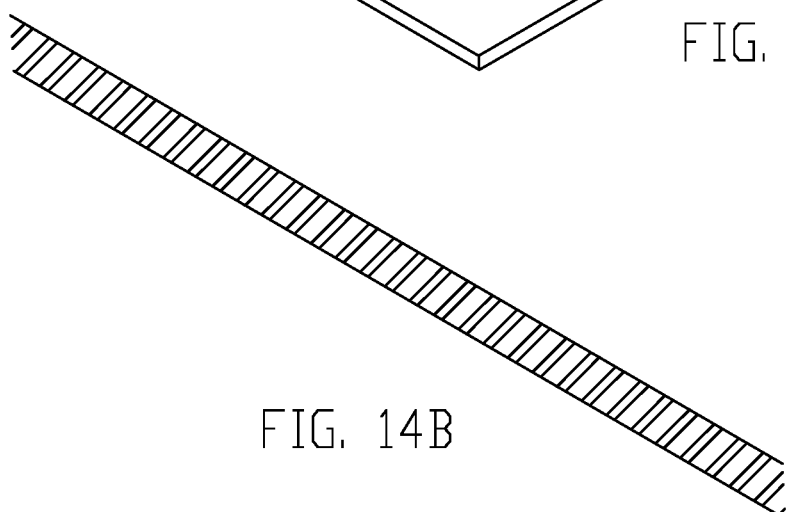
Figure 14C:
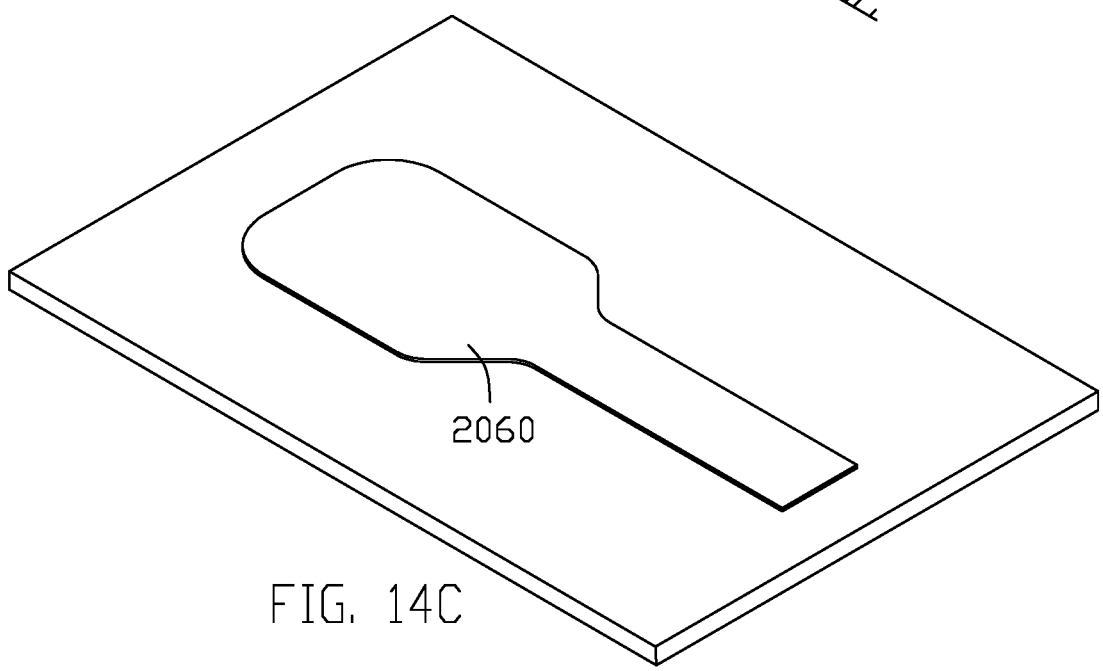
Figure 14D:
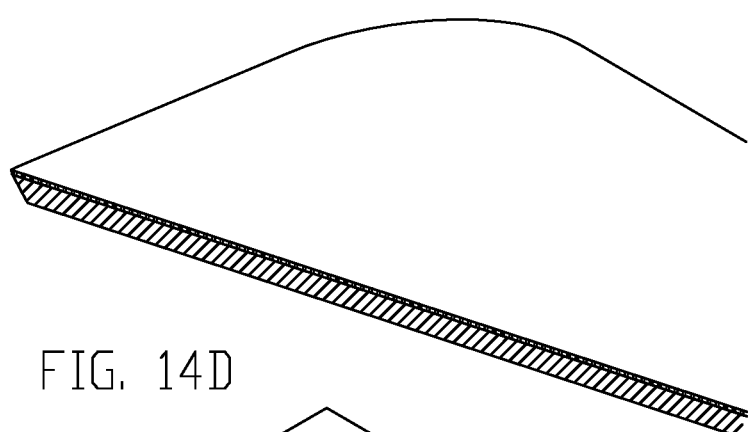
Figure 14E:
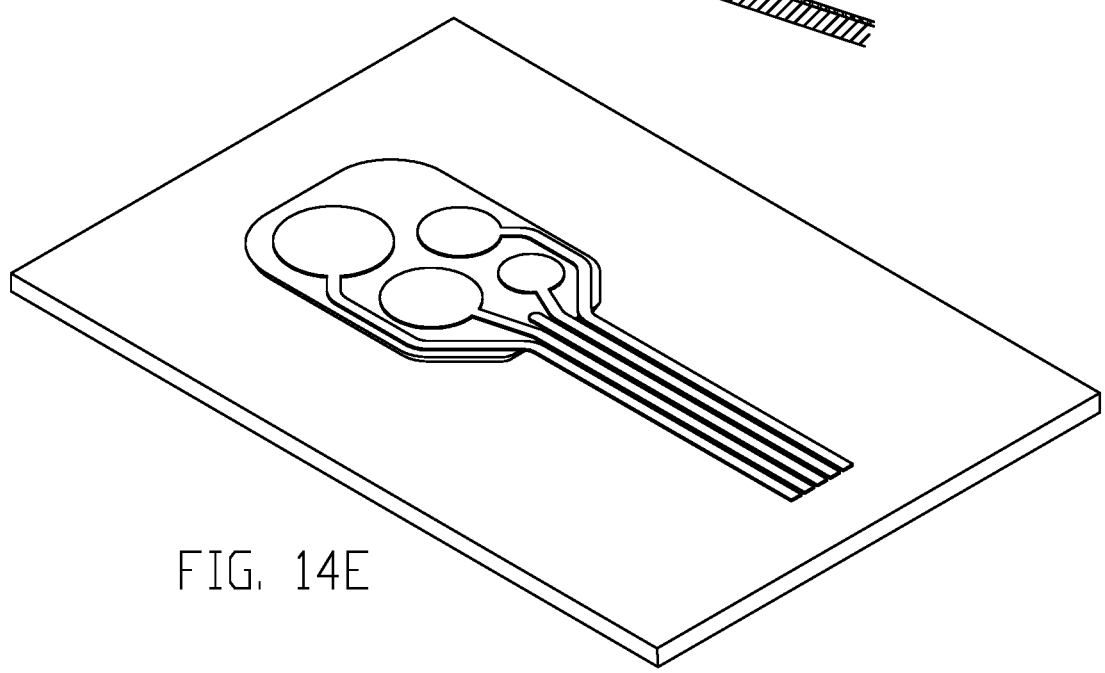
Figure 14F:
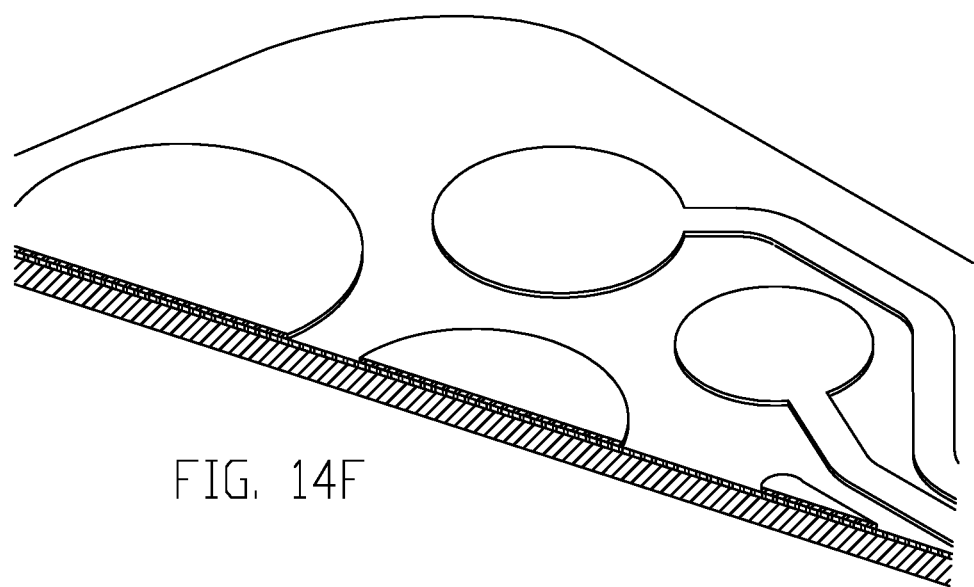
Figure 14G:
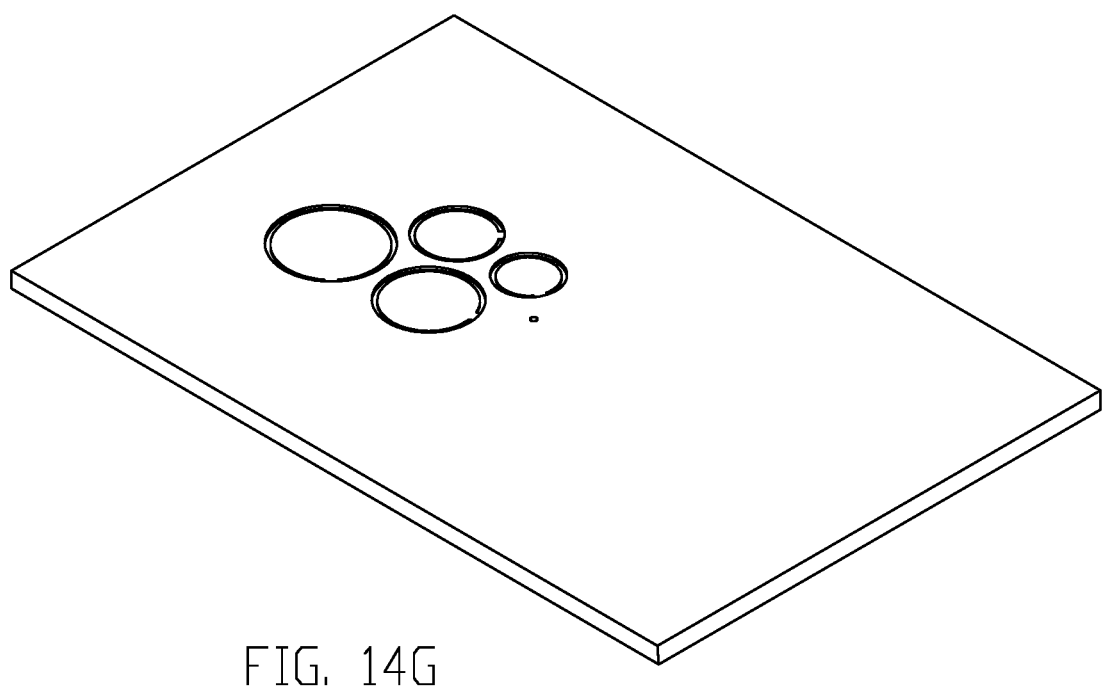
Figure 14H:
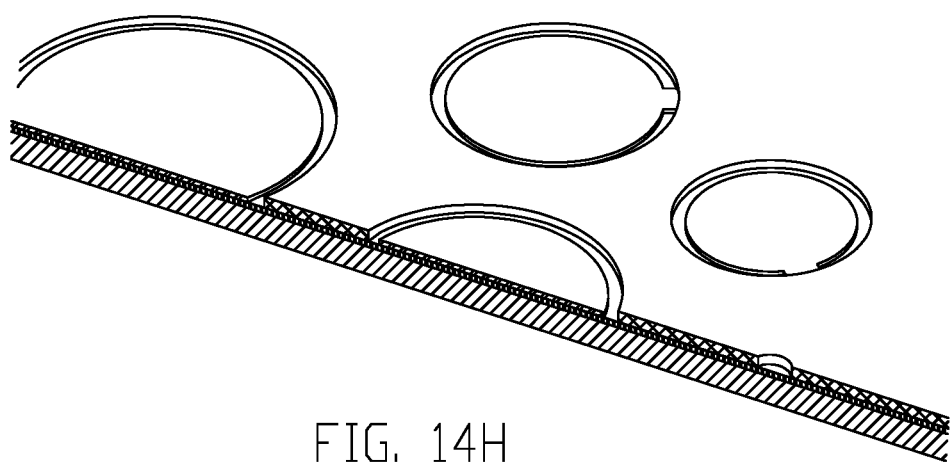
Figure 14I:
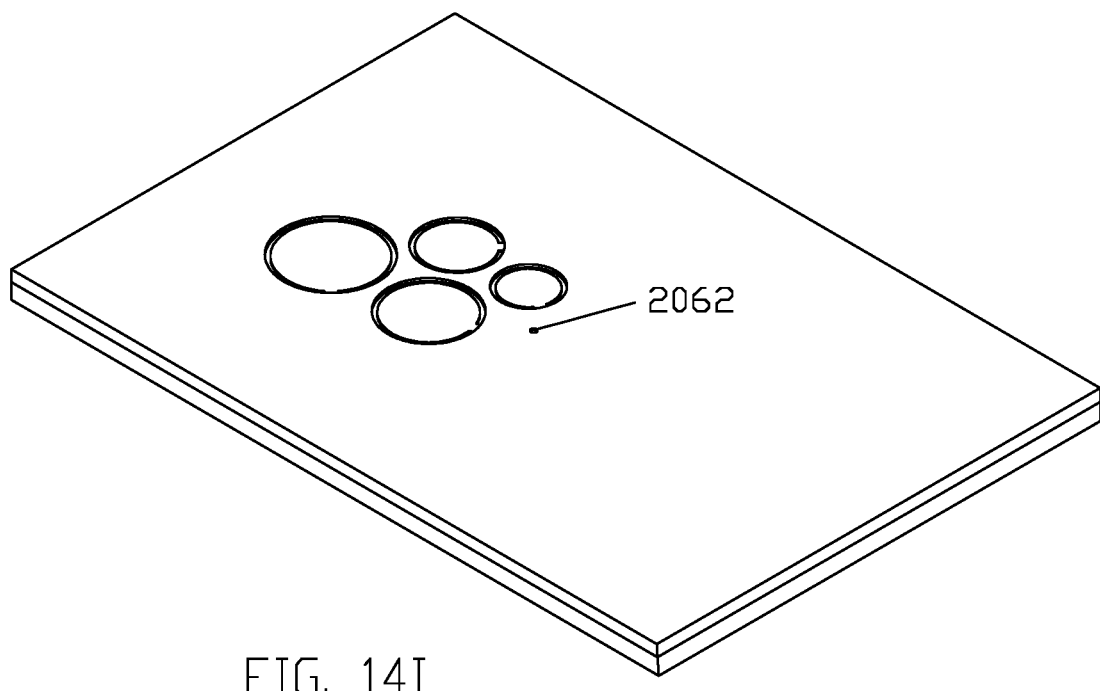
Figure 14J:
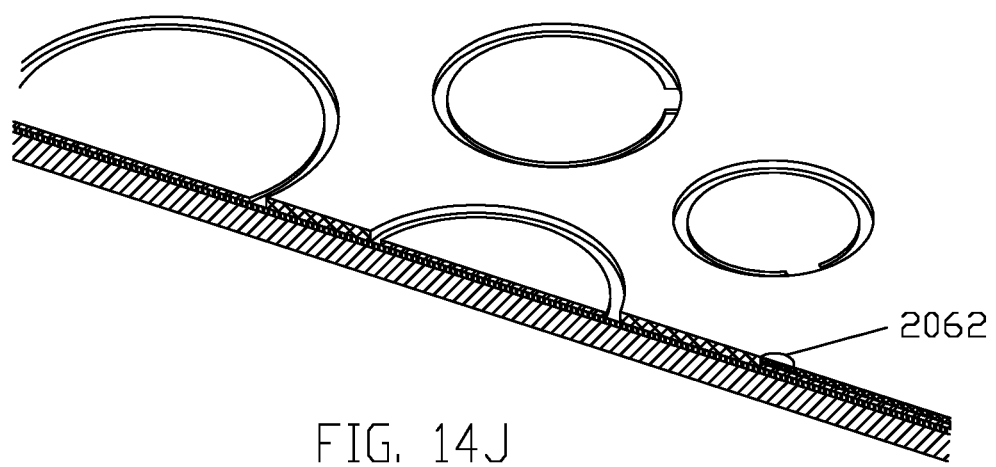
Figure 14K:
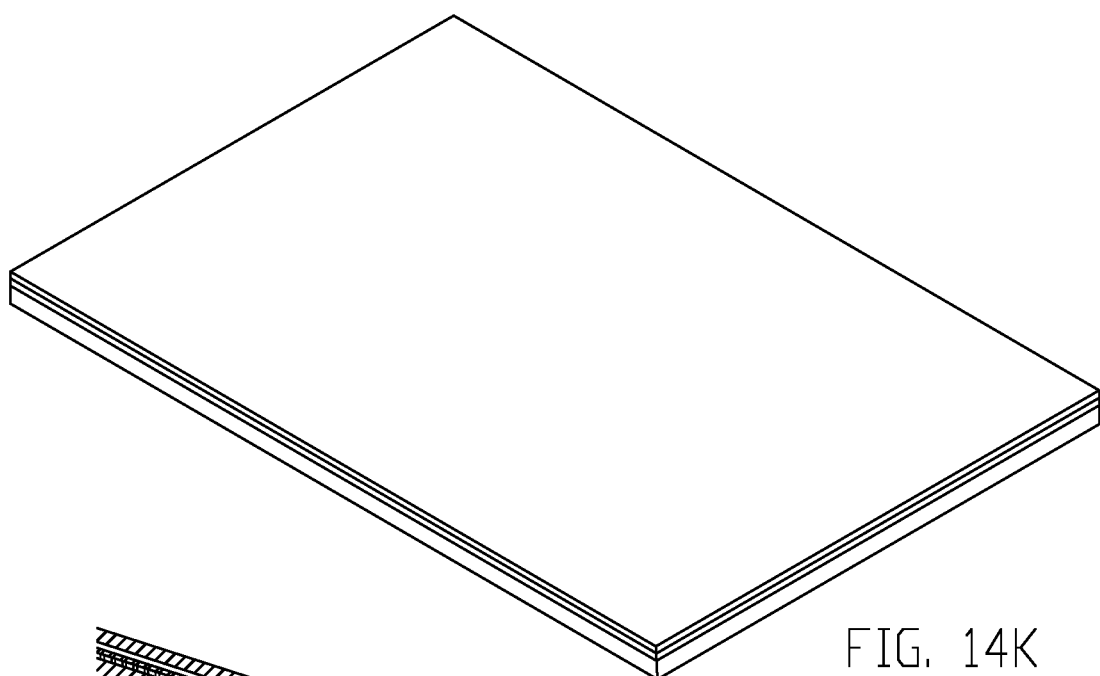
Figure 14L:
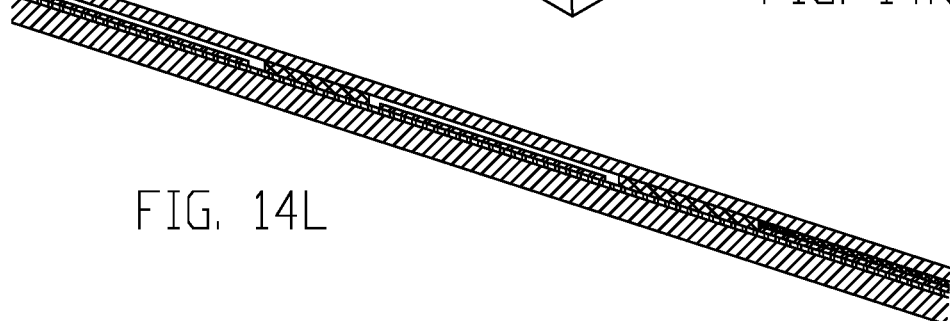
Figure 14M:
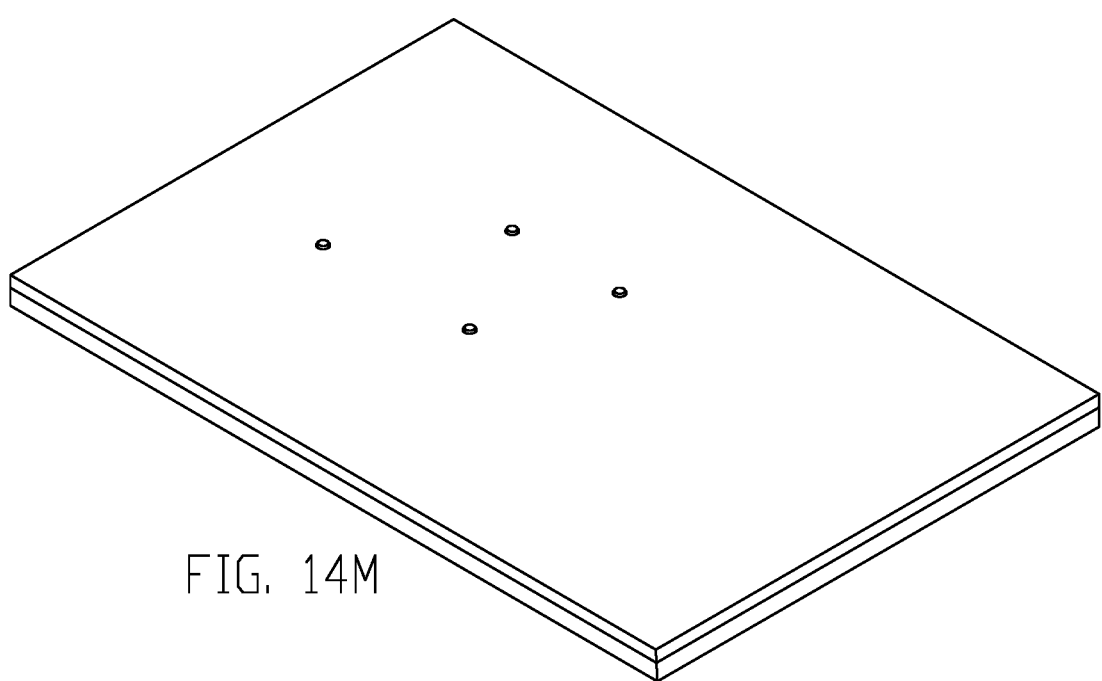
Figure 14N:
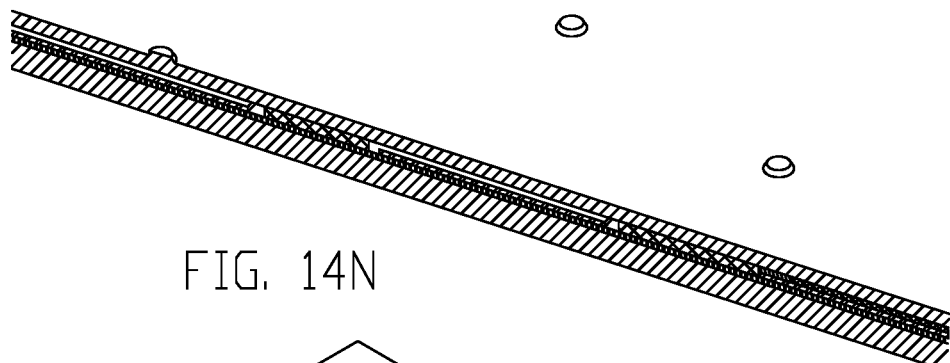
Figure 14O:
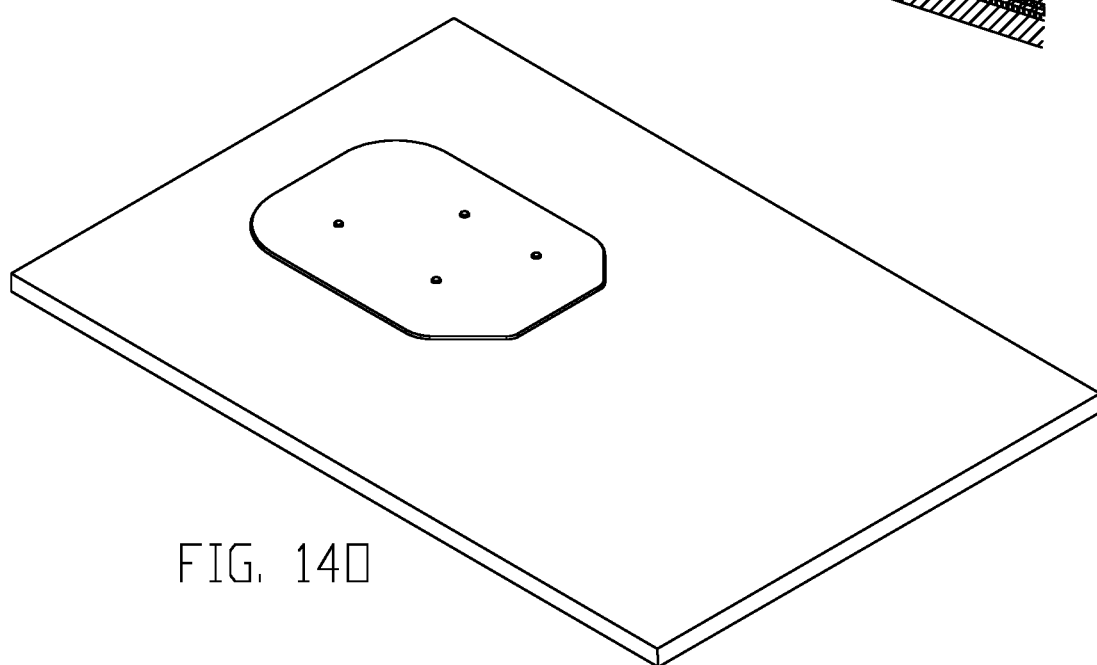
Figure 14P:
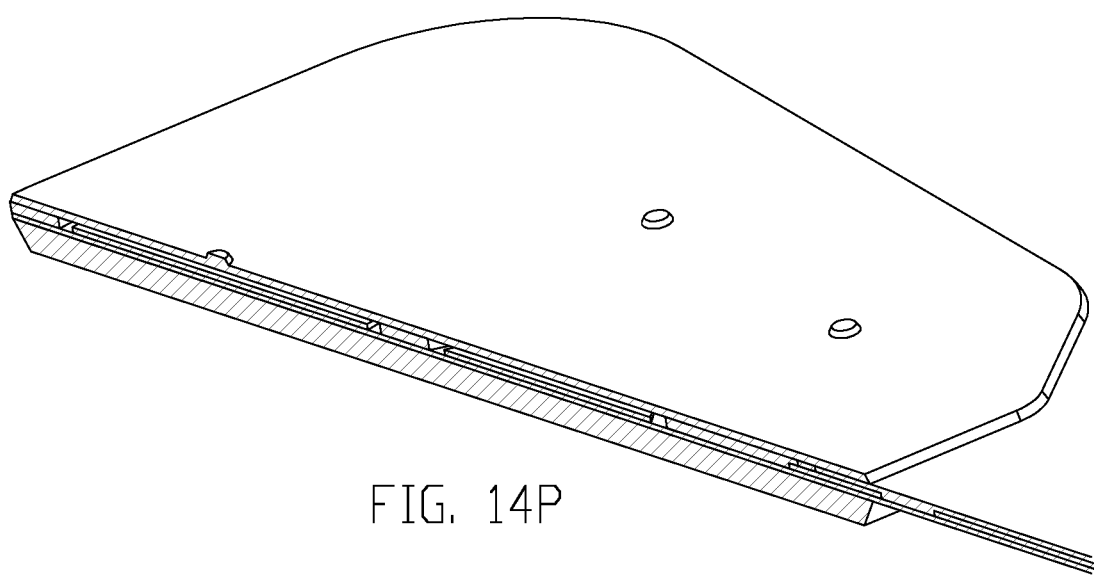
Figure 14Q:
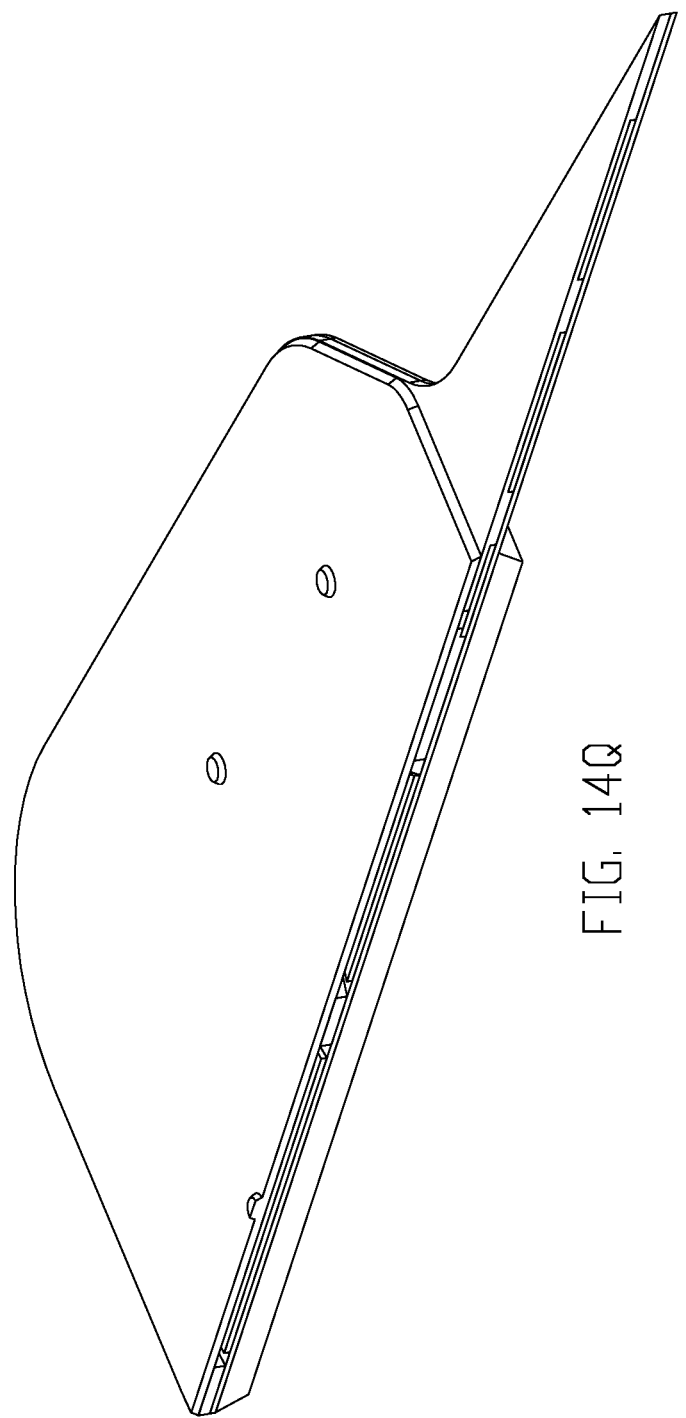
Figure 15A:
FIGS. 15A-15J illustrate sequences of process steps that can be used to manufacture embodiments of the sensor.
Figure 15B:
Figure 15C:
Figure 15D:
Figure 15E:
Figure 15F:
Figure 15G:
Figure 15H:
Figure 15I:
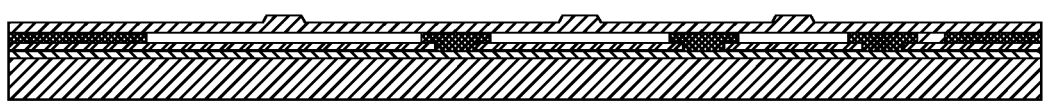
Figure 15J:
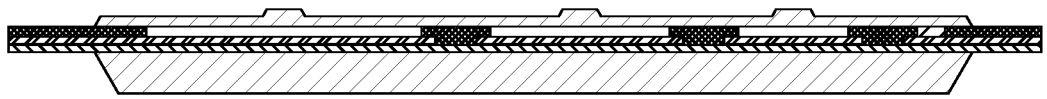

FIGS. 14A-14Q and 15A-15J illustrate sequences of process steps that can be used to manufacture embodiments of sensor 410. In particular, FIGS. 14A and 14B illustrate the stainless steel layer. FIG. 14C shows applying the polymer layer 2060. FIG. 14E shows forming electrodes and traces. FIG. 14G shows applying the adhesive layer and forming via openings. FIG. 14I shows a via contact 2062 and plating the via contact. FIG. 14J shows the via contact 2062. FIG. 14K shows applying the upper stainless steel layer. FIG. 14M shows partial etching the upper stainless steel layer. FIG. 14O shows removing excess upper stainless steel layer and lower stainless steel layer. FIG. 15A shows the base stainless steel. FIG. 15B shows coating the dielectric layer. FIG. 15C shows sputtering the seed layer. FIG. 15D shows plating conductors. FIG. 15E shows etching the seed layer. FIG. 15F shows laminating pre-cut sheet adhesive. FIG. 15G shows applying conductive epoxy to the via hole. FIG. 15J shows etching stainless steel and laser cutting sheet adhesive.

Figure 16A:
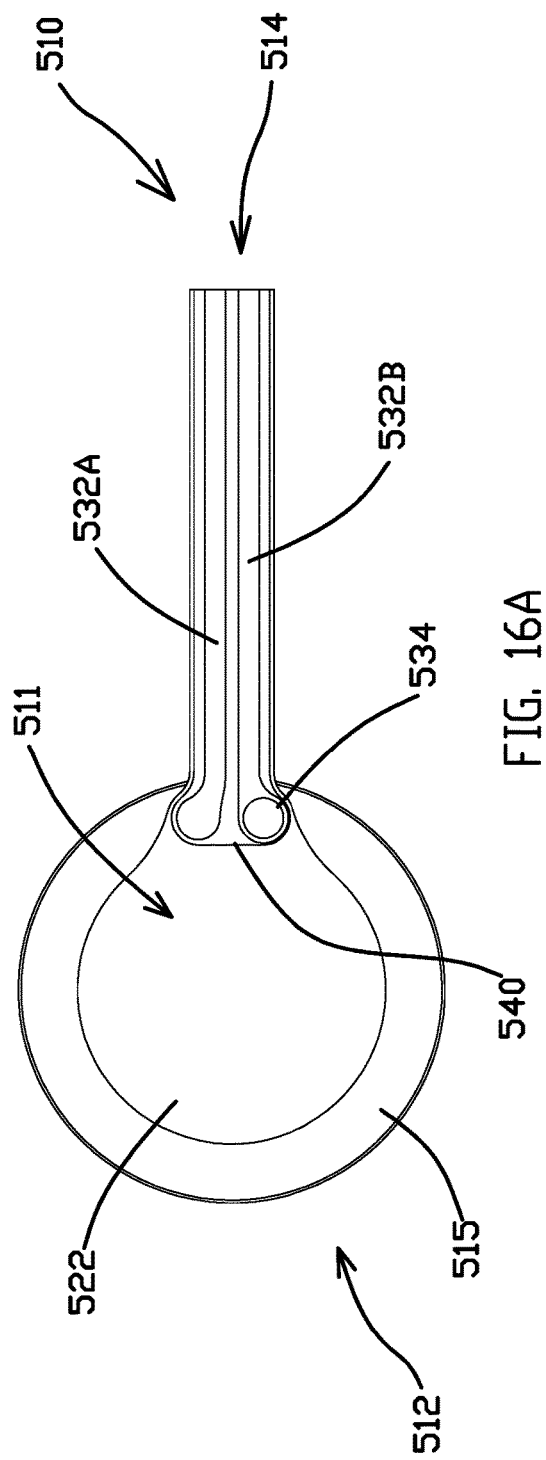
FIGS. 16A, B, C, D, E and F are top, bottom, side, distal end, proximal end and detailed sectional isometric views of another sensor in accordance with embodiments of the invention.
Figure 16B:
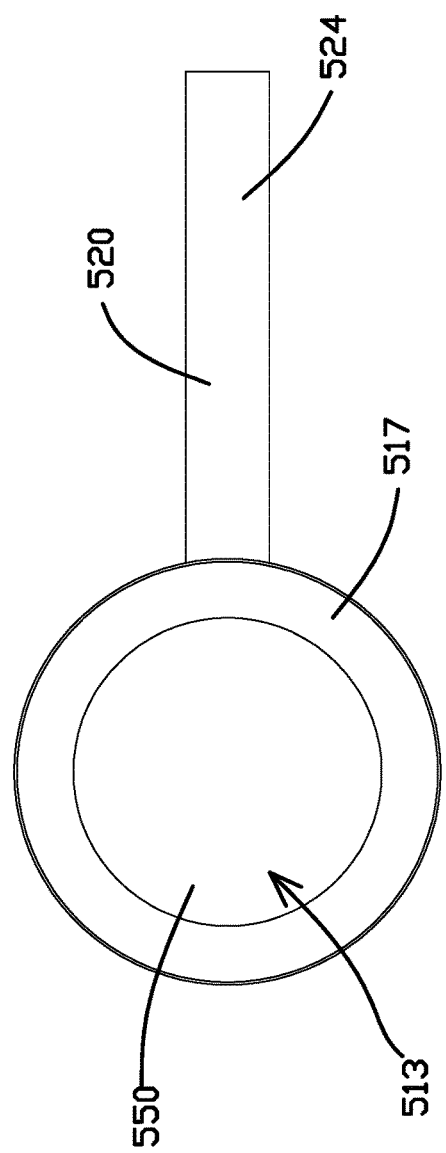
Figure 16E:
Figure 16C:
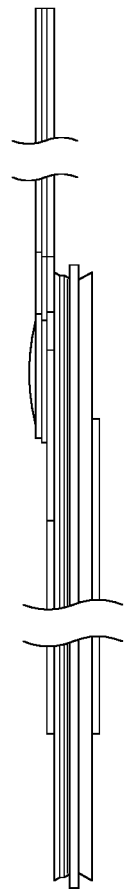
Figure 16D:
Figure 16F:
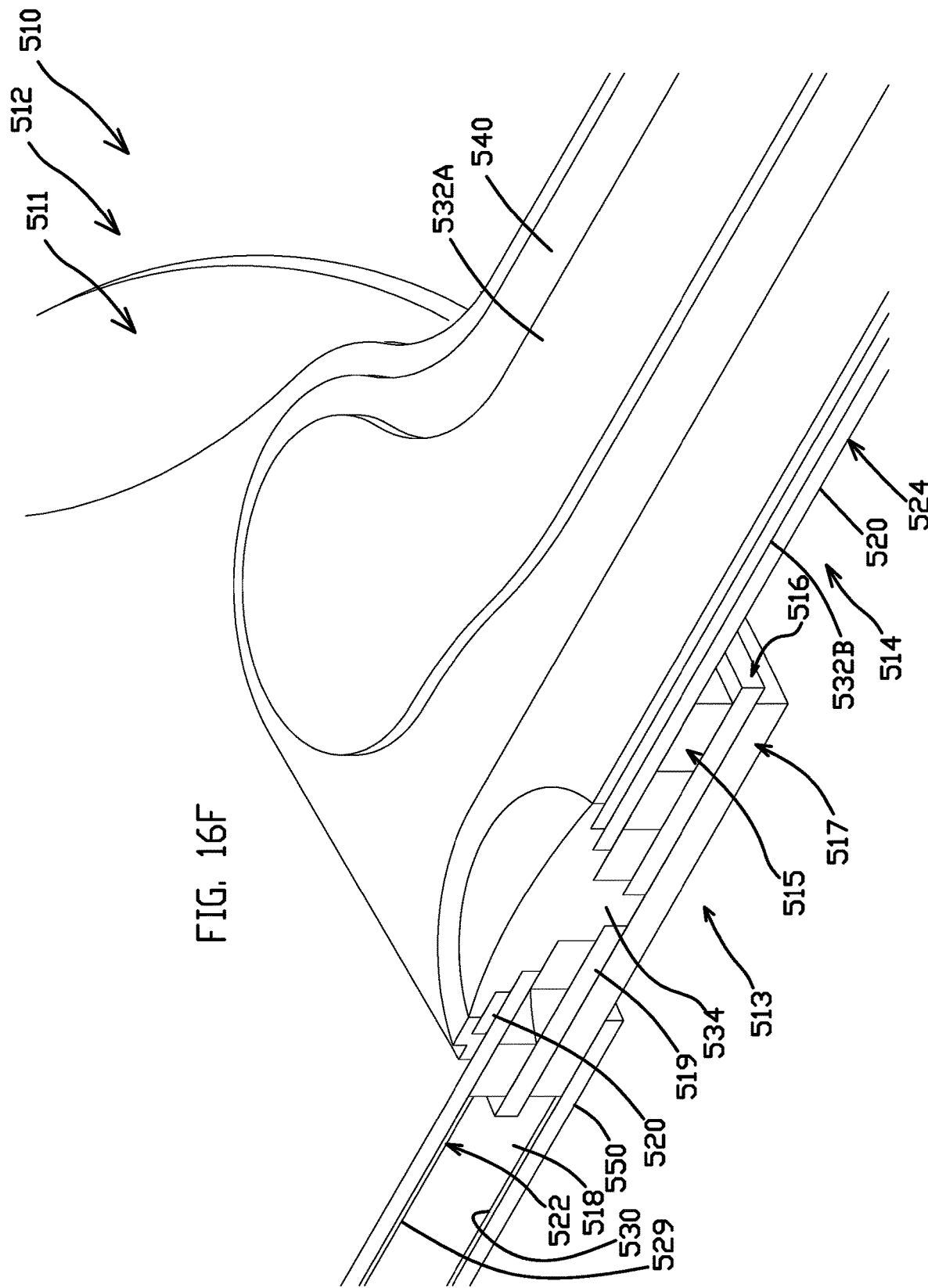

FIGS. 16A, B, C, D, E and F are top, bottom, side, distal end, proximal end and detailed sectional isometric views of a sensor 510 in accordance with embodiments of the invention. Sensor 510 is a dual diaphragm device having an adhesive spacer with interior seed layer encapsulation and electrodes. Sensor 510 is similar to sensor 110, and similar features are identified with similar reference numbers. As shown, the sensor 510 includes a diaphragm structure 512 and an integrated lead structure 514. Diaphragm structure 512, which has a first diaphragm section or portion 511 and a second diaphragm section or portion 513, includes a ring or other shaped base member 516 defining a void region or cavity 518. In the illustrated embodiment the base member 516 is formed from first and second sections 515 and 517, respectively, which can be stainless steel (SST). A flexible and insulating polymer layer 520 includes a first diaphragm portion 522 on the first section 515 of the base member 516 and over cavity 518 (i.e., on a first diaphragm portion 511), and a lead portion 524 on the lead structure 514. The diaphragm portion 522 and lead portion 524 of the polymer layer 520 are common in the illustrated embodiment. A first electrode 529 is located on the first diaphragm portion 511, and is on the side of the polymer layer 520 facing the cavity 518 in the illustrated embodiment. In other embodiments the first electrode 529 is on the side of the polymer layer 520 opposite the cavity 518. A first lead or trace 532A extends over the polymer layer 520 from the lead structure 514 to the diaphragm structure 512, where it electrically connects to the first electrode 529 (through the first section 515 of the base member 516). Second lead or trace 532B extends over the polymer layer 520 from the lead structure 514 to the diaphragm structure 512, where it electrically connects to the second section 517 of the base member 116 by a conductive via 534 through the polymer layer 520, first section 515 and adhesive and insulating polymer layer 519. In embodiments, the first electrode 529 is a sputtered metal layer. A polymer or other covercoat or coating layer 540 can be applied over all or portions of the sensor to encapsulate the device. Traces 532A and 532B can include a plated metal layer on the seed layer.

A second diaphragm portion 513 includes an insulating polymer layer 550 on the second section 517 of the base member 516 and over cavity 518. A second electrode 530 is located on the second diaphragm portion 513, and is on the side of the polymer layer 550 facing the cavity 518. The second electrode 530 also extends into contact with the section 517 of the base member 516 in this embodiment. First and second sections 515 and 517 of the base member 516 are joined by the adhesive polymer layer 519. The second electrode 530 is electrically connected to the trace 532B through the via 534 (which includes conductor material 541 such as solder or conductive adhesive). In other embodiments, the second electrode 530 is located on the side of the polymer layer 520 opposite the cavity 518, and is electrically connected to a trace such as 532B by other contact structures. In embodiments, the first diaphragm portion 522 and lead structure 514 are formed separately from the second diaphragm portion 513, and assembled together by joining the sections 515 and 517 of the base member 516 through the use of adhesive polymer layer 519. All or portions of the sensor 510 can be encased or encapsulated (e.g., by sputtering) in a bio-compatible or other material such as Ti and/or SiO2 to prevent or minimize moisture/gas migration into the cavity 518. Alternatively to the covercoat layer 540, or in addition to the covercoat layer or encapsulant layer, a gas and/or moisture barrier can be formed by encapsulation all or portions of the sensor 510 in polymer such as Parylene. Design variables can include the thicknesses and sizes of the base member sections, polymer layers and cover coat.

Figure 17D:
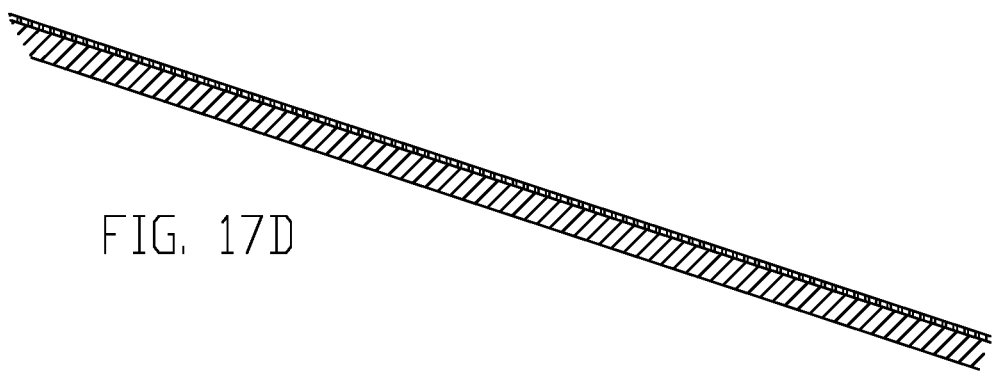
FIGS. 17A-17MM illustrate sequences of process steps that can be used to manufacture embodiments of the sensor.
Figure 17E:
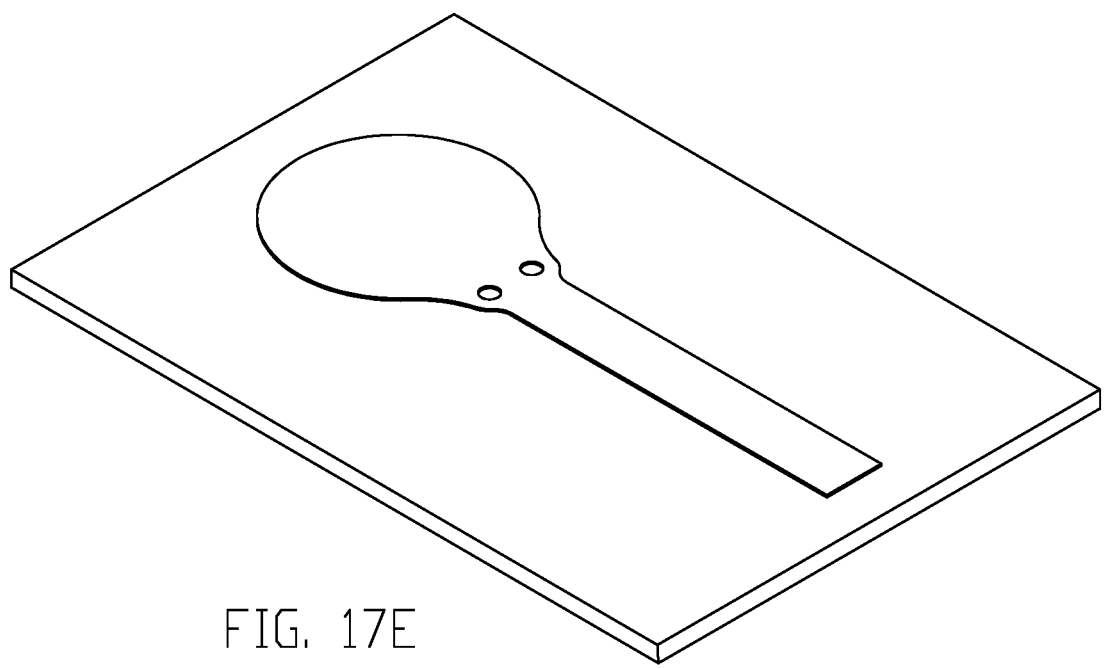
Figure 17F:
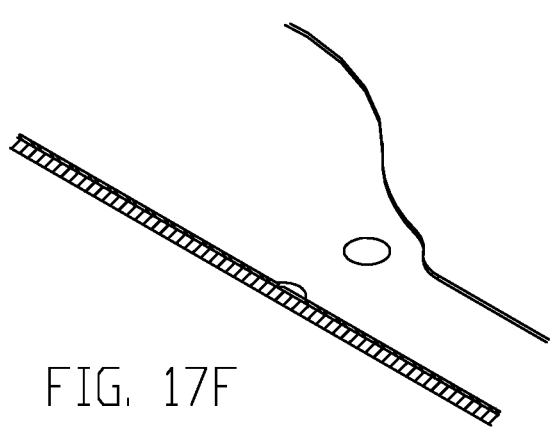
Figure 17G:
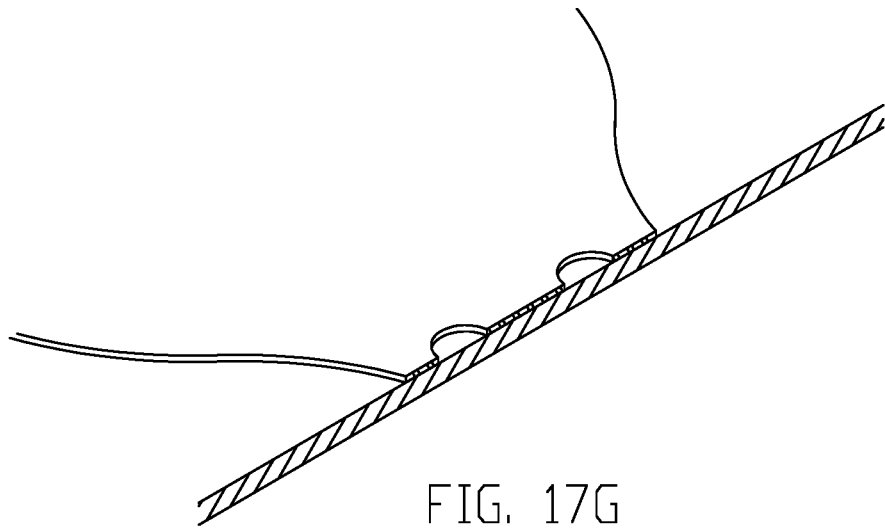
Figure 17H:
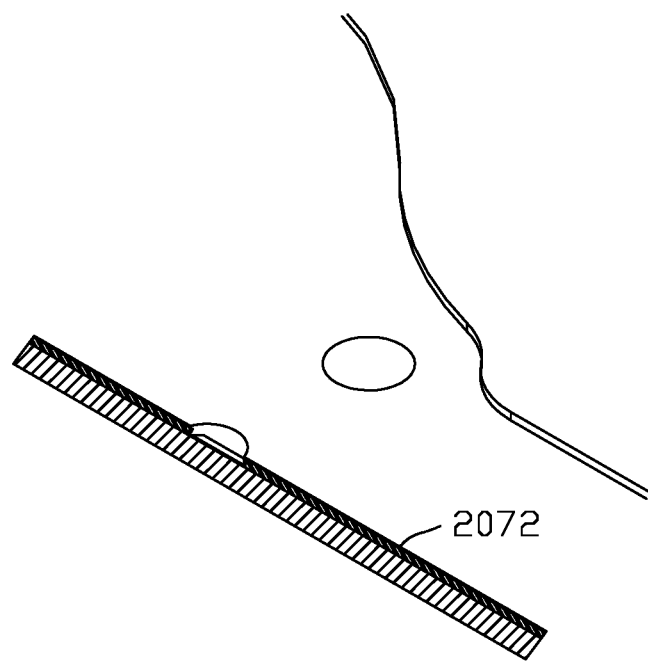
Figure 17I:
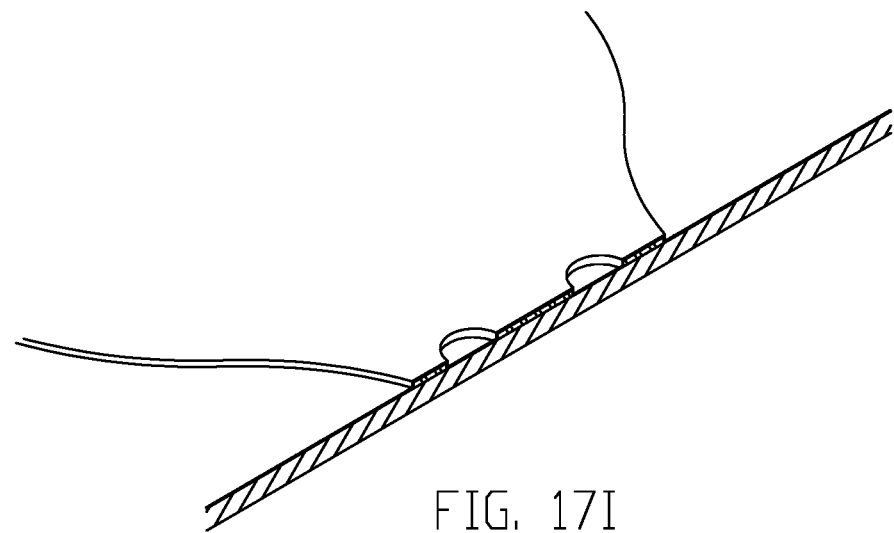
Figure 17J:
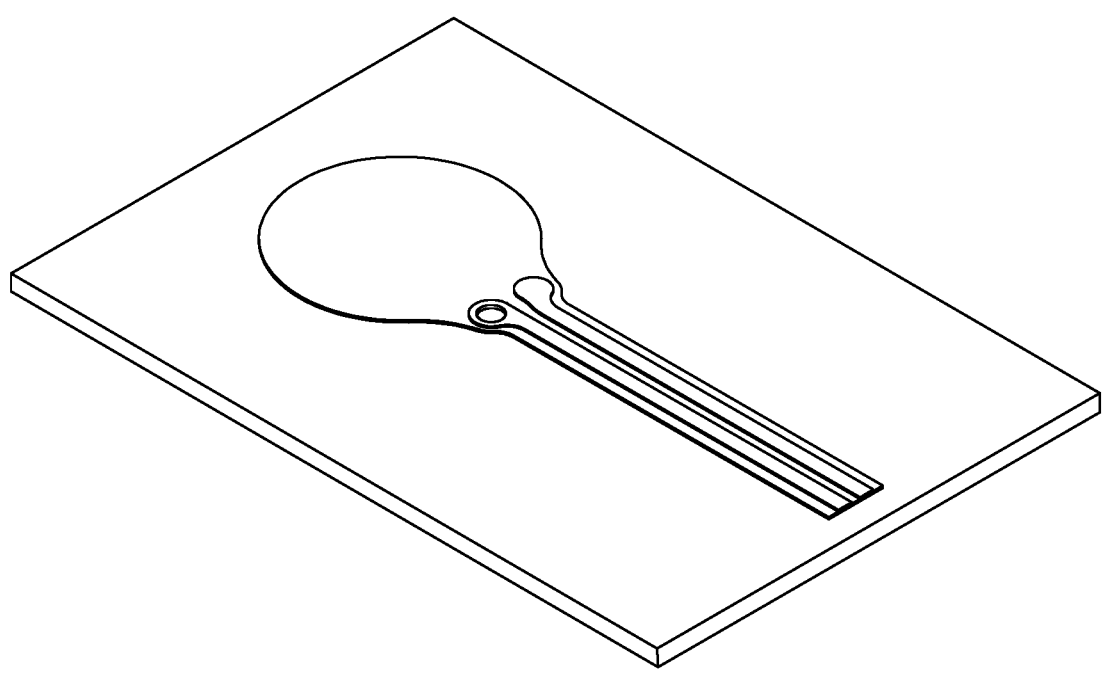
Figure 17K:
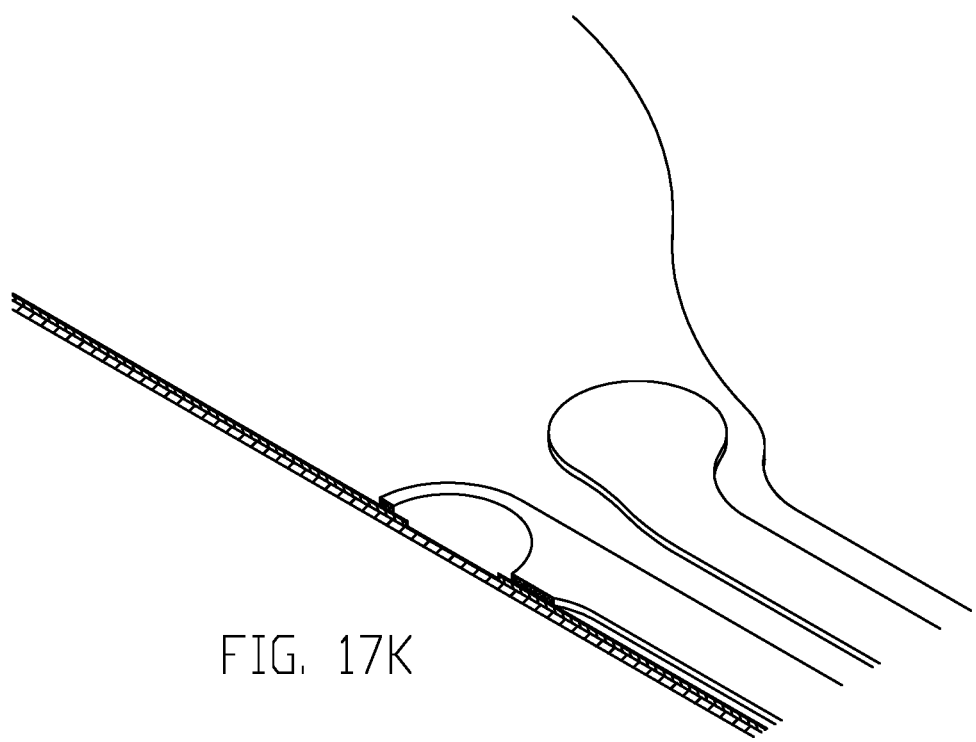
Figure 17L:
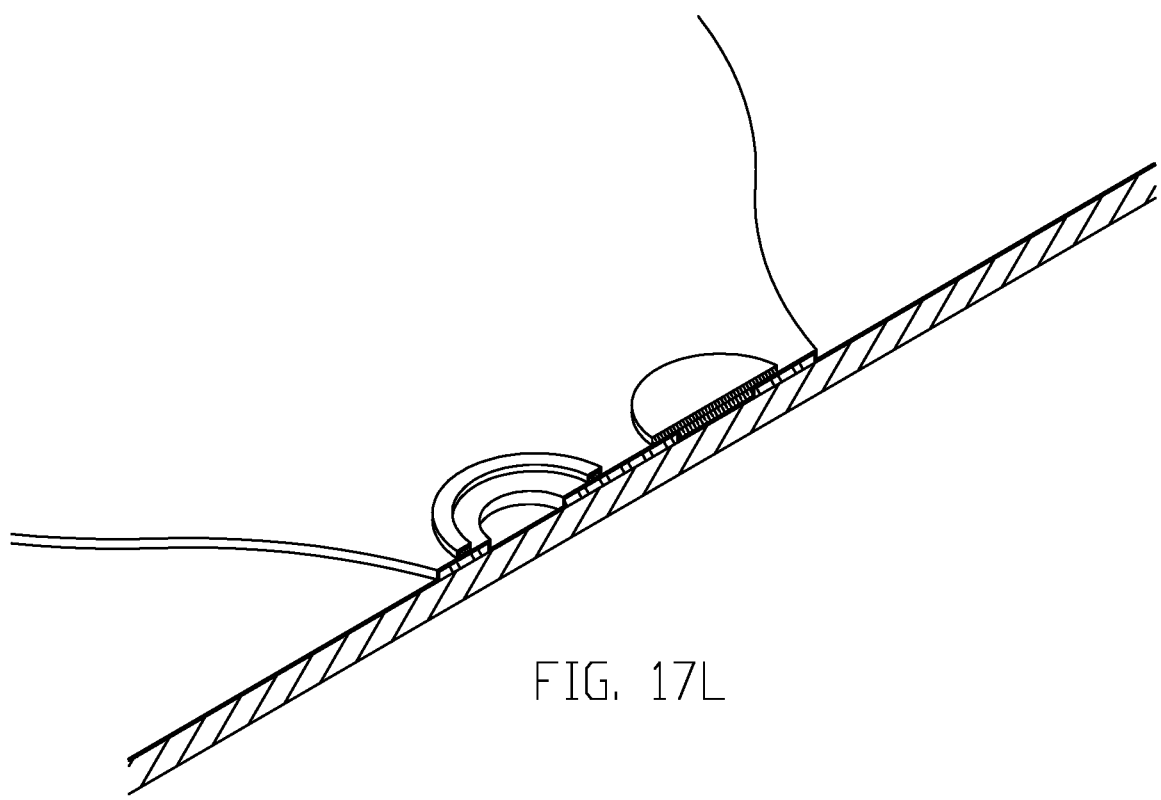
Figure 17M:
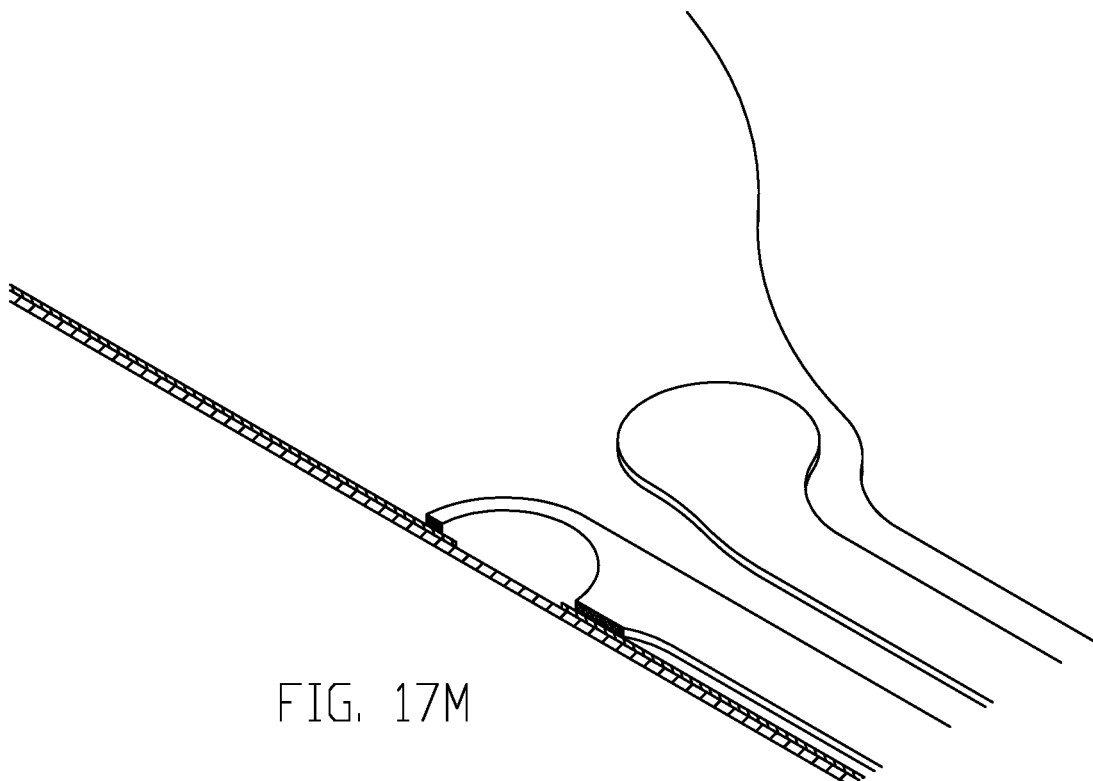
Figure 17N:
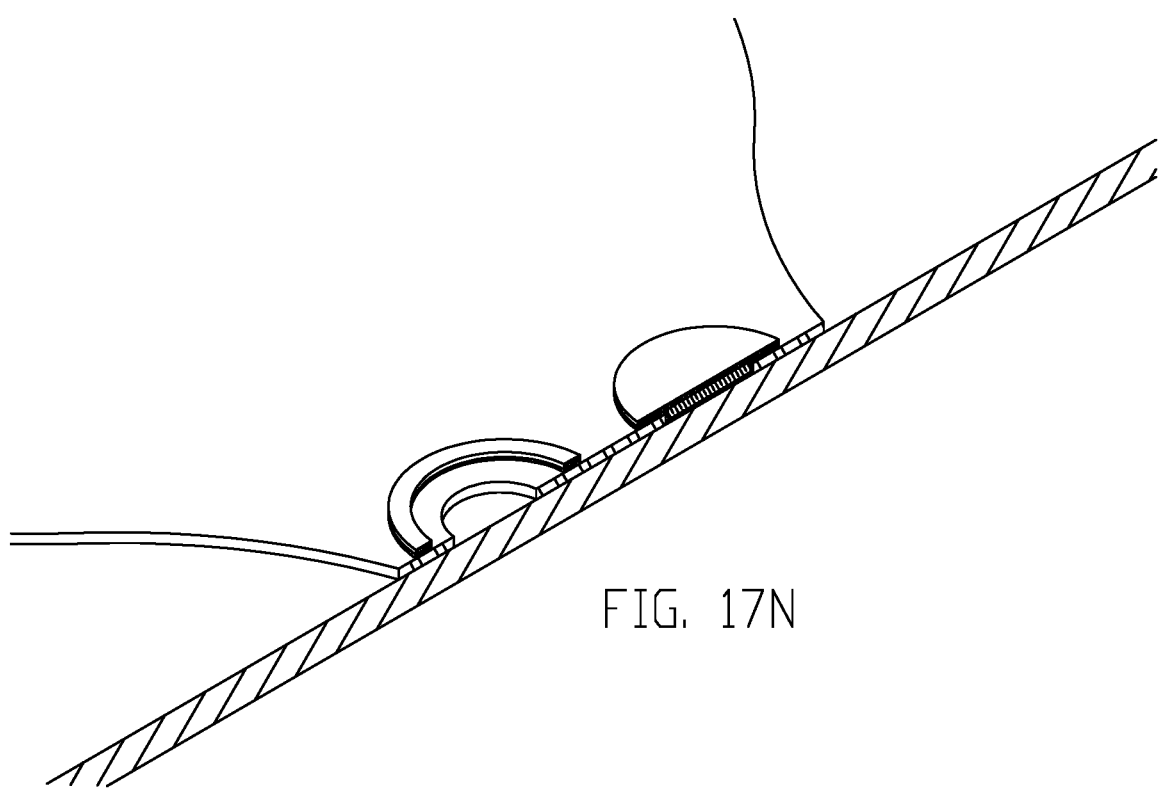
Figure 17O:
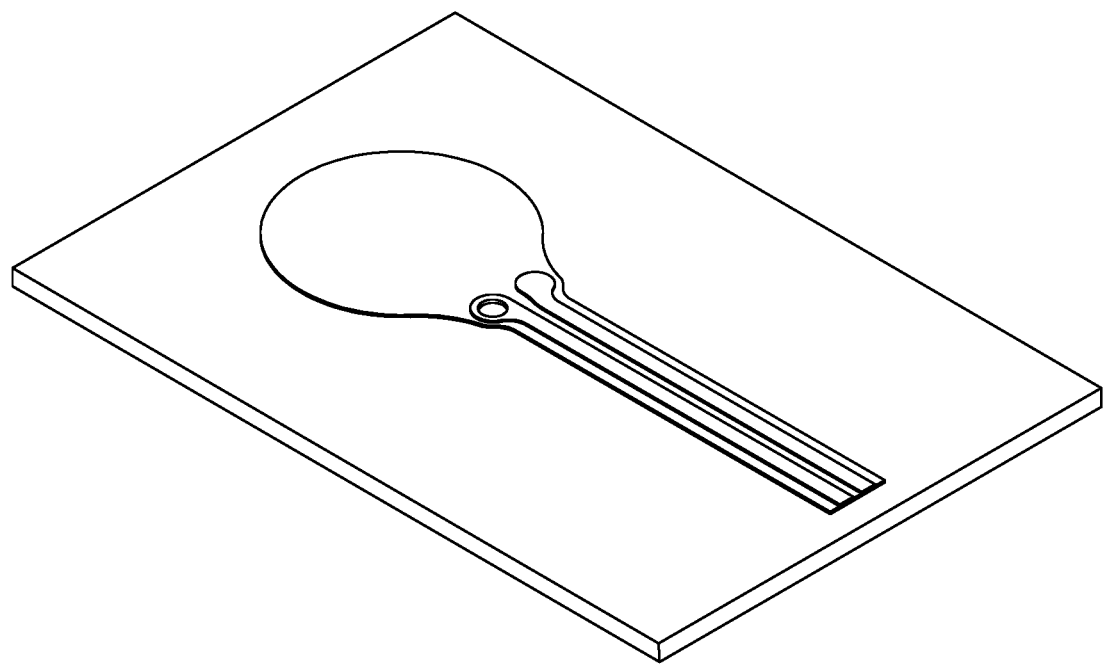
Figure 17P:
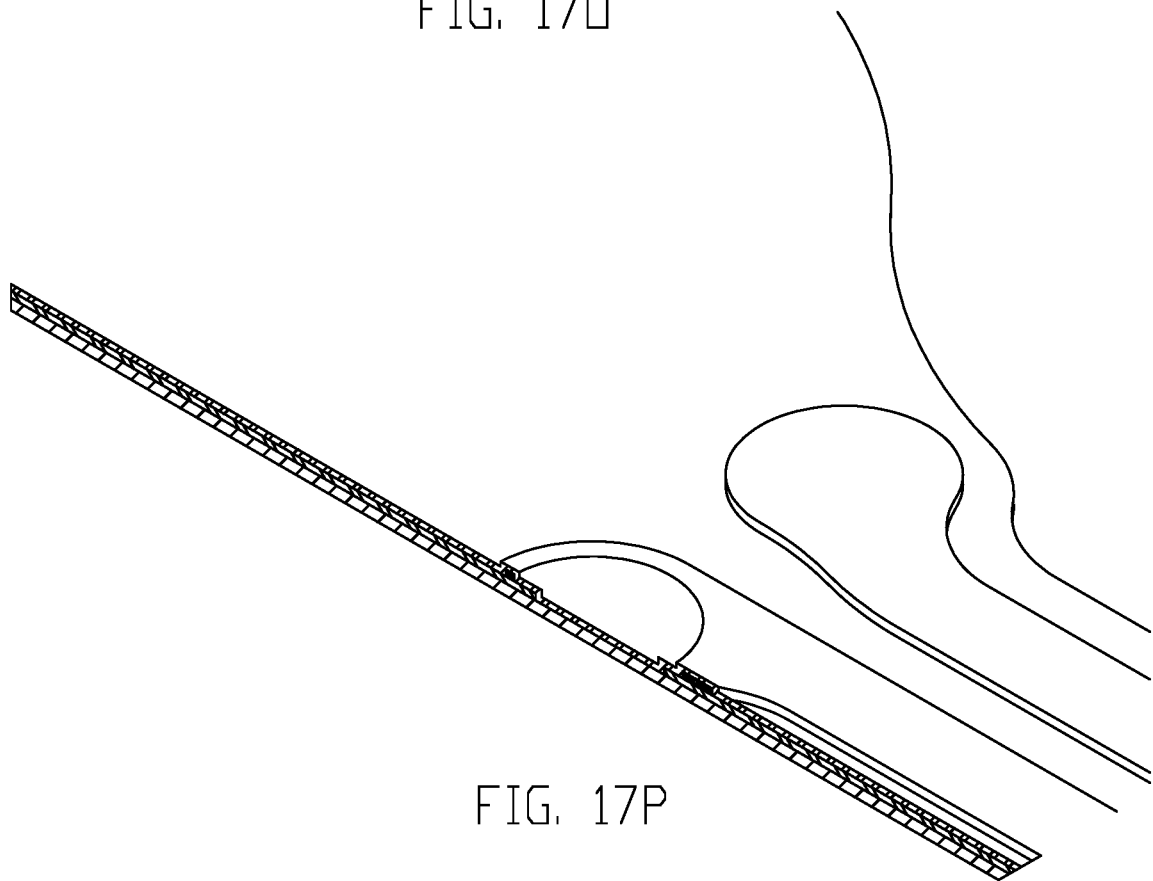
Figure 17Q:
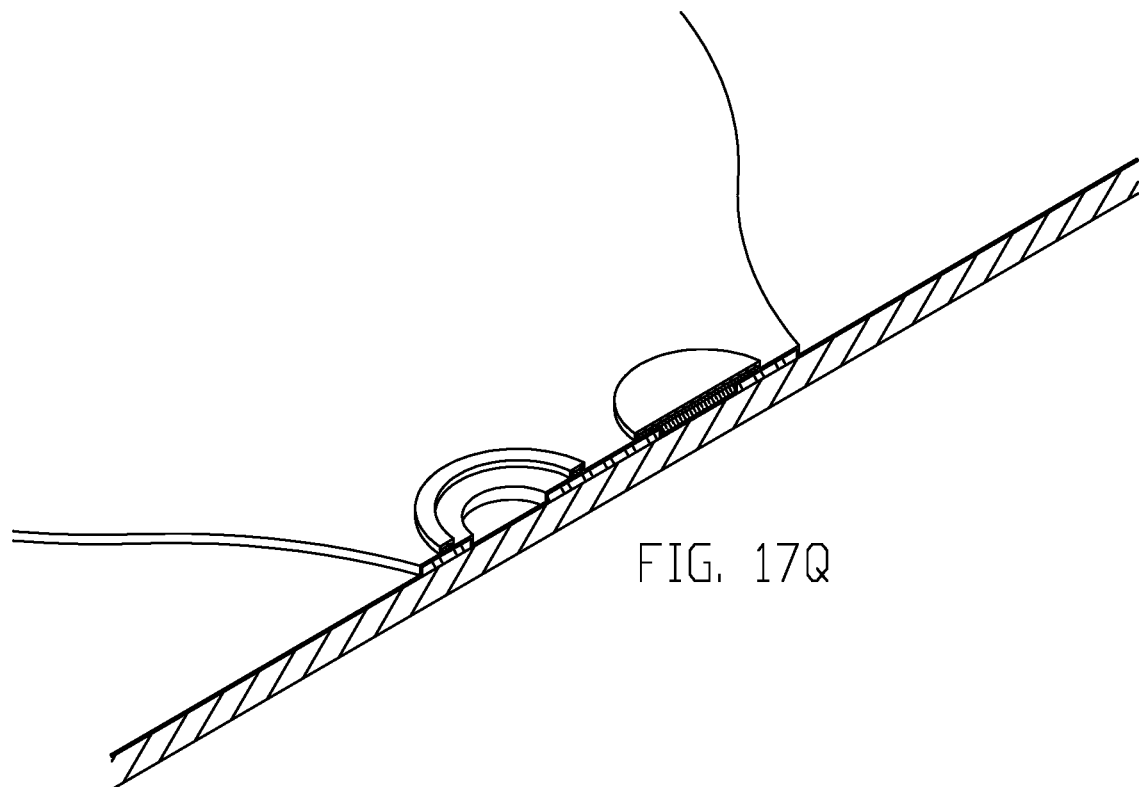
Figure 17R:
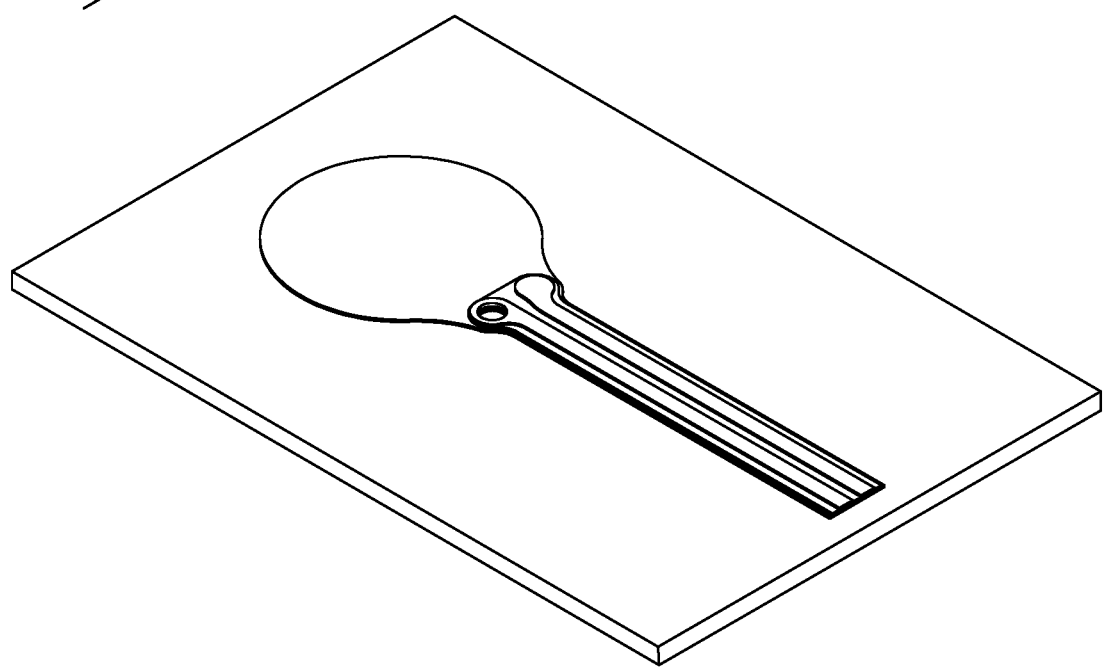
Figure 17S:
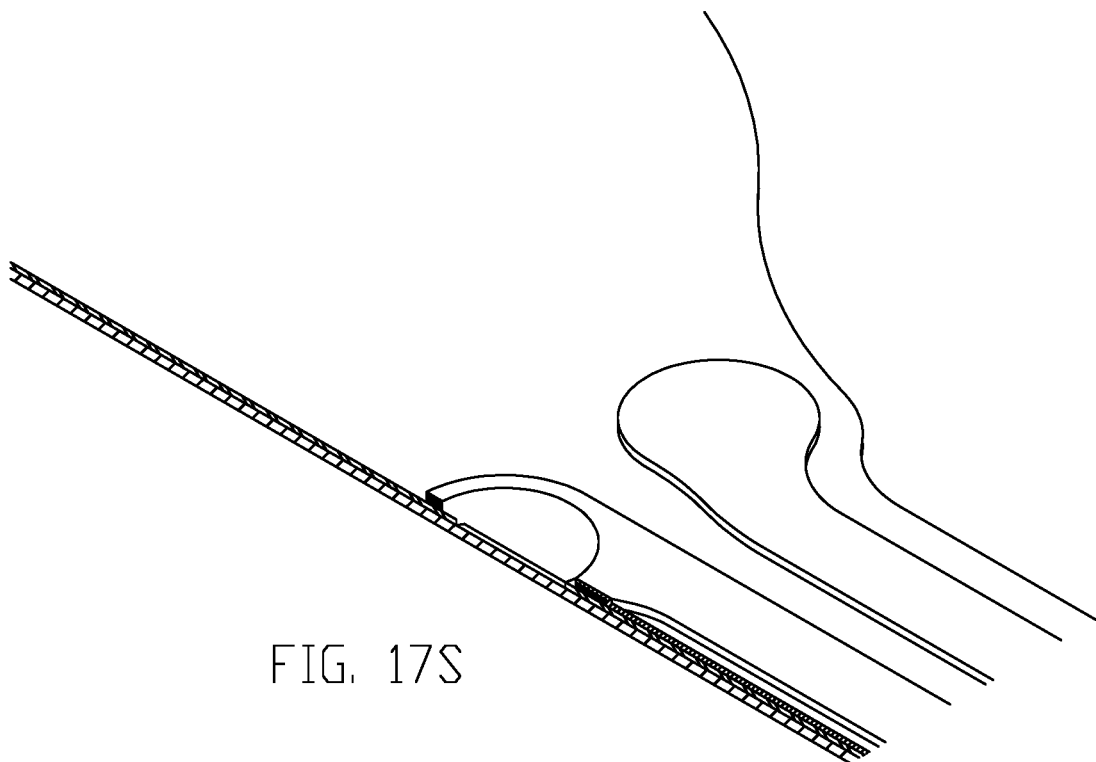
Figure 17T:
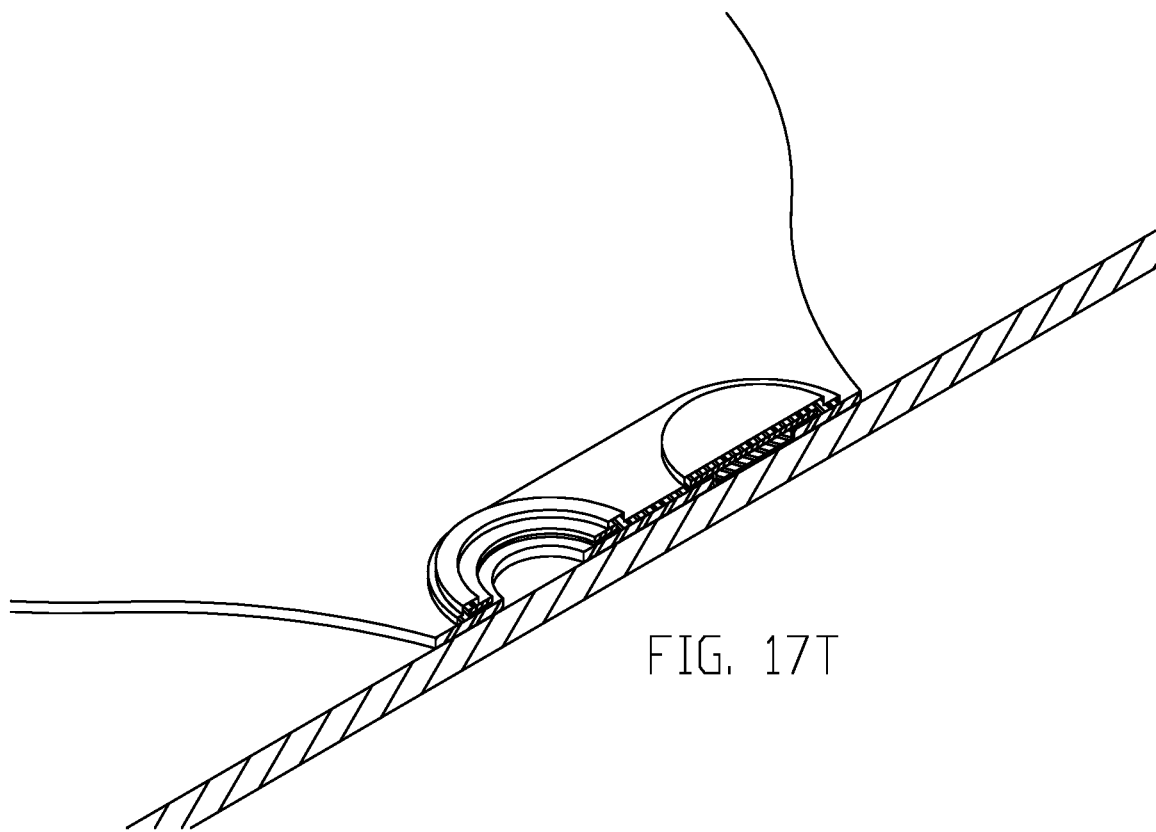
Figure 17U:
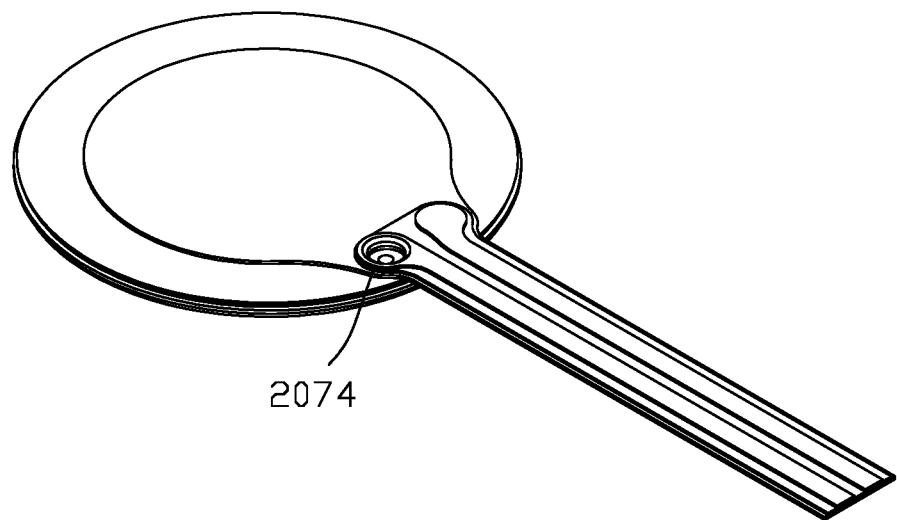
Figure 17V:
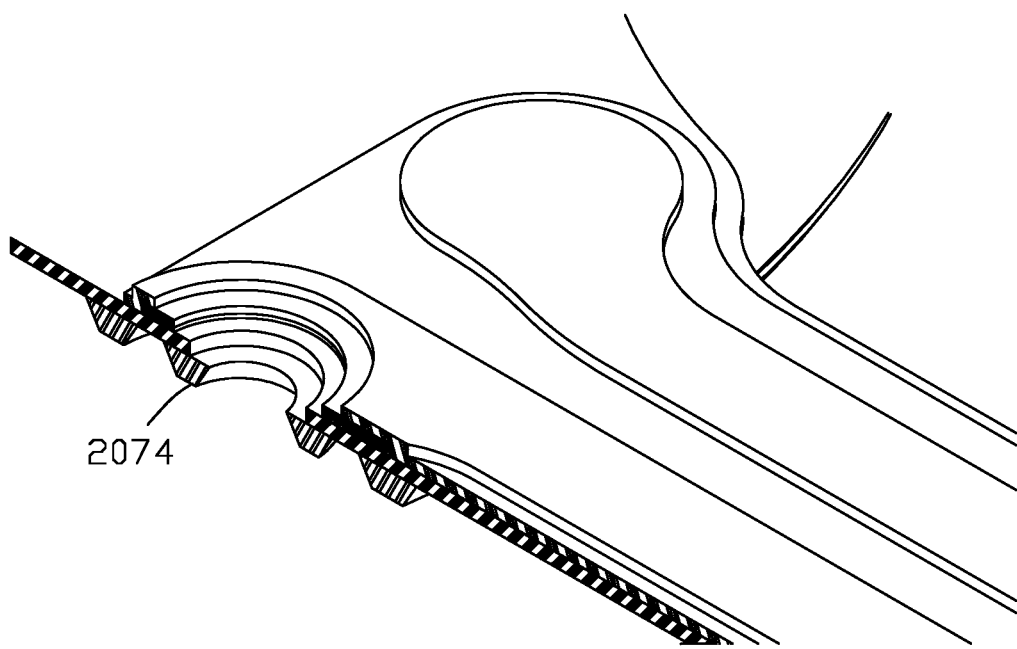
Figure 17W:
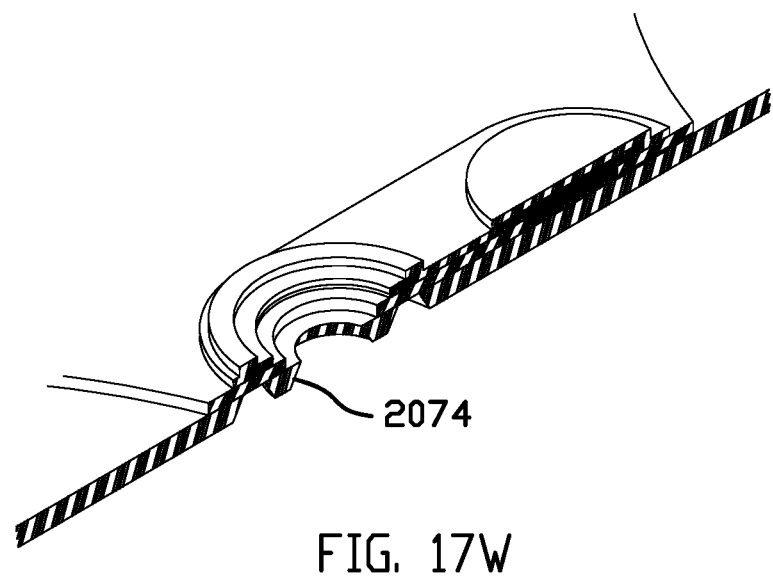
Figure 17X:
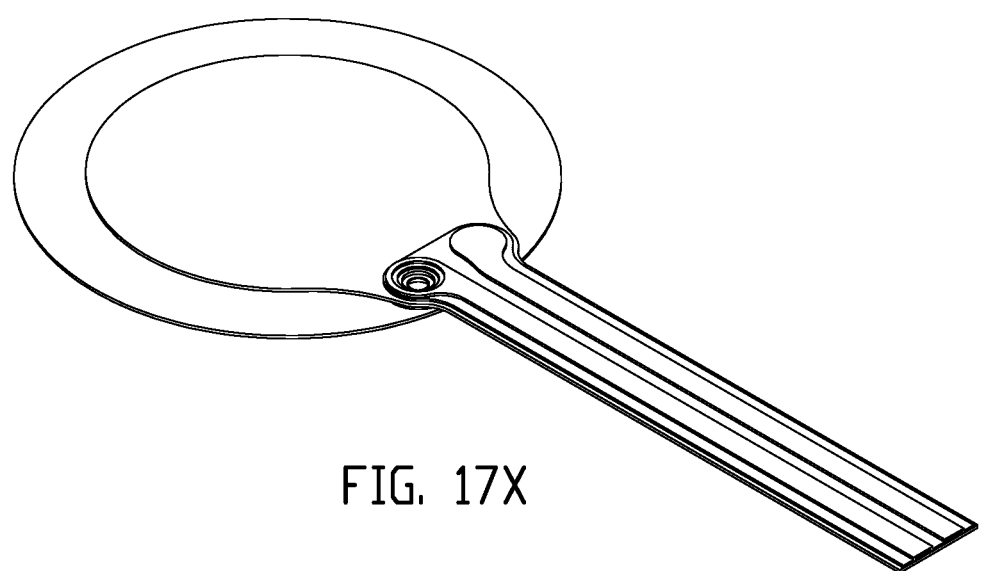
Figure 17Y:
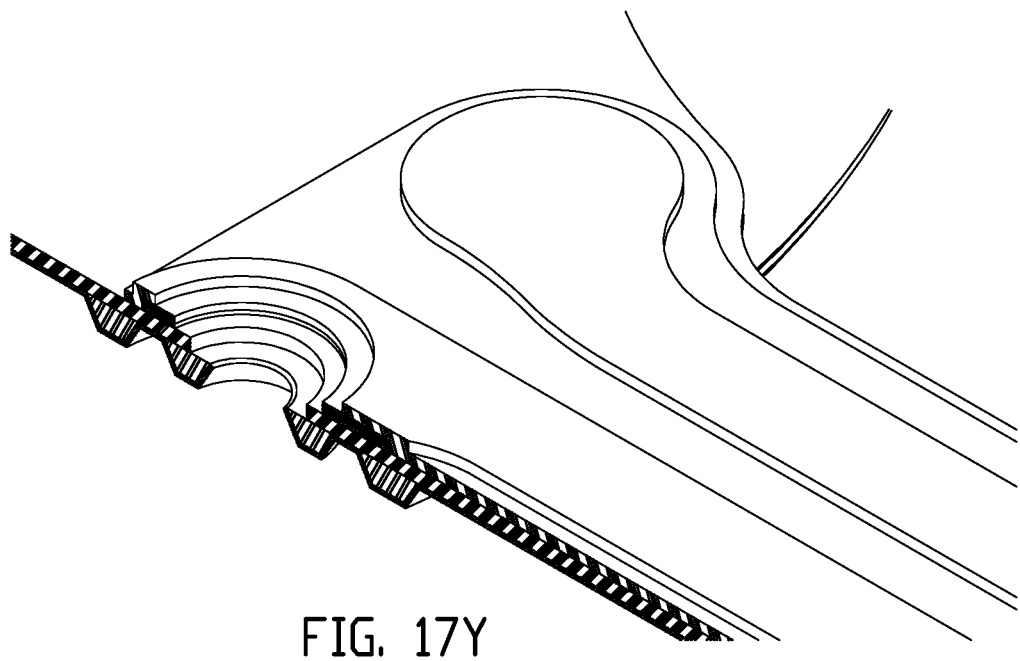
Figure 17Z:
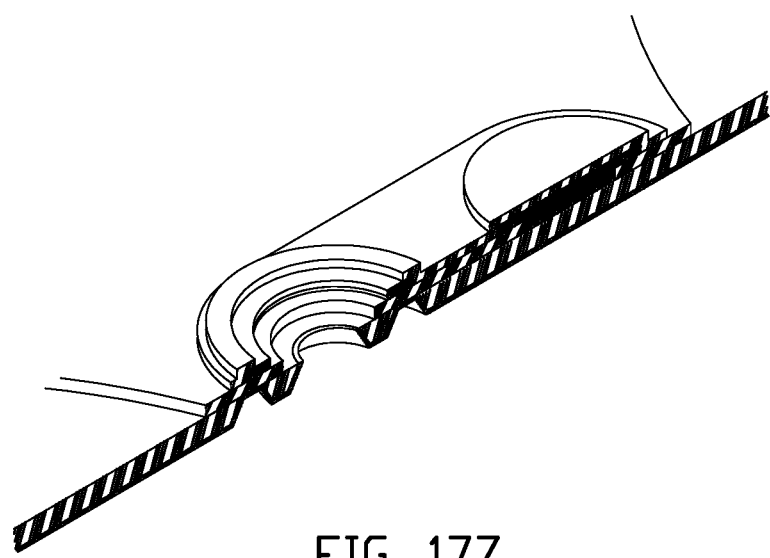
Figure 17A:
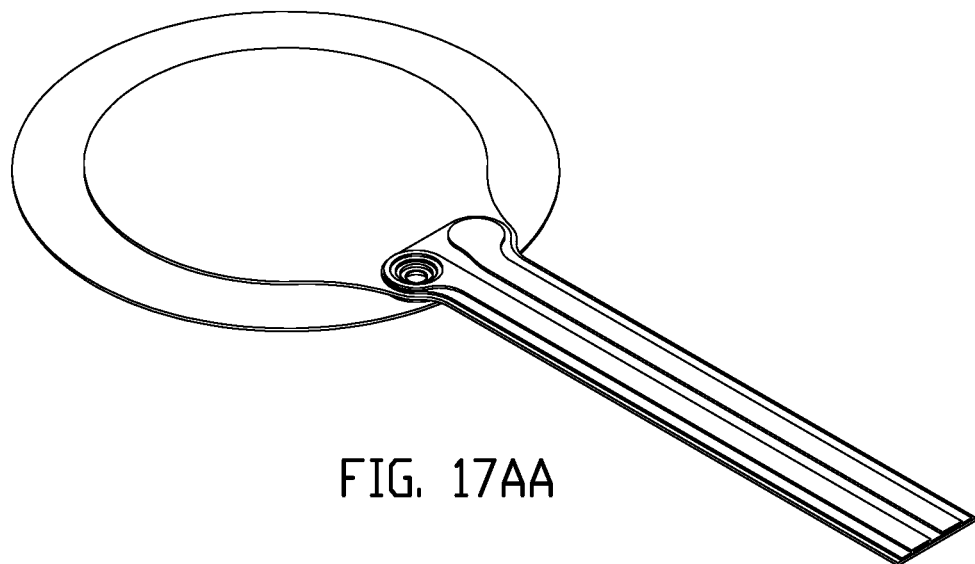
Figure 17B:
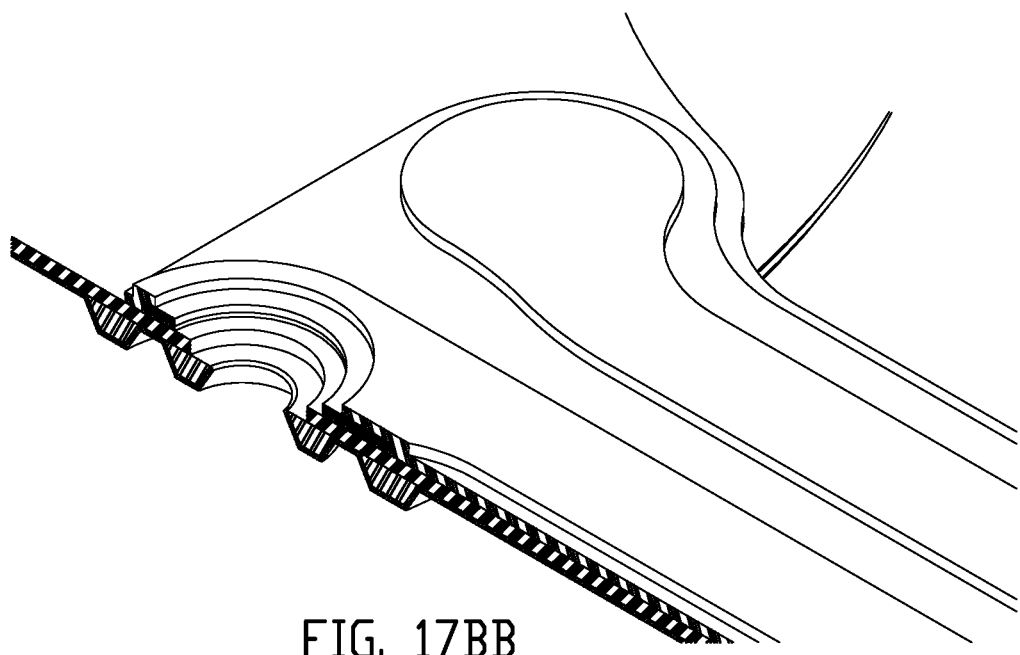
Figure 17C:
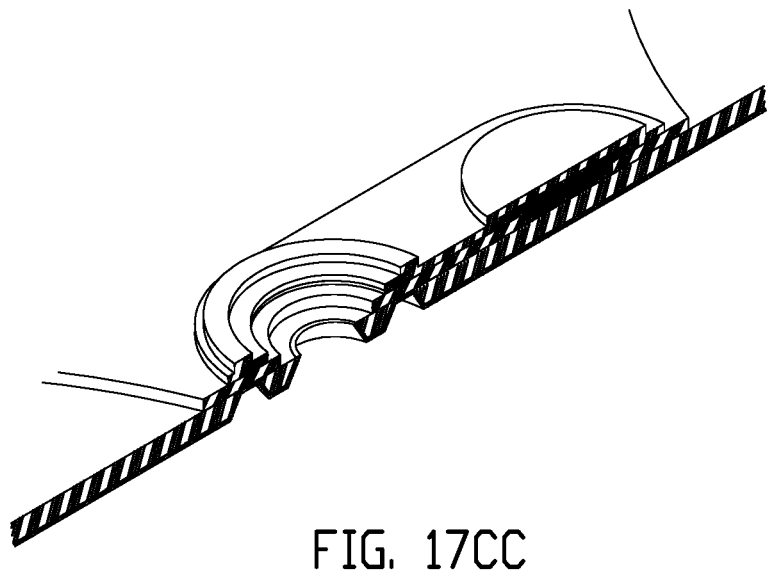
Figure 17D:
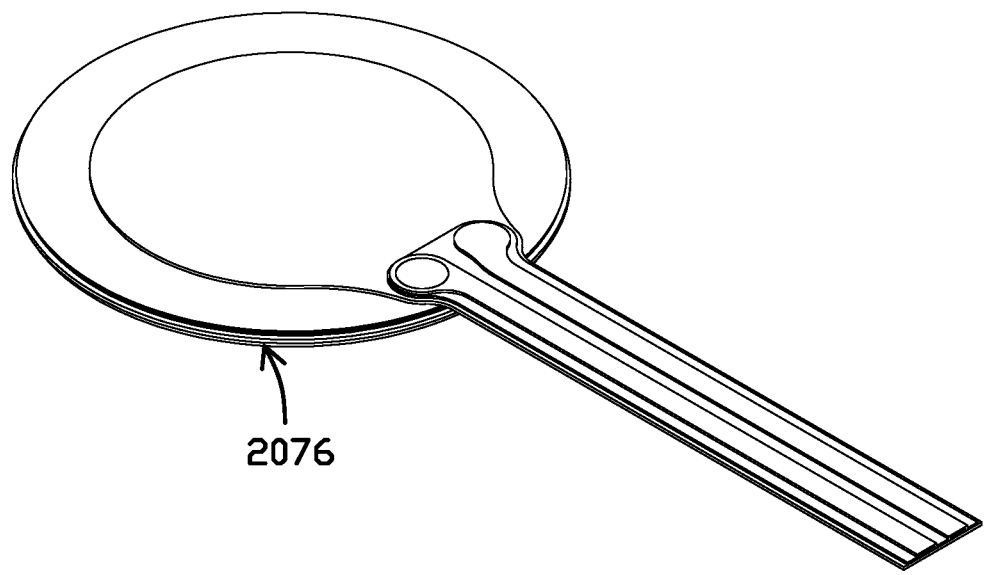
Figure 17E:
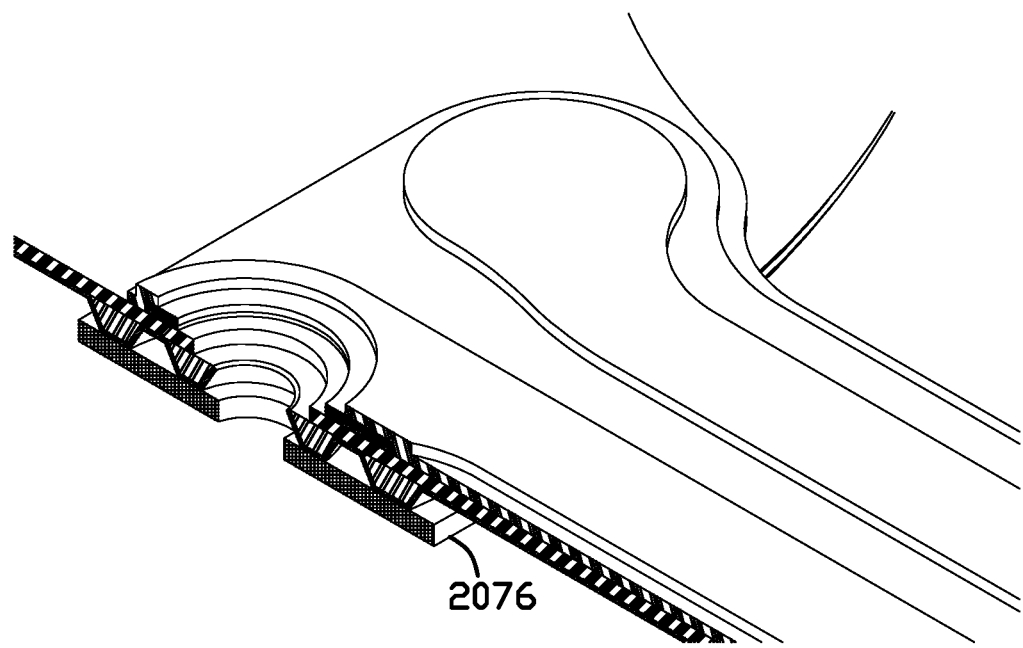
Figure 17F:
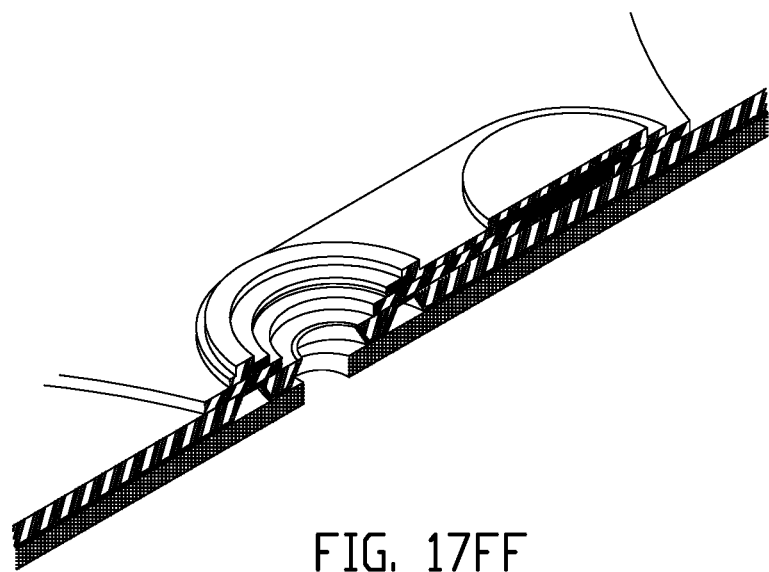
Figure 17G:
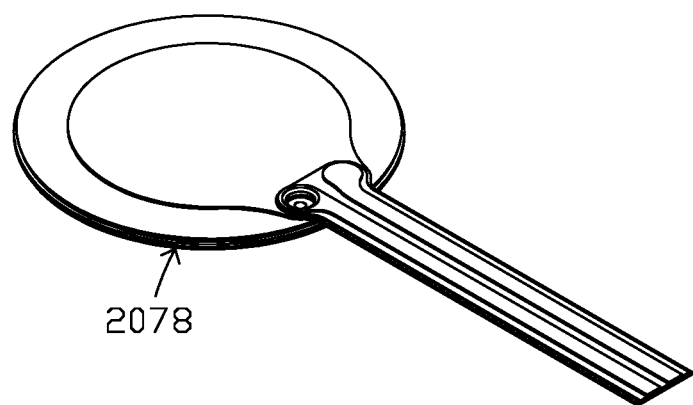
Figure 17H:
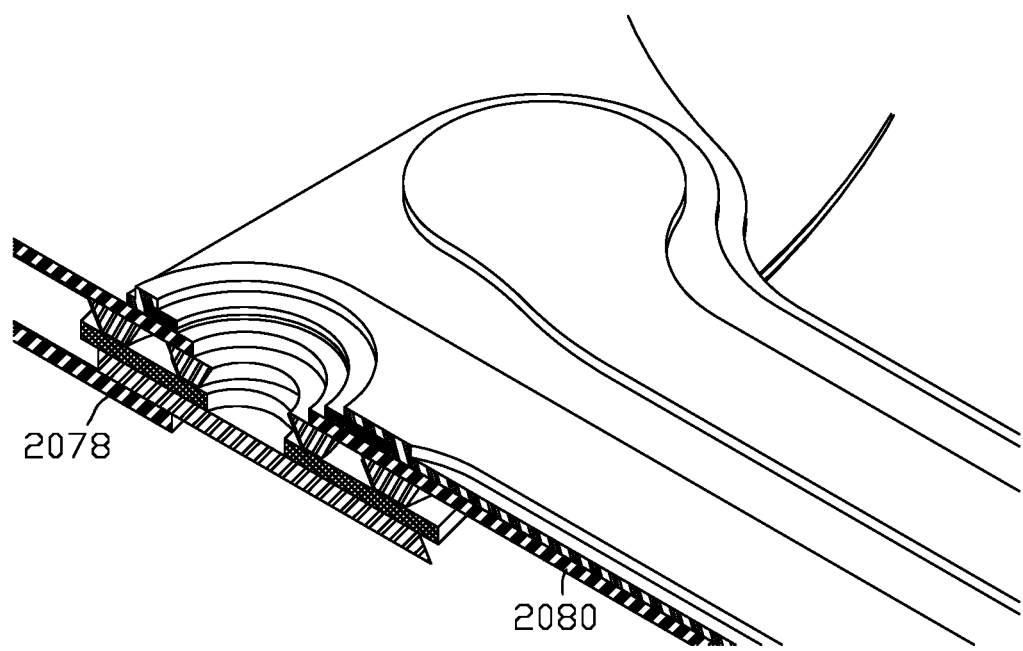
Figure 17I:
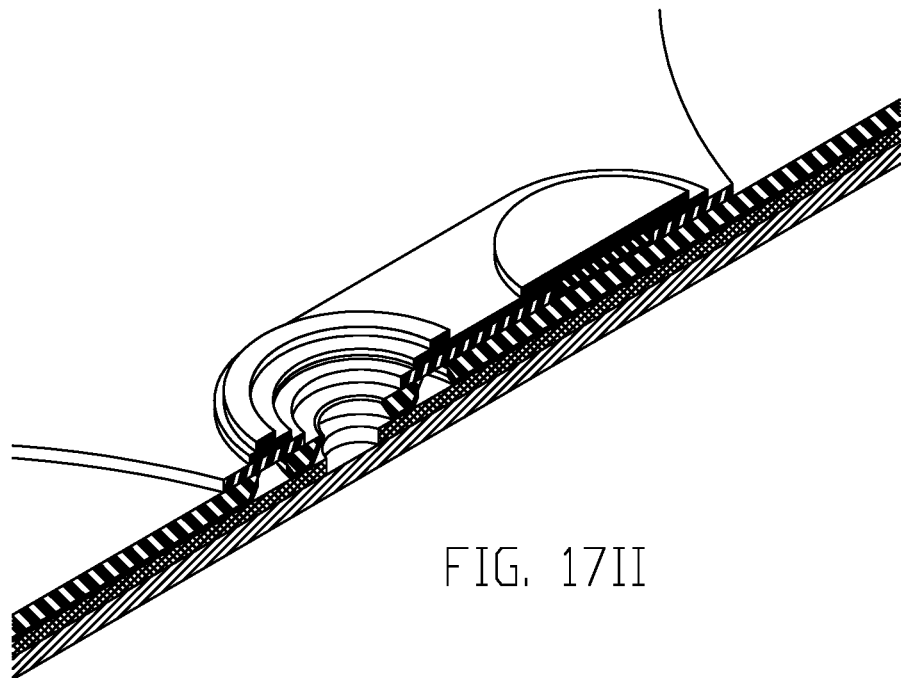
Figure 17J:
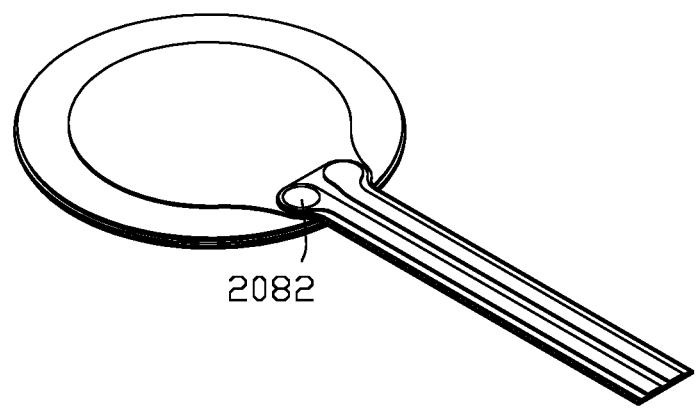
Figure 17K:
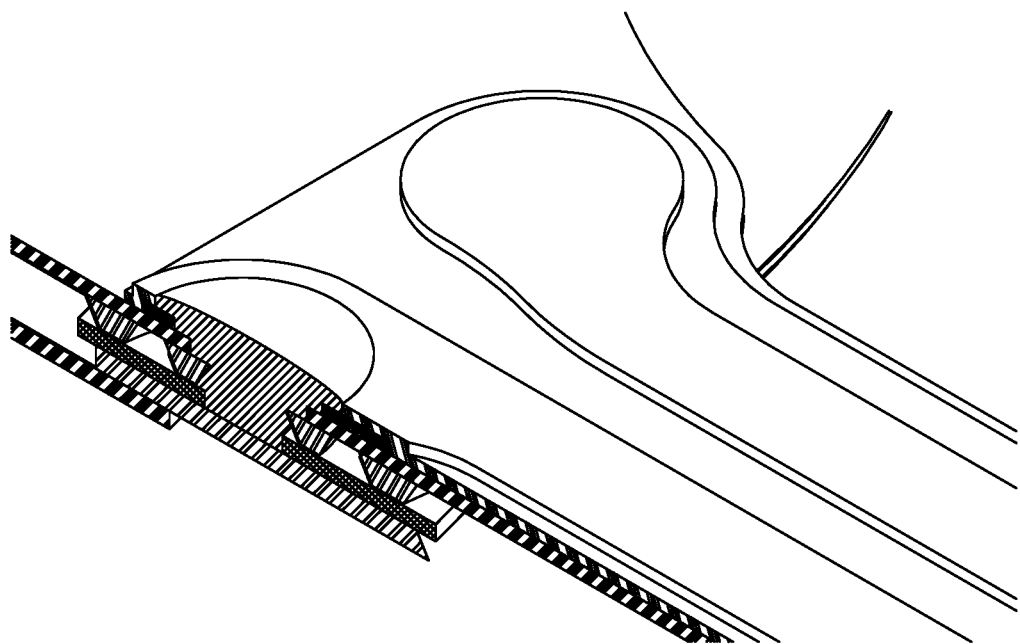
Figure 17L:
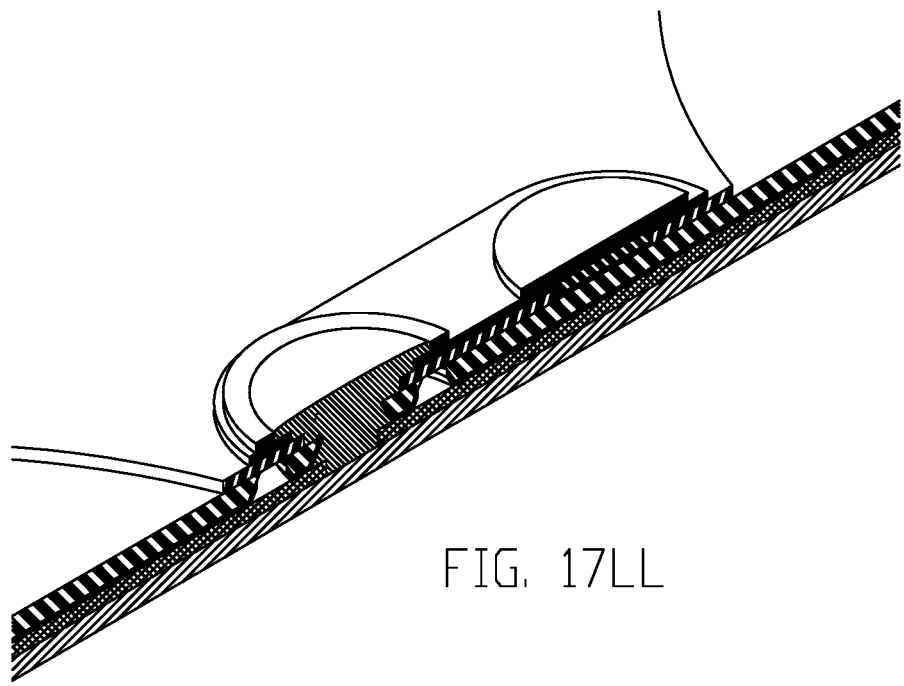
Figure 17M:
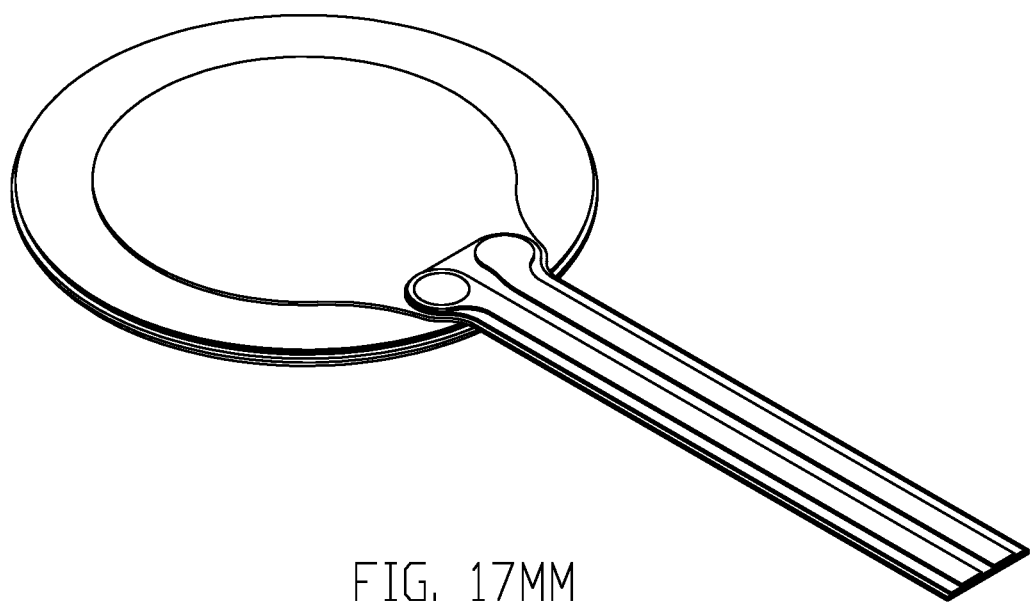
Figure 18A:
FIGS. 18A-18N illustrate sequences of process steps that can be used to manufacture embodiments of the sensor.
Figure 18B:
Figure 18C:
Figure 18D:
Figure 18E:
Figure 18F:
Figure 18G:
Figure 18H:
Figure 18I:
Figure 18J:
Figure 18K:
Figure 18L:
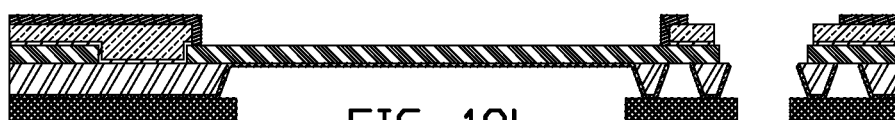
Figure 18M:
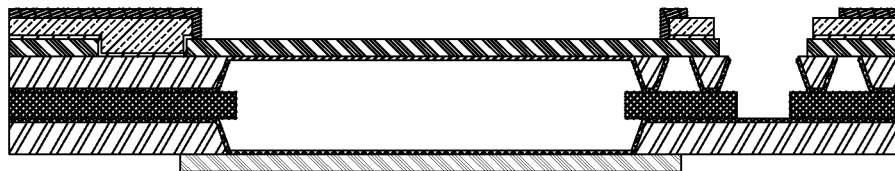
Figure 18N:
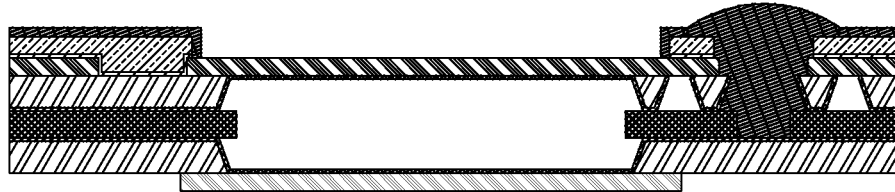

FIGS. 17A-17MM and 18A-18N illustrate sequences of process steps that can be used to manufacture embodiments of sensor 510. In particular, FIG. 17A shows the stainless steel layer 2070 and the first diaphragm section (formed with the lead structure). FIG. 17C shows applying the polymer layer. FIG. 17E shows the first diaphragm section. FIG. 17E also shows patterning the polymer layer and forming via openings. FIG. 17H shows sputtering the seed layer 2072. FIG. 17J shows plating traces and etching the seed layer. FIG. 17R shows applying the dielectric covercoat. FIG. 17U shows the first diaphragm section and lead section, etching the stainless steel layer, and a stainless steel island 2074. FIG. 17V shows the stainless steel island 2074. FIG. 17W shows the stainless steel island 2074 for electrical contact to the second diaphragm section. FIG. 17DD shows the adhesive layer 2076 and laminating the adhesive layer. FIG. 17EE shows the adhesive layer 2076. FIG. 17GG shows the second diaphragm section 2078 and laminating the second diaphragm section to the first diaphragm section. FIG. 17HH shows the second diaphragm section 2078 and the lead structure 2080. FIG. 17JJ shows applying a conductor 2082 to the via to the second diaphragm section. FIG. 18A shows the base stainless steel for the first diaphragm section. FIG. 18B shows applying dielectric and the polymer layer 2084 common to the diaphragm and lead structures. FIG. 18C shows etching and developing dielectric. FIG. 18D shows sputtering the seed layer. FIG. 18E shows plating conductor traces. FIG. 18F shows etching the seed layer, trace 2086 to the first diaphragm electrode, via contact 2088 to the first diaphragm electrode (through the stainless steel layer) and an opening 2090 for a via to the second diaphragm structure. FIG. 18G shows coating a dielectric covercoat. FIG. 18H shows etching/developing a dielectric covercoat. FIG. 18I shows a via opening 2092 for contact to the second diaphragm structure and stainless steel island 2094. FIG. 18J shows sputtering the cavity seed layer and sputtered conductor layer/electrode 2096 of the first diaphragm structure. FIG. 18K shows selectively etching the seed layer. FIG. 18L shows the adhesive layer 2098 and laminating the adhesive layer. FIG. 18M shows laminating the lower diaphragm (made similarly to the top portion without conductor/covercoat) and trace 3000 to the first diaphragm structure. FIG. 18N shows applying solder/conductive epoxy, a trace 3002 to an electrode on the second diaphragm section, sputtered conductor layer 3004 that is an electrode of the second diaphragm section, and stainless steel 3006.

Figure 19E:
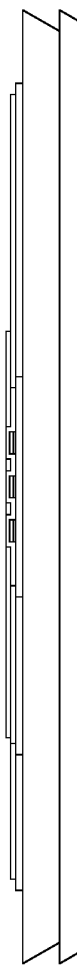
FIGS. 19A, B, C, D, E and F are top, bottom, side, distal end, proximal end and detailed sectional isometric views of a strain gauge-type sensor in accordance with embodiments of the invention.
Figure 19C:
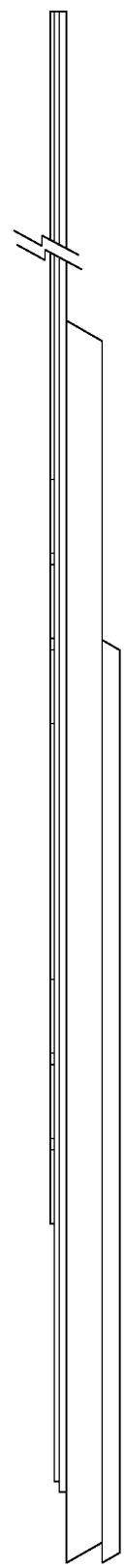
Figure 19D:
Figure 19F:
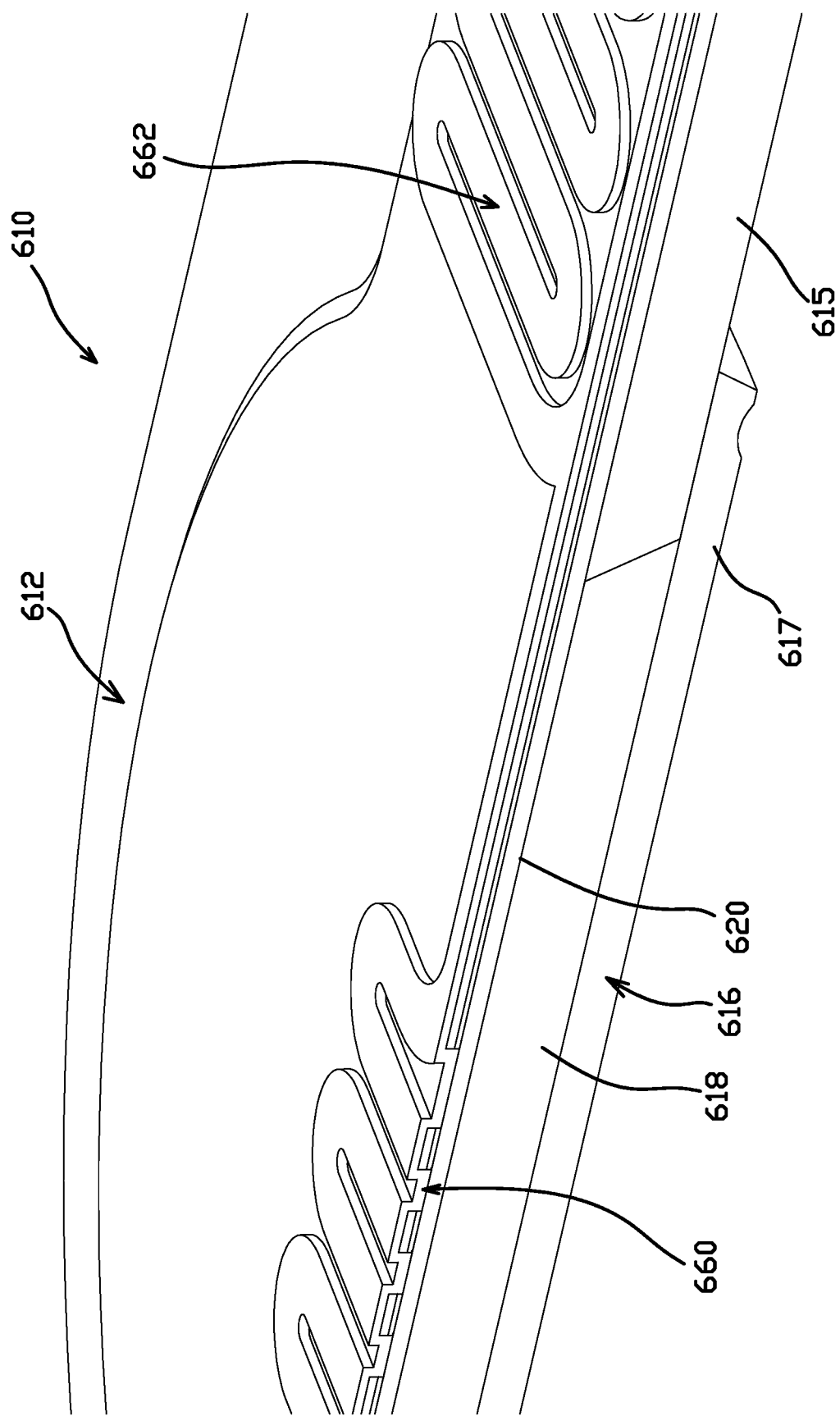
Figures 20E, 20F:
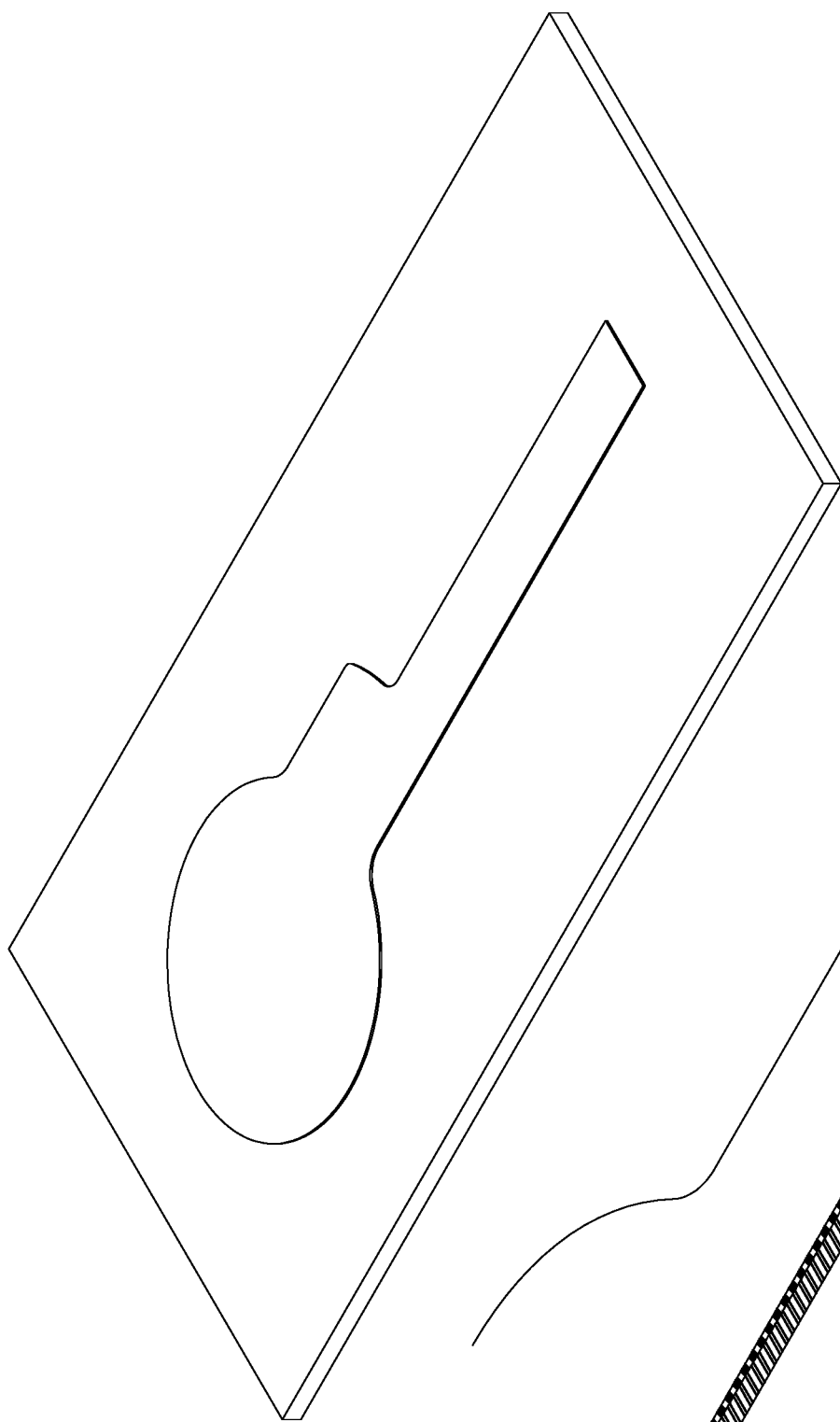
FIGS. 20A-20U illustrate embodiments of a sequence of process steps that can be used to manufacture the sensor.
Figures 20G, 20H:
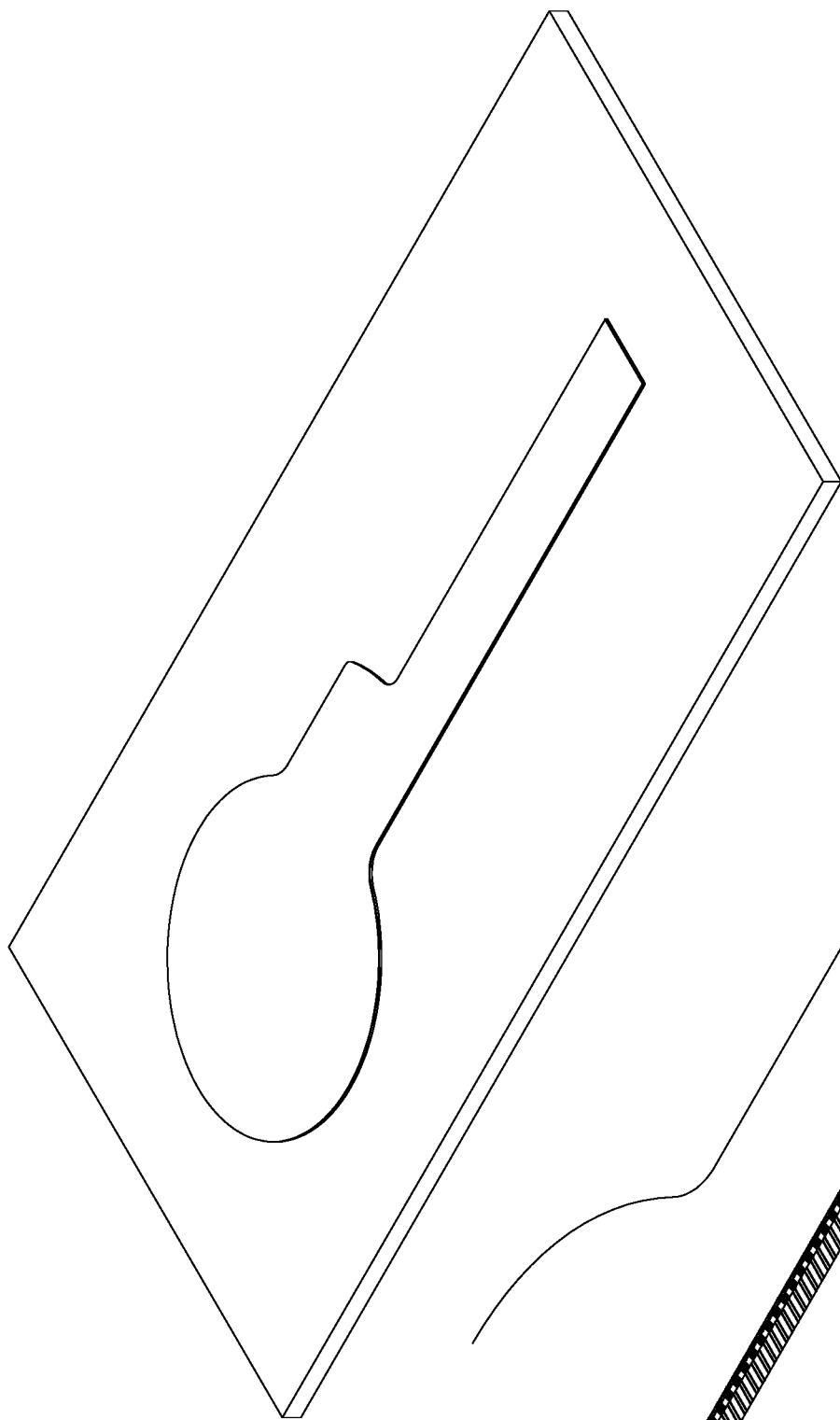
Figures 20I, 20J:
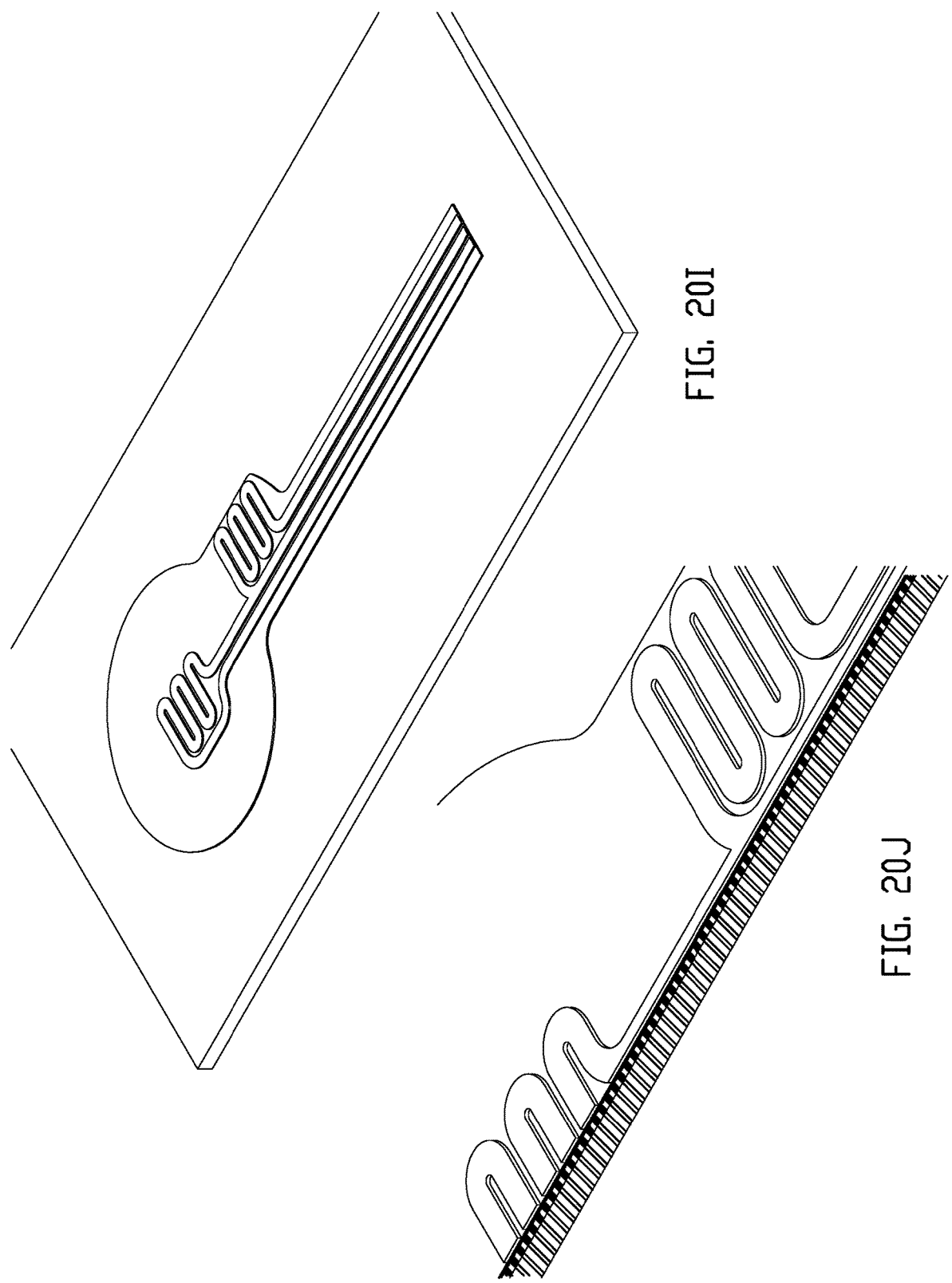
Figures 20M, 20N:
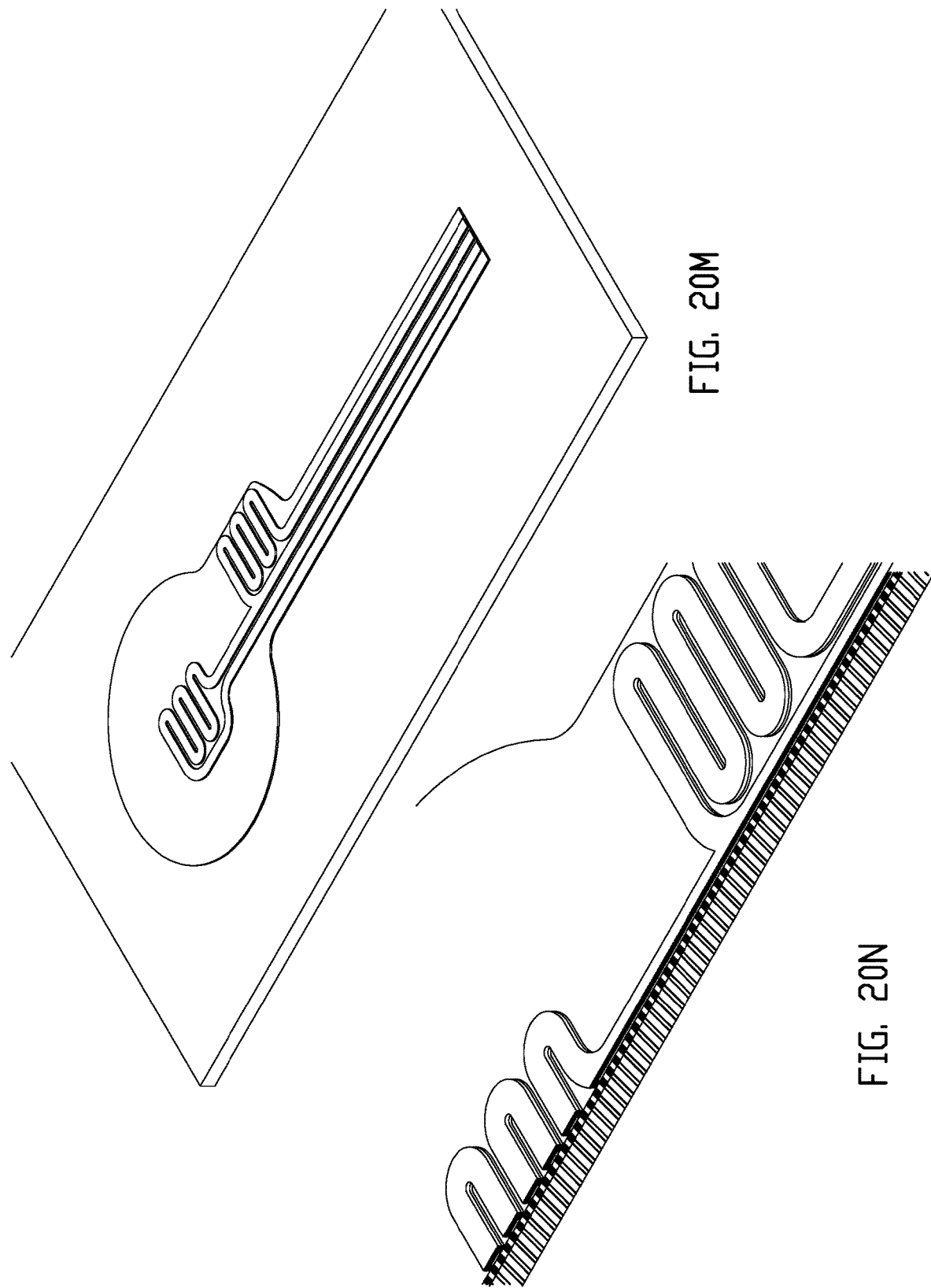
Figure 20O:
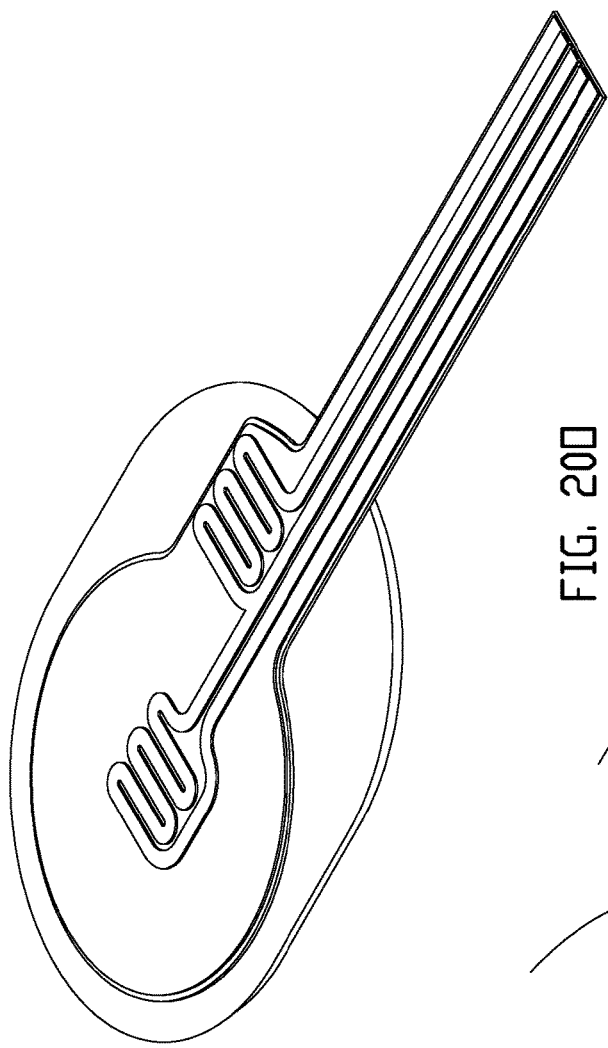
Figure 20P:
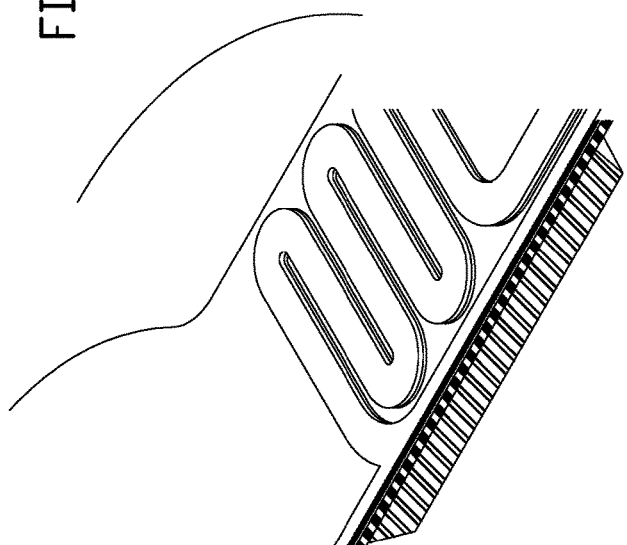
Figure 20Q:
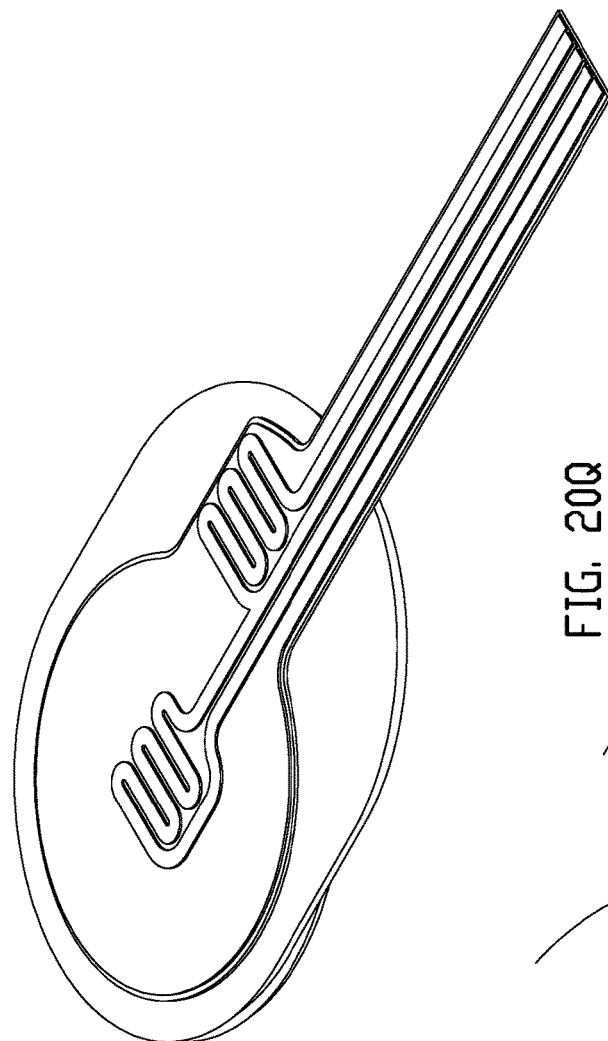
Figure 20R:
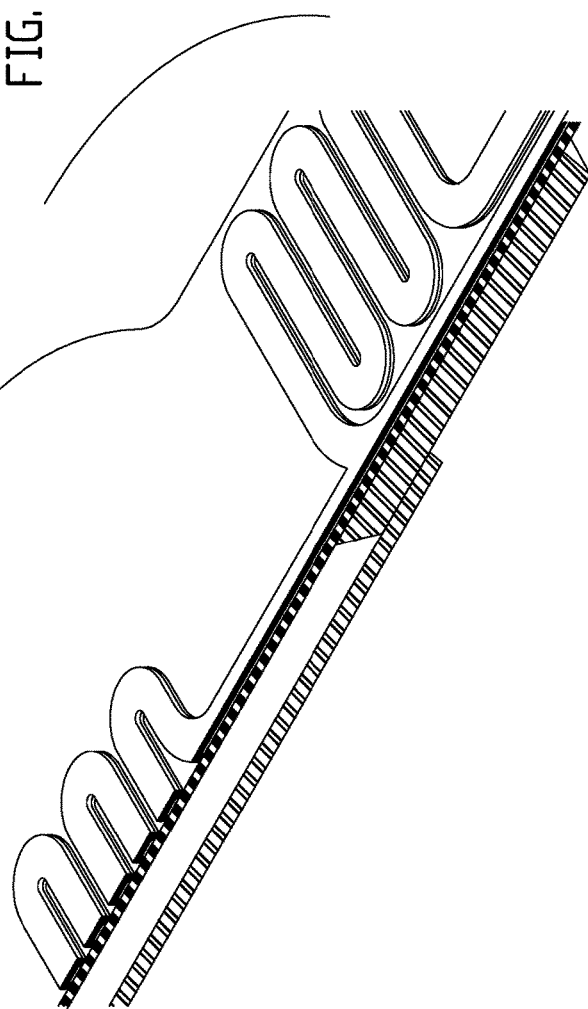
Figure 20S:
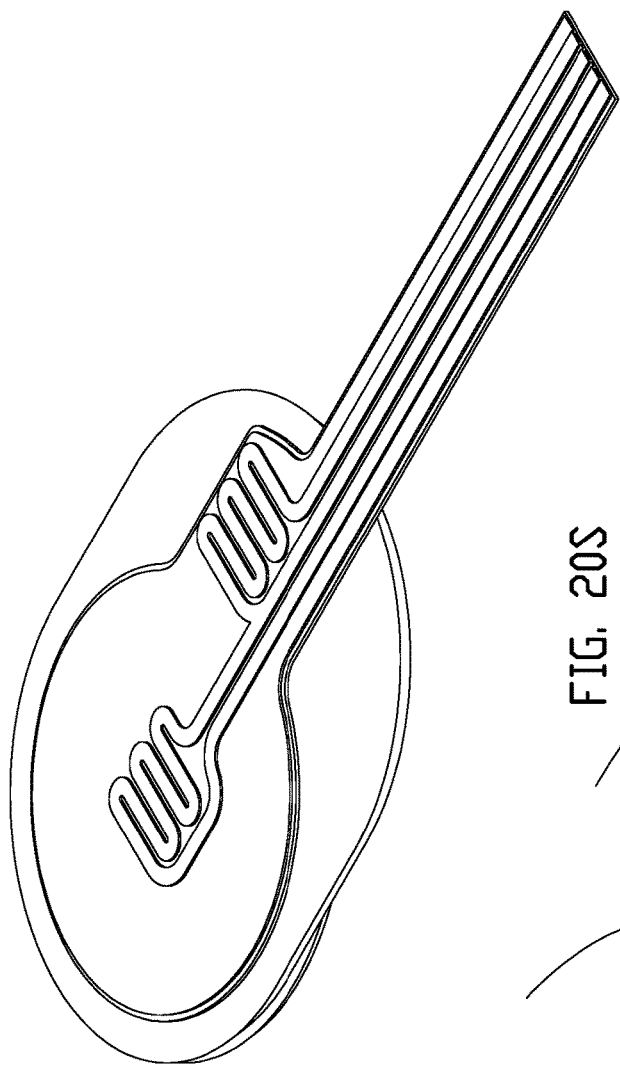
Figure 20T:
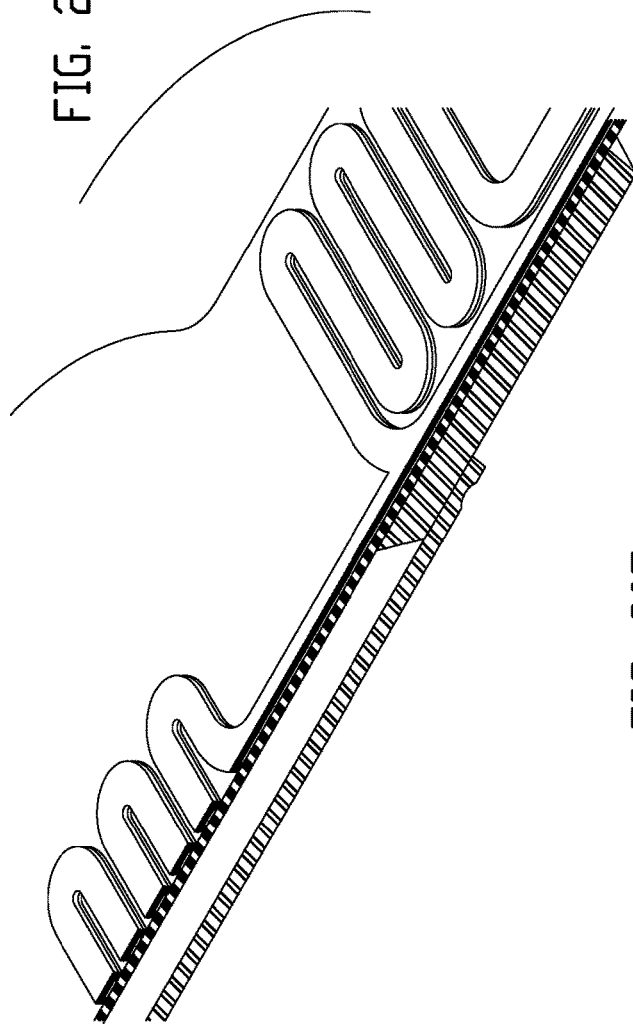
Figure 20U:
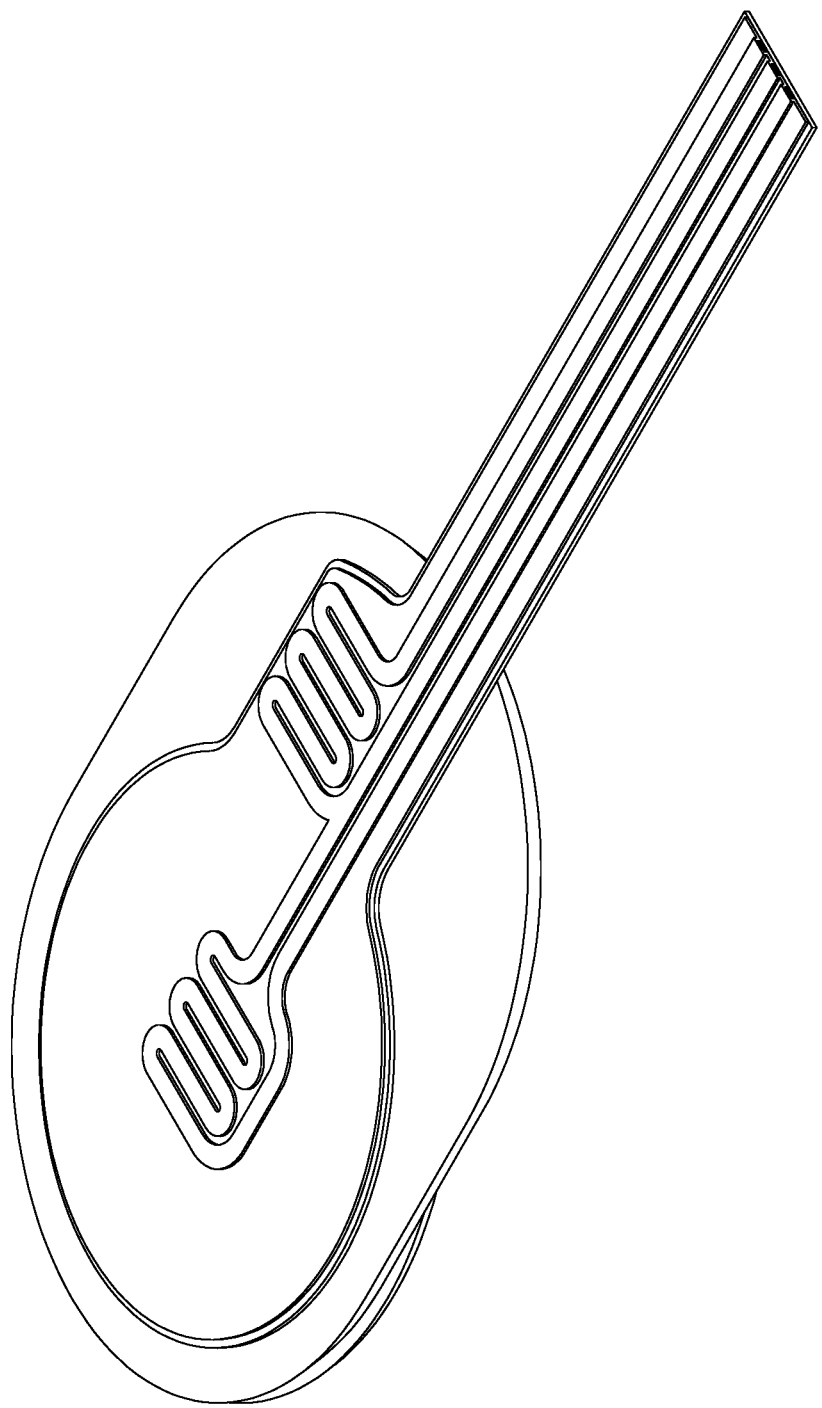

FIGS. 19A, B, C, D, E and F are top, bottom, side, distal end, proximal end and detailed sectional isometric views of a strain gauge-type sensor 610 in accordance with embodiments of the invention. As shown, sensor 610 includes a diaphragm structure 612 and an integrated lead structure 614 that extends from the diaphragm structure. Diaphragm structure 612 includes a base 616 having a void region or cavity 618. In embodiments, the base 616 is metal such as stainless steel (SST), and is formed from stainless steel members 615 and 617. A pair of strain gauge members 660 and 662 (other embodiments have more or fewer strain gauge members) are formed on a polymer layer 620 having diaphragm portion 622 and lead portion 624. Leads or traces 632 extend over the lead portion 624 of the polymer layer 620 and are electrically coupled to the strain gauge members 660 and 662. As shown, strain gauge member 660 is located on a moving portion of the diaphragm structure 612 (e.g., over the cavity 618). Sensor 662 is located on a non-moving or static region of the sensor 610 (e.g., not over the cavity 618), and is shown closer to the lead structure 614 in the illustrated embodiment. Sensor 610 can be manufactured using processes similar to those described above in connection with sensors 10, 110, 210, 310, 410 and 510. FIGS. 20A-20U illustrate embodiments of a sequence of process steps that can be used to manufacture sensor 610.

Figure 22A:
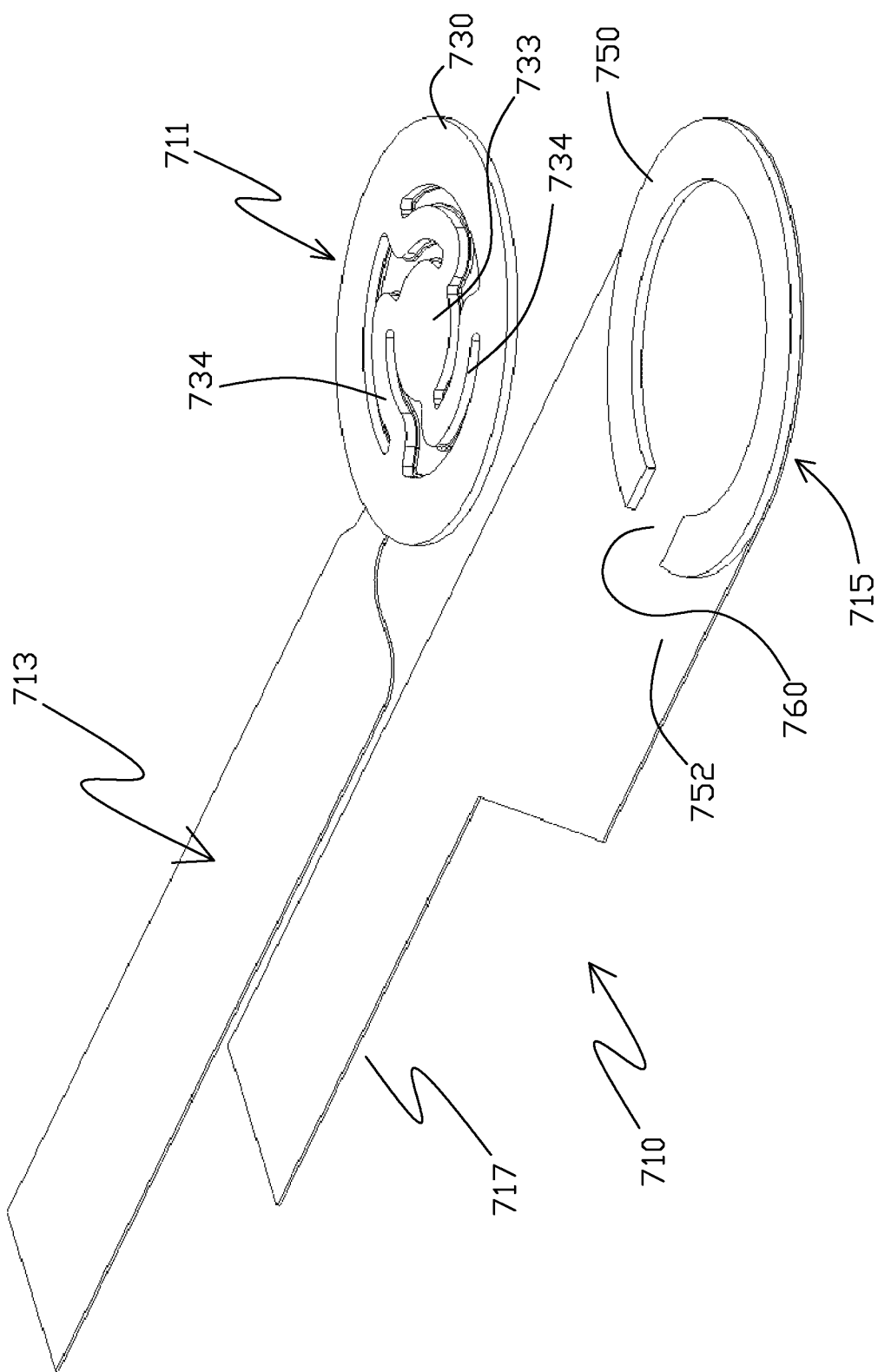
FIGS. 22A and 22B are exploded views of the sensor in accordance with embodiments, with FIG. 22A illustrating the sensor components from their upper or top sides, and FIG. 22B illustrating the sensor components from their lower or bottom sides.
Figure 22B:
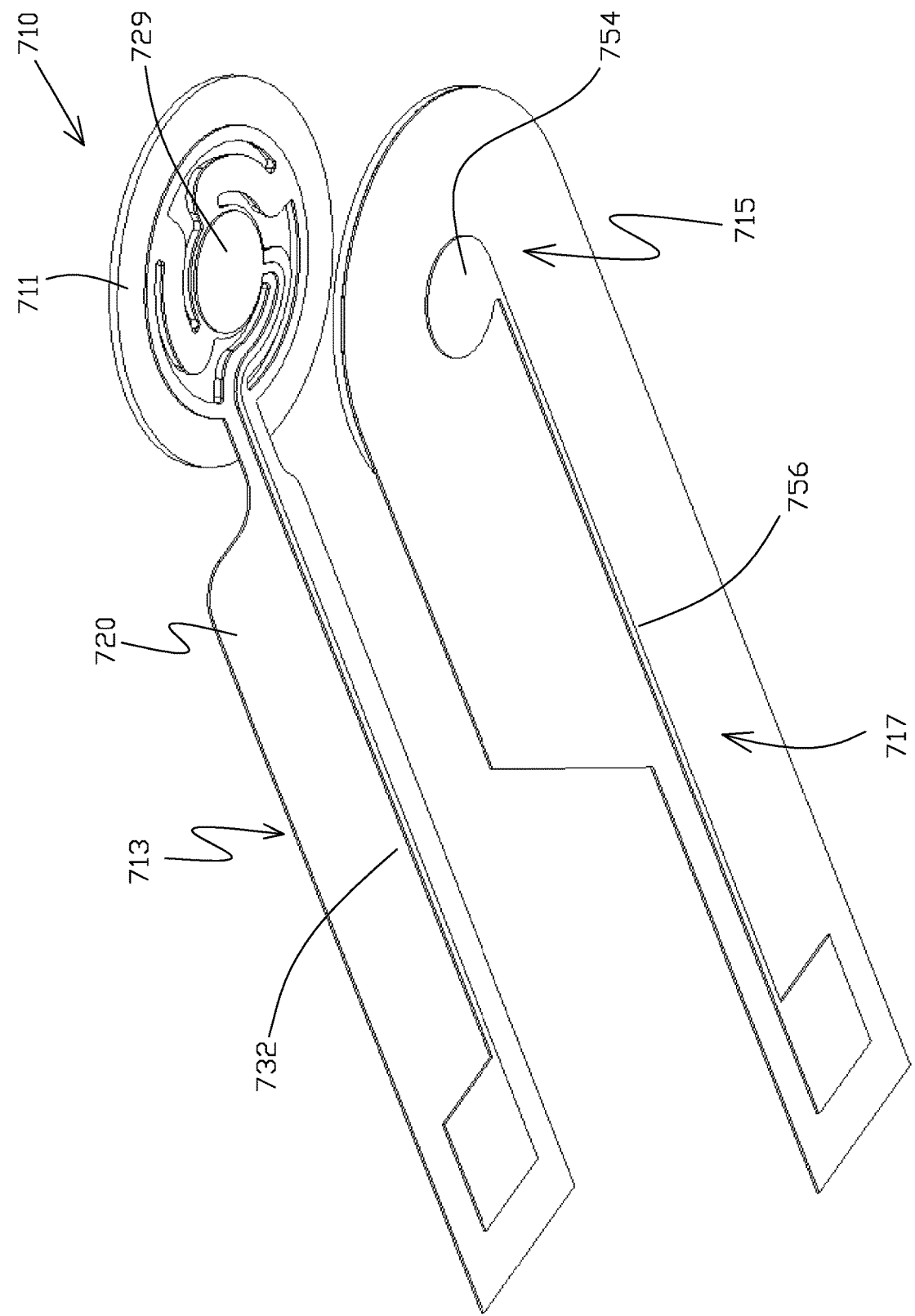
Figure 23A:
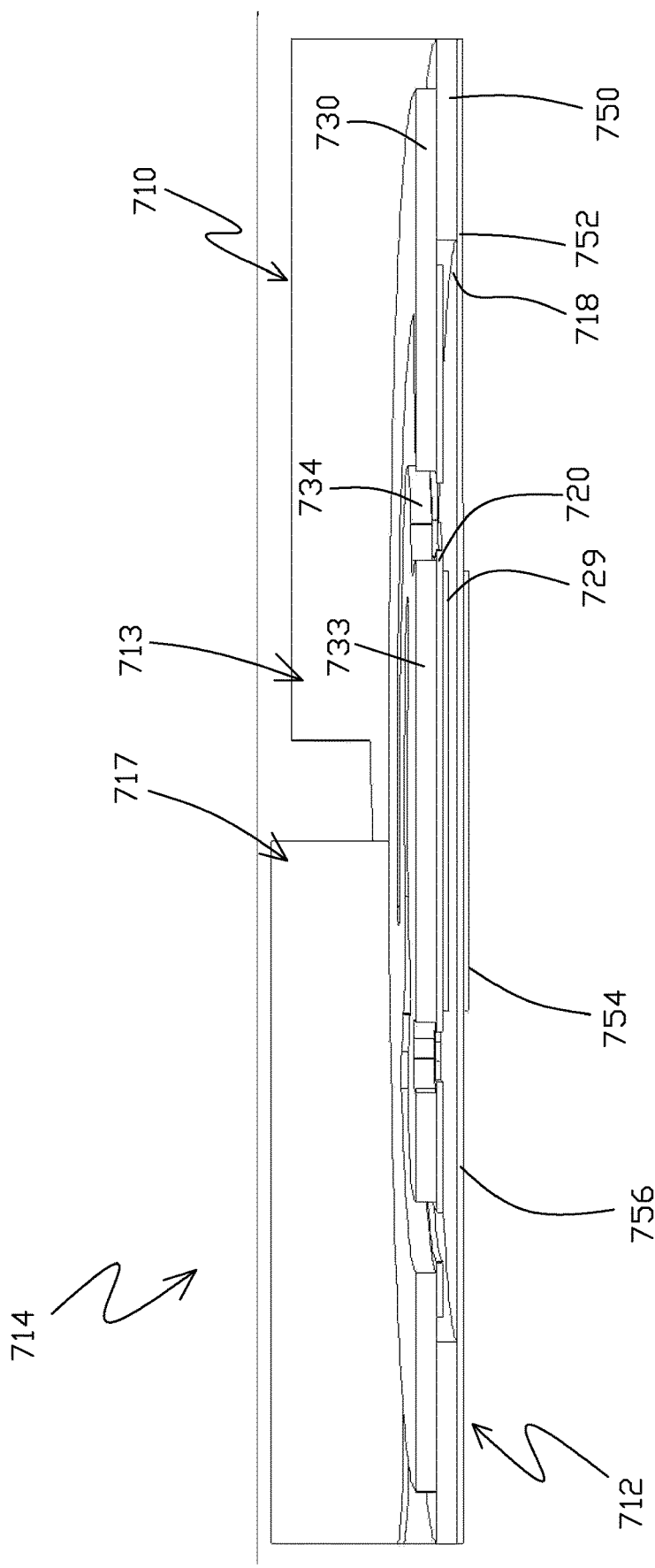
FIGS. 23A and 23B are sectional isometric views of the sensor in accordance with embodiments of the invention, with the section lines extending through the diaphragm structure.
Figure 23B:
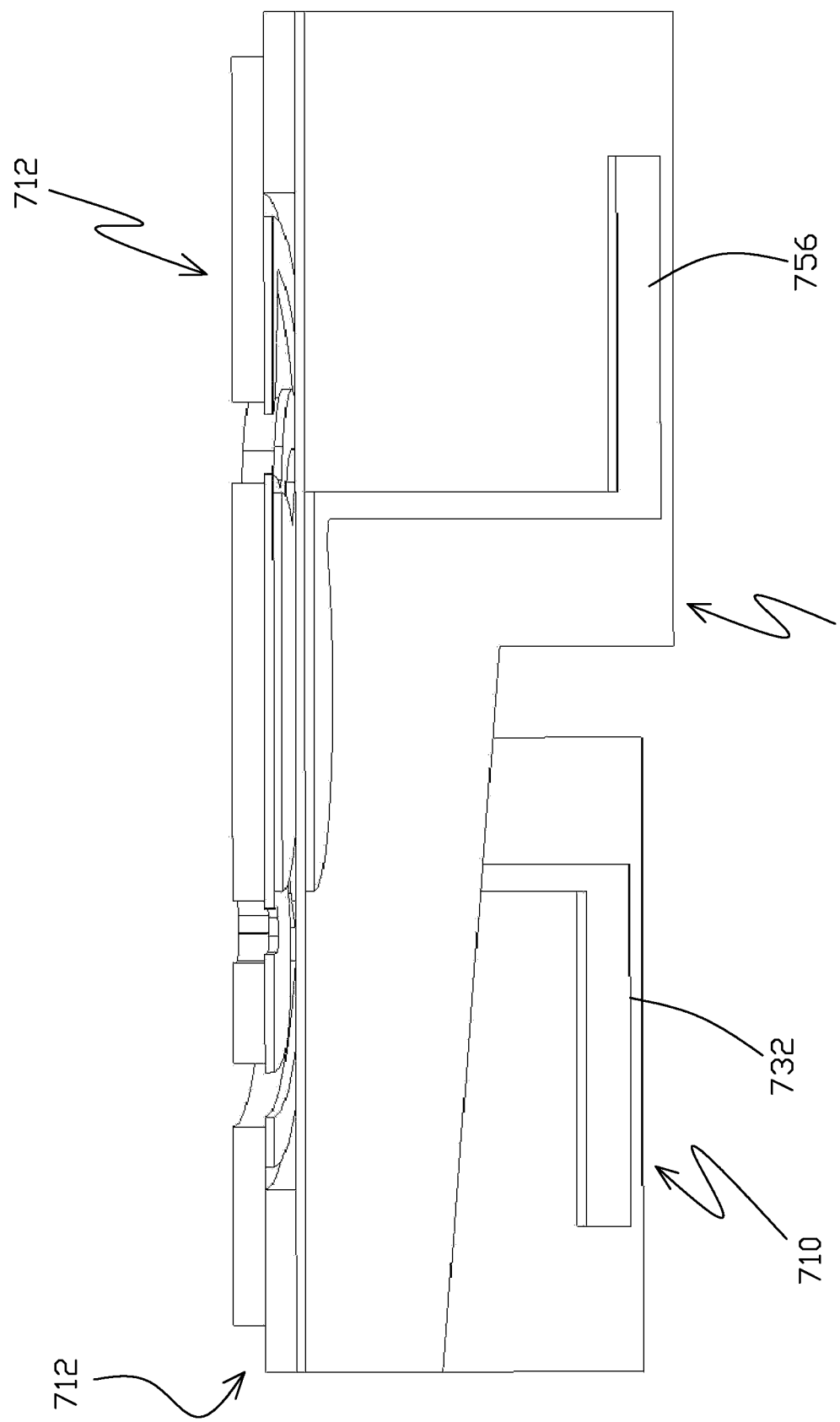

FIGS. 21A and 21B are isometric views of a sensor 710 having flipped two trace assemblies with welded base members in accordance with embodiments of the invention. FIG. 21A illustrates a first or upper side of the sensor 710, and FIG. 21B illustrating an opposite second or lower side of the sensor. Sensor 710 includes a diaphragm structure 712 and an integrated lead structure 714 that extends from the diaphragm structure. FIGS. 22A and 22B are exploded views of sensor 710 in accordance with embodiments, with FIG. 22A illustrating the sensor components from their upper or top sides, and FIG. 22B illustrating the sensor components from their lower or bottom sides. In the embodiments shown in FIGS. 22A and 22B, the sensor 710 includes a first or upper component or assembly having a diaphragm portion 711 and a lead portion 713, and a second or lower component or assembly having a diaphragm portion 715 and a lead portion 717. FIGS. 23A and 23B are sectional isometric views of sensor 710 in accordance with embodiments of the invention, with the section lines extending through the diaphragm structure 72. FIG. 23A is a view looking down from slightly above, and FIG. 23B is a view looking up from slightly below (termination leads visible).

The diaphragm portion 711 of the upper assembly includes a diaphragm member formed from non-metals or metals such as stainless steel, and includes an outer or base portion 730 and an inner, moving portion 733 attached to the base portion by spring arms 734. In embodiments, the member of the diaphragm portion 711 is formed as an integral member from a single sheet of spring metal such as stainless steel (e.g., by etching). A first conductive electrode 729 is located on an interior surface of the moving portion 732, and is electrically isolated from the diaphragm member (in embodiments where the member is formed of conductive material) by a polyimide or other insulating layer 720. Lead portion 713 includes a base member that can be formed from the insulating layer 720. A lead or trace 732 extends from the lead portion 713 to the electrode 729, including a length that traverses a spring arm 734 in the illustrated embodiment, and is electrically isolated from the diaphragm member by the insulating layer 720. In other embodiments (not shown), the trace extends to the electrode 729 across the spring arms and gaps between the spring arms.

The diaphragm portion 715 of the lower assembly can be formed from non-metals or metals such as stainless steel, and includes a base portion 750 that is shown as an annular member, insulating layer 752 and a second electrode 754 on a side of the insulating layer opposite the base portion. Lead portion 717 includes a base that can be formed from the insulating layer 752, and a lead or trace 756 that extends to the electrode 754. As shown in FIGS. 23A and 23B, the base portion 730 of the diaphragm portion 711 is joined to the base portion 750 of the diaphragm portion 715 (e.g., by welds or adhesive at their peripheries) to define a void region or cavity 718 in the diaphragm structure 712. As shown in FIG. 22A, the base portion 750 of the lower assembly can include a gap 760 through which the lead portion 713 of the upper assembly can extend. Adhesive or other material can be applied to seal any space between the gap 760 and lead portion 713 following assembly of the upper and lower assemblies. In other embodiments the diaphragm structure 712 is not sealed. Embodiments can include an insulating cover coat over portions or all of the structures such as electrodes 729 and 754 and traces 732 and 756 formed from the conductive material layer. Such a cover coat can prevent electrical shorting, sensor damage and out of range capacitance if the applied pressure creates interference between the electrodes. The cover coat can also enhance stability of the sensor 710 by preventing electrolytic and/or oxidative degradation of the conductor surfaces.

The configuration of the diaphragm structure 712 (e.g., the suspension or support of the moving portion 372 by the spring arms 734) helps maintain parallelism between the electrodes 729 and 754 during operation of the sensor 710. In particular, spring bias can be reduced from the insulating layer 720 and conductor layer of the trace 732 on the spring metal layer when the trace 732 extends along a spring arm 734. Accuracy and repeatability of measurements are can thereby be increased. Stiffness of the spring arms can be tuned to desired pressure ranges. By way of non-limiting example, in embodiments the outside diameters of the electrodes 729 and 754 are about 0.44 mm, and the outside diameters of the base portions 730 and 750 are about 1.04 mm. Traces 732 and 756 can be about 0.03 mm in width. Stainless steel layer portions can be about 35 µm thick. The insulating layer can be polyimide, and about 710 µm thick. Any cover coat can be about 5 µm thick. Structures such as the electrodes 729 and 754 and traces 732 and 756 formed in the copper or other conductor layer can be about 10 µm thick. The diaphragm structure 712, or the portions 711 or 715, can be encased in epoxy or fixed to other structures to which the sensor is mounted.

FIG. 24 is an isometric view of an integrated lead and can sensor 810 having a diaphragm structure 812 and integrated lead structure 814 in accordance with embodiments of the invention. As shown, sensor 810 includes a circuit or trace member 813 and a can 850. FIG. 25 is detailed isometric view, with portions of the can 850 broken away to expose portions of the trace member 813 within the diaphragm structure 812. FIG. 26 is a detailed sectional view of a portion of the diaphragm structure 812. Trace member 813 includes a diaphragm portion 811 and a lead portion 803. The trace member 813 is formed from a metal (e.g., stainless steel) diaphragm member or base 826, polyimide or other insulating layer 820, and a conductor layer 828. The diaphragm portion 811 of trace member 813 includes an electrode 829 in the conductor layer 828 over and electrically isolated from the base 826 by insulating layer 820. Gold and/or nickel can be plated on the electrode 829 and/or other portions of the conductor layer 828 in embodiments.

The lead structure 814 of trace member 813 includes a trace 832 in the conductor layer 828 that extends to the electrode 829. Trace 832 is electrically isolated from the base 826 by the insulating layer 820. In embodiments, the diaphragm base 826 includes one or more annular recesses (which can be partially etched) to enable motion of the electrode 829 and adjacent portion of the base during operation of the sensor 810 (i.e. by providing an accordion-like effect). Can 850 is a metal member (e.g., stainless steel) in the illustrated embodiment, and defines a void or cavity 818 in the diaphragm structure 812. The can 850 is mechanically and electrically connected to the base 826 (e.g., by welds or conductive adhesive) and functions as a second electrode, and the base layer 826 of the lead structure 814 functions as a return ground path (i.e., as a second electrical lead). As shown in FIG. 84, the lead structure extends from a gap 860 in the can 850. The gap 860 is sealed in embodiments.

Figure 27:
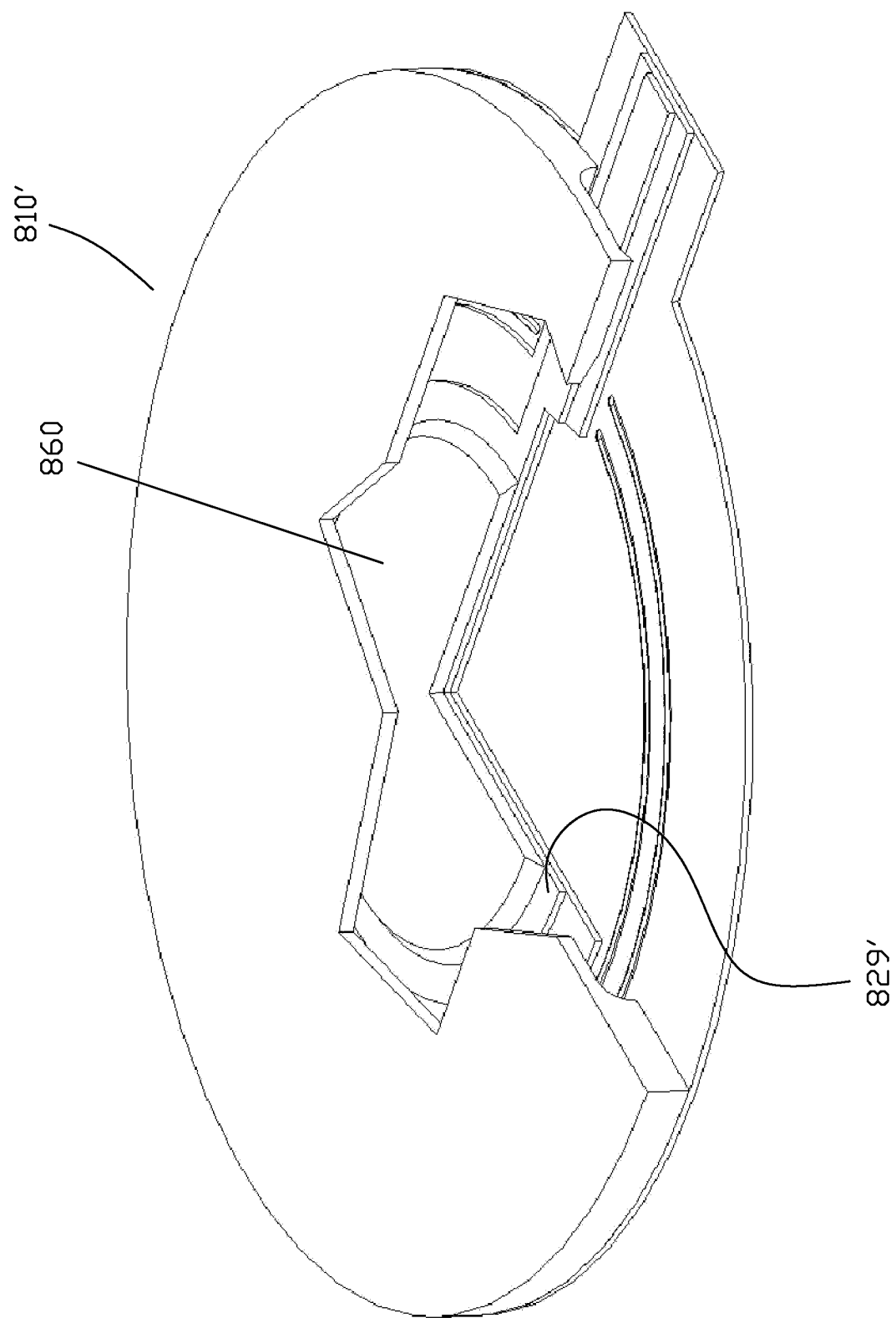
FIG. 27 is an isometric and partial cut-away illustration of another sensor in accordance with embodiments of the invention

FIG. 27 is an isometric and partial cut-away illustration of a sensor 810' in accordance with embodiments of the invention. Sensor 810' has a layer of material 860 on the electrode 829'. Material 860 can be a material having a relatively high dielectric constant and/or relatively low durometer elastomer material to partially fill the cavity 818' and allow for expansion under compression. In embodiments, for example, material 160 is silicone loaded with TiO2. Other than the material 160, sensor 110' can be the same as or similar to the sensor 110 described above.

FIGS. 28-30 are isometric illustrations of a sensor 810" in accordance with embodiments of the invention. Sensor 810" includes a diaphragm structure 812" and integrated lead structure 814". Integrated lead structure 814" of trace member 813" includes a trace 833 in the conductor layer 828" that extends to the diaphragm structure 812" and electrically connects to the can 850" (e.g., by conductive adhesive) that functions as an electrode. Like trace 832", trace 833 is electrically isolated from the base 826" by insulating layer 820". Other than the lead structure associated with trace 833, sensor 810" can be the same as or similar to sensors 810 and 810' described above (e.g., sensor 810" can have a layer of high dielectric constant elastomer material on the electrode 829").

Figure 31:
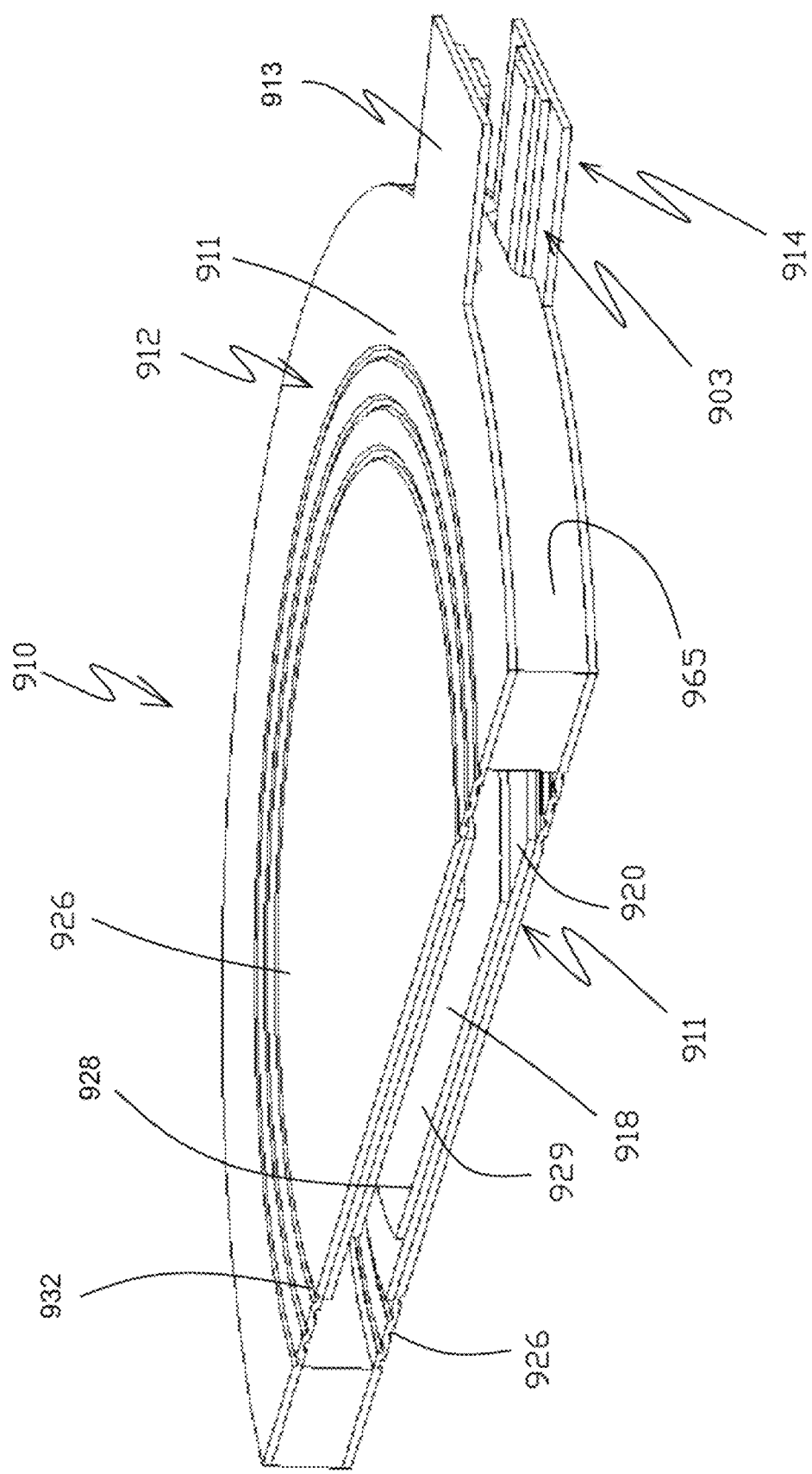
FIG. 31 is sectional isometric view of another sensor having a diaphragm structure and integrated lead structure in accordance with embodiments of the invention.
Figure 32:
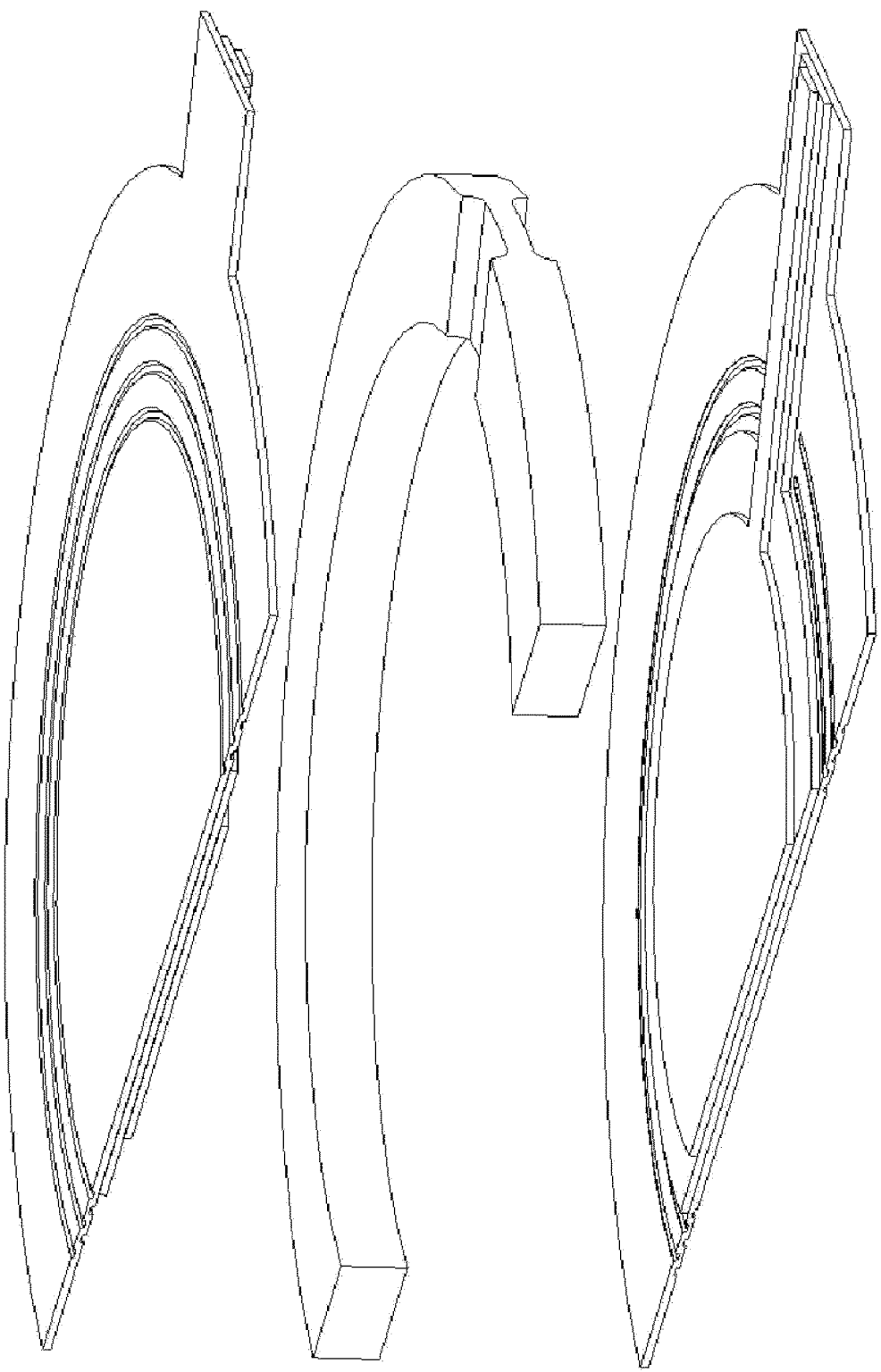
FIG. 32 is an exploded view of the sensor.

FIG. 31 is sectional isometric view of a sensor 910 having a diaphragm structure 912 and integrated lead structure 914 in accordance with embodiments of the invention. FIG. 32 is an exploded view of the sensor 910 shown in FIG. 31. Sensor 910 includes a two trace members 913, each having a diaphragm portion 911 and a lead portion 903. Trace members 913 can be the same as or similar to trace member 813 described above, and include a trace 932 coupled to an electrode 929 in a conductor layer 928, with the conductor layer electrically isolated from the base layer 926 by insulator layer 920. Trace members 913 are joined (e.g., by welds or adhesive), with the electrodes 929 facing one another, to a spacer 965 to define a void or cavity 918. Spacer 965 can be metal, ceramic, polymer or other materials.

Figure 33:
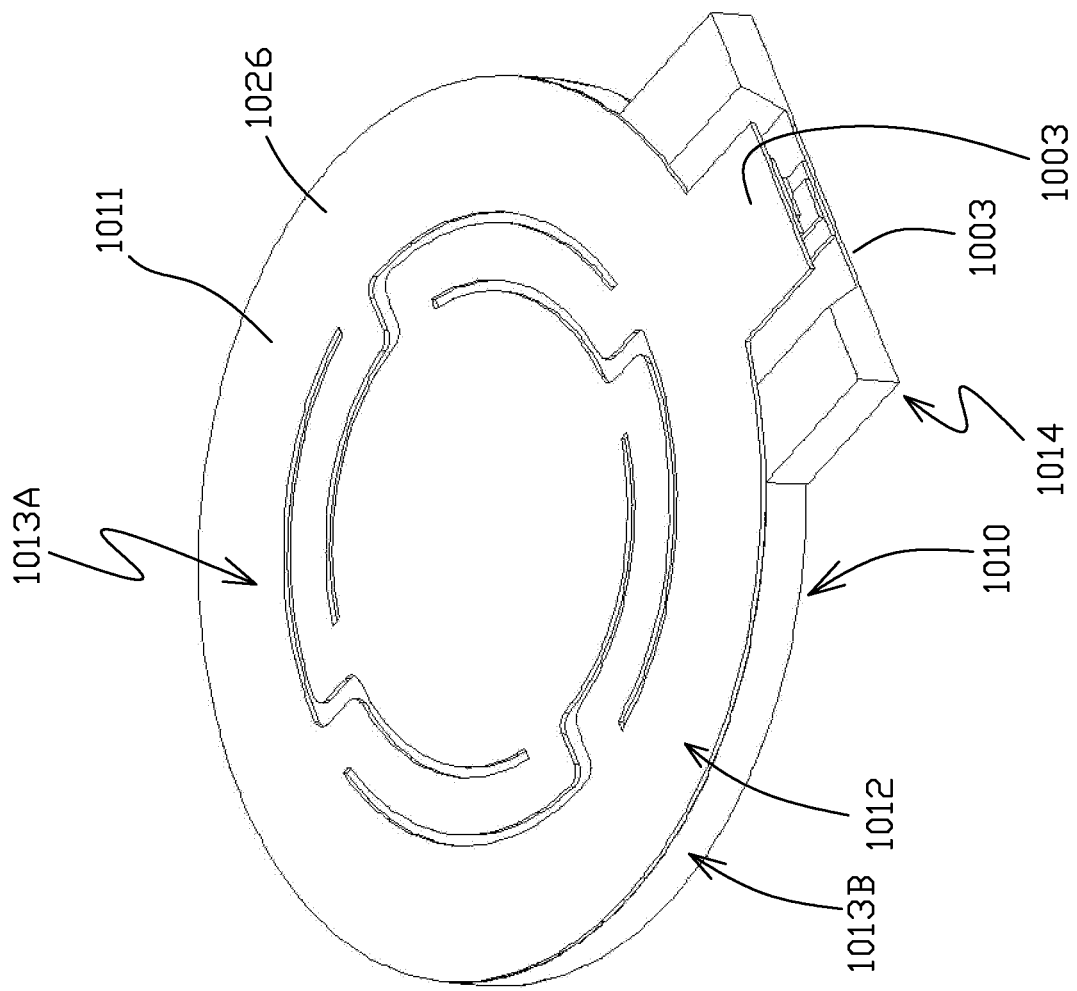
FIG. 33 is an isometric view of a sensor having a diaphragm structure and integrated lead structure in accordance with other embodiments of the invention.
Figure 34:
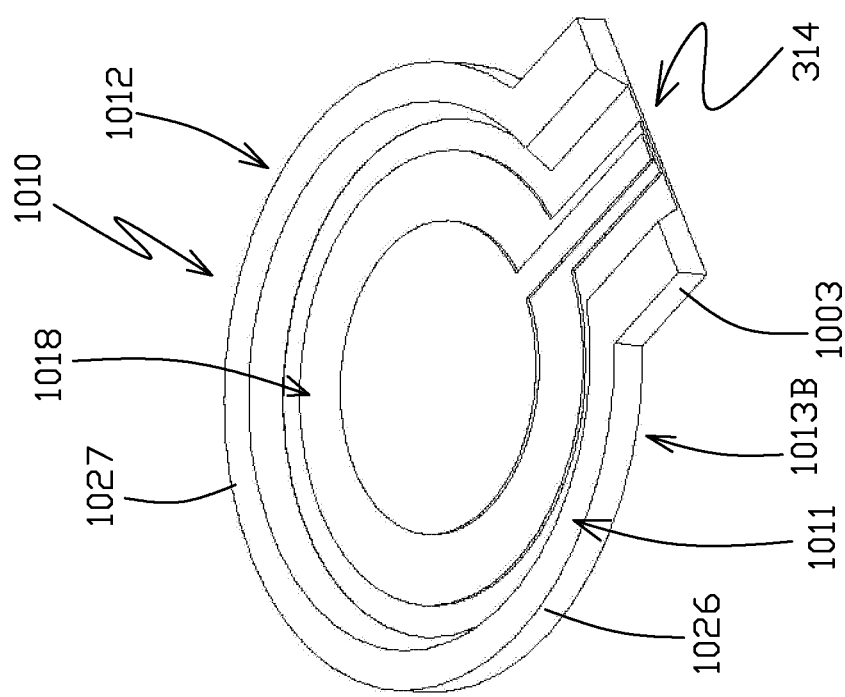
FIG. 34 is a view of the sensor with the trace member removed.

FIG. 33 is an isometric view of a sensor 1010 having a diaphragm structure 1012 and integrated lead structure 1014 in accordance with embodiments of the invention. Sensor 1010 includes two trace members 1013A and 1013B, each having a diaphragm portion 1011 and a lead portion 1003. FIG. 34 is a view of the sensor 1010 shown in FIG. 33, with the trace member 1013A removed. Trace member 1013A can be the same as or similar to trace member 813 described above. Trace member 1013B can be similar to trace member 813 described above, but as perhaps best shown in FIG. 34, the base member 1026 includes a recess or pocket (e.g., etched in a layer of stainless steel) to provide an annular wall 1027. A separate spacer component such as 965 described in the embodiment of FIGS. 31 and 32 is therefore not needed to provide the cavity 1018.

Figure 38B:
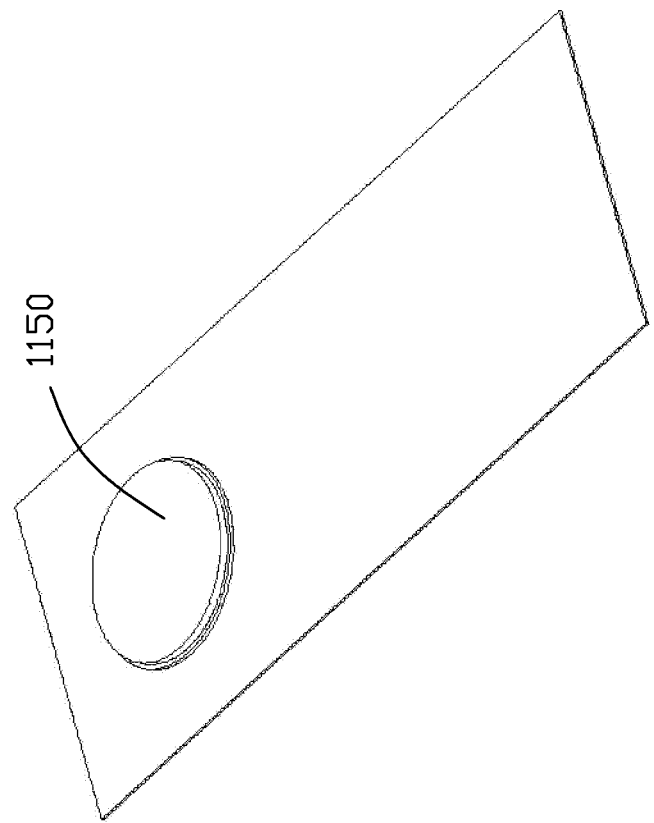
Figure 38A:
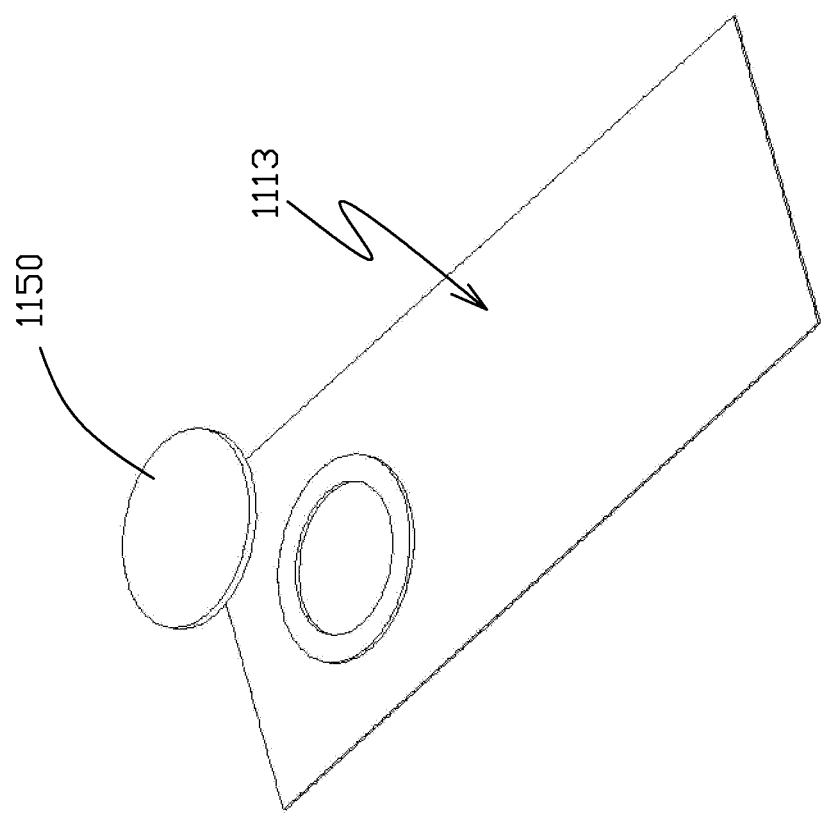

FIGS. 35, 36, 37A, 37B, 38A and 38B illustrate and describe a sensor 1100 in accordance with yet additional embodiments of the invention. As shown, the sensor 1100 includes a diaphragm structure 1112 and an integrated lead structure 1114. Portions of the sensor 1100 including the diaphragm structure 1112 and integrated lead structure 1114 include a circuit or trace member 1113. A member 1150 such as a stainless steel disk that functions as an electrode is mounted to the trace member 1113. A stainless steel disks is attached to complete the structure shown in FIG. 36, which is a top view. FIG. 35 is a cross section, showing the top stainless steel 1120, TSA+ ring stainless steel 1122, TSA+ copper via 1124 and capacitor plate 1126, and TSA+ dielectric 1128. FIGS. 37A (bottom view) and 37B (top view) show just the TSA+ base component, including copper (CU) 1130 and polyimide (PI) 1132. Via connection 1134 is made to stainless steel toroid 1136. FIGS. 38A (exploded top view) and 38B (top view) show the stainless steel disk attached to complete the sensor.

Figure 39A:
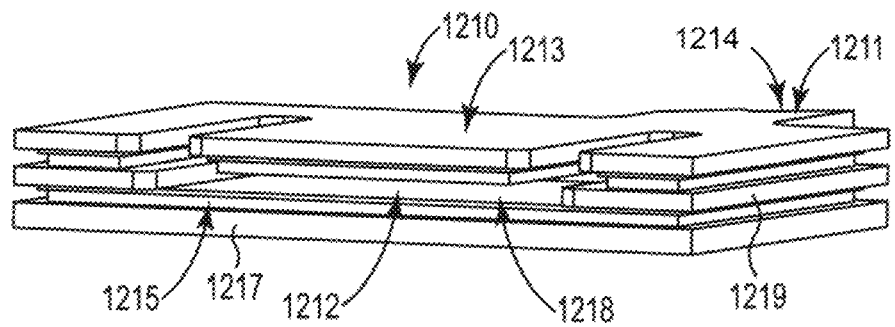
FIGS. 39A and 39B are isometric illustrations of a sensor in accordance with still other embodiments of the invention.
Figure 39B:
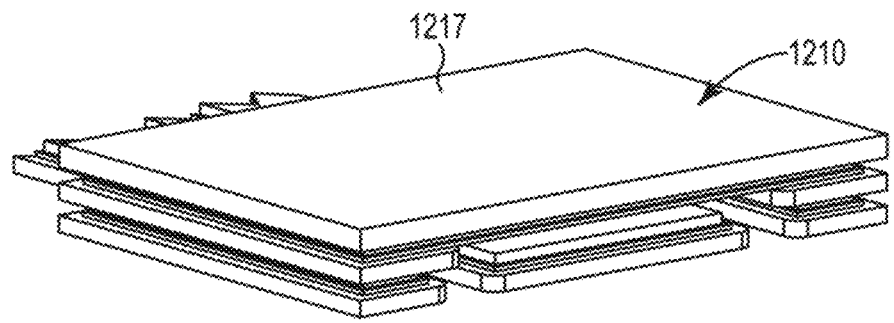
Figure 40:
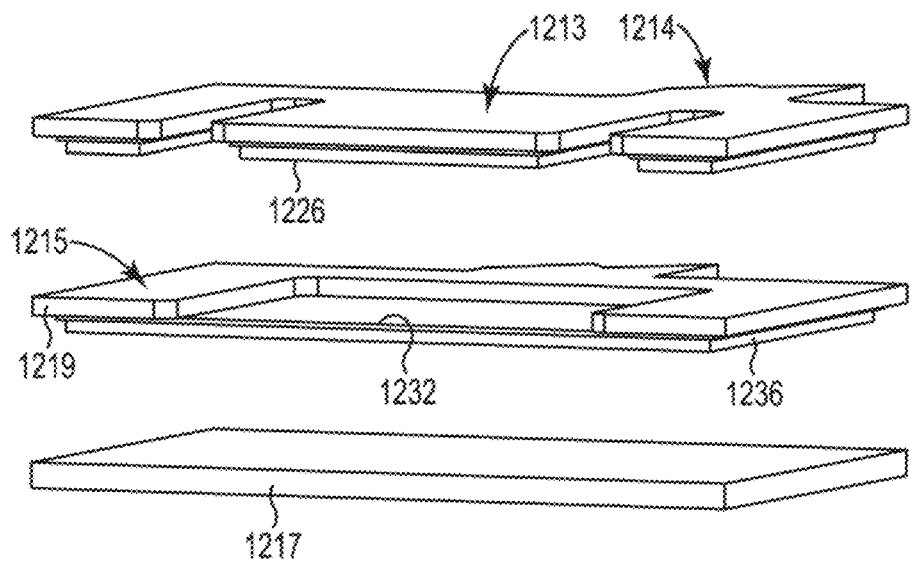
FIGS. 40 and 41 are exploded views of the sensor, taken generally from the side shown in FIG. 39A.
Figure 41:
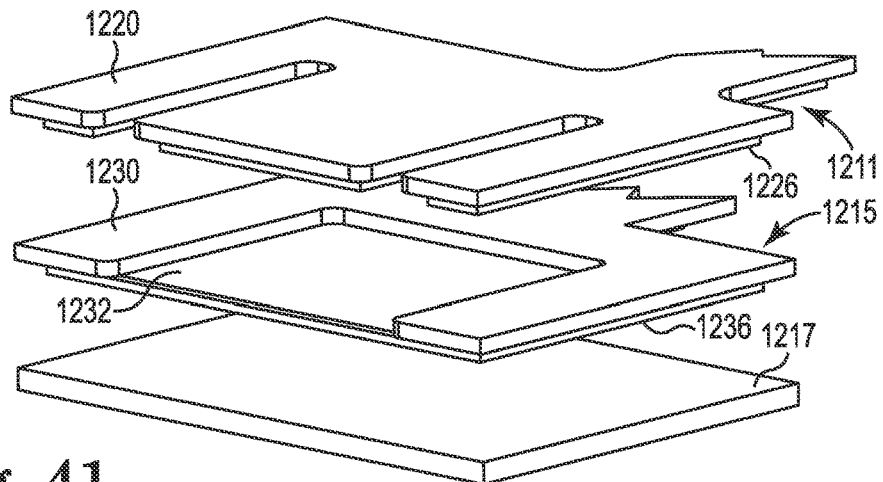
Figure 42:
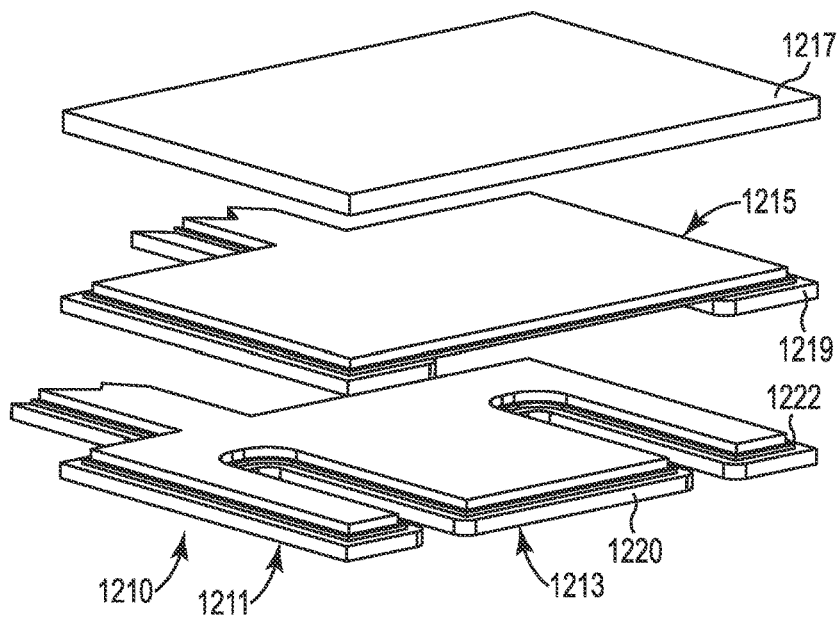
FIGS. 42 and 43 are exploded views of the sensor, taken generally from the side shown in FIG. 39B.
Figure 43:
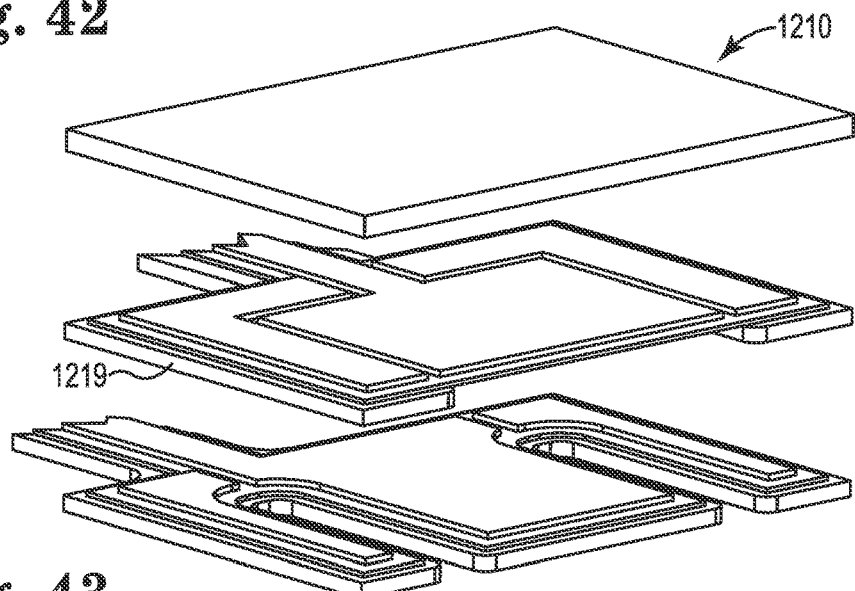

FIGS. 39A and 39B are isometric illustrations of a sensor 1210 in accordance with still other embodiments of the invention, showing opposite sides of the sensor. FIGS. 40 and 41 are exploded views of the sensor 1210, taken generally from the side shown in FIG. 39A. FIGS. 42 and 43 are exploded views of the sensor 1210, taken generally from the side shown in FIG. 39B. In the illustrated embodiment, sensor 1210 is a capacitive device that includes a first or top circuit portion 1211 with a springboard 1213, a second or fixed circuit portion 1215, and a base backer plate 1217, which can be stainless steel or other sufficiently rigid material. Other embodiments do not include the backer plate 1217 (e.g., in embodiments where the sensor 1210 is mounted to a rigid surface). The sensor 1210 includes a diaphragm structure 1212 including springboard 1213, and an integrated lead structure 1214 that extends from the diaphragm structure. Each of the top circuit portion 1211 and fixed circuit portion 1215 includes a diaphragm portion and an integrated lead portion in the illustrated embodiment. Diaphragm structure 1212 includes a base 1216 having a void region or cavity 1218. In the illustrated embodiment, the cavity 1218 is a space between arms 1219 in the diaphragm portion of the fixed portion 1215. Other than the configuration of the springboard 1213, sensor 1210 has features similar to those of other embodiments described above.

Figure 45A:
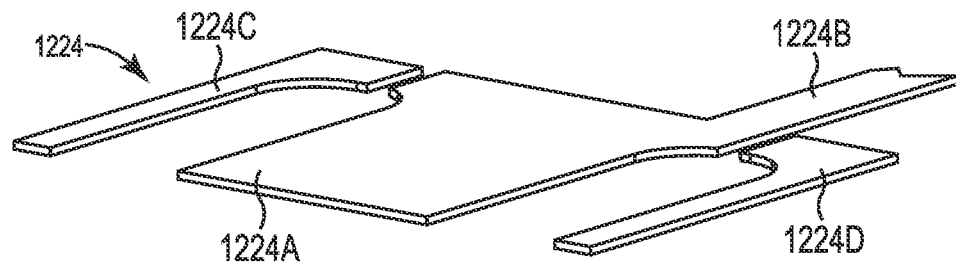
FIG. 45A illustrates the conductor layer of the top circuit portion.

Top circuit portion 1211 includes a metal (e.g., stainless steel) base layer 1220, a polymer or other dielectric insulator layer 1222, a conductor (e.g., copper or copper alloy plated on a sputtered chromium or other seed layer) layer 1224, and a polymer covercoat 1226. FIG. 45A illustrates the conductor layer 1224 of the top circuit portion 1211, which includes an electrode portion 1224A on the springboard 1213 of the diaphragm portion, and a lead or trace portion 1224B on the integrated lead portion. The polymer layer 1222 includes a diaphragm portion that electrically insulates the electrode portion 1224A of the conductor layer 1224 from the base layer 1220, and a lead portion that electrically insulates the lead portion 1224B of the conductor layer from the base layer. In the illustrated embodiment the conductor layer 1224 is embedded within the covercoat 1226. Other embodiments do not include some or all of the covercoat 1226. The electrode portion 1224A of the conductor layer 1224 functions as an electrode that moves with the springboard 1213 in response to the application of force to the springboard. The diaphragm portion and the lead portion of the polymer layer 1222 are common, and the electrode portion 1224A and lead portion 1224B of the conductor layer 1224 are common (e.g., fabricated during the same manufacturing steps). Arm portions 1224C and 1224D of the conductor layer 1224 maintain the height of the associated portions of top circuit portion 1211 with respect to other components of the sensor 1210.

Figure 44:
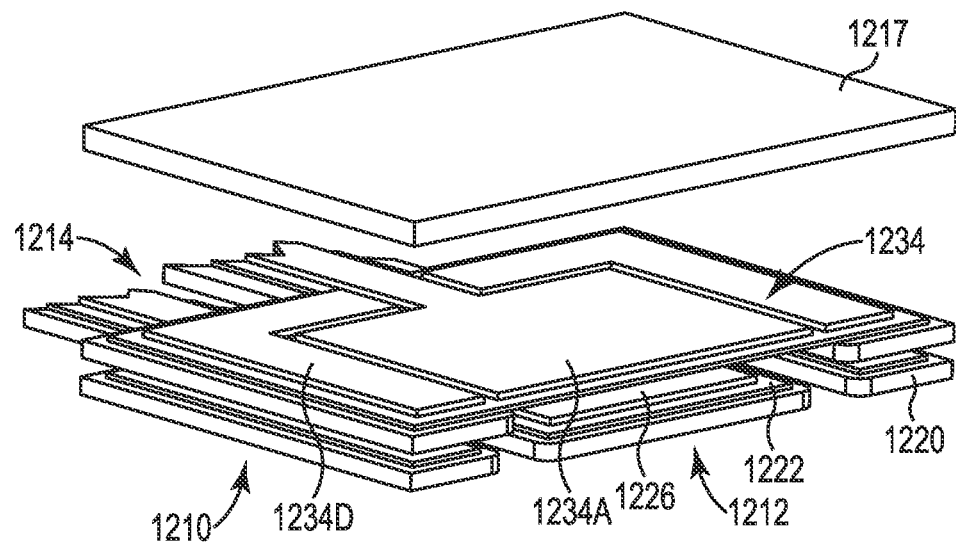
FIG. 44 is a partially exploded view of the sensor, with a covercoat layer hidden.
Figure 45B:
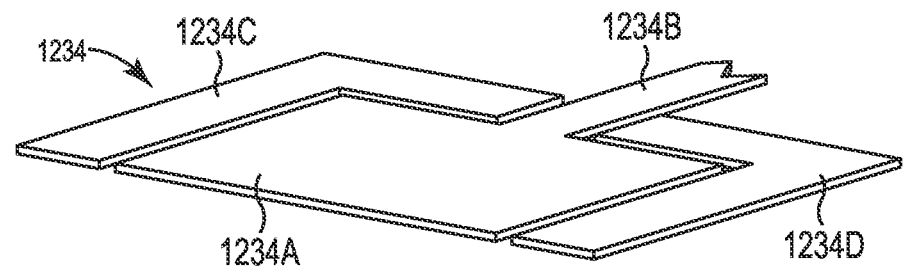
FIG. 45B illustrates the conductor layer of the fixed circuit portion.

The fixed circuit portion 1215 includes a metal or other material (e.g., ceramic) base layer 1230, a polymer or other dielectric insulator layer 1232, a conductor layer 1234, and a polymer covercoat 1236. FIG. 45B illustrates the conductor layer 1234 of the fixed circuit portion 1215, which includes an electrode portion 1234A on the diaphragm portion, and a lead or trace portion 1234B on the integrated lead portion. FIG. 44 is partially exploded view of the sensor 1210, with the backer plate 1217 shown separated from other portions of the structure and the covercoat hidden to show the conductor layer 1234. The polymer layer 1232 includes a diaphragm portion that electrically insulates the electrode portion 1234A of the conductor layer 1234 from the base layer 1230, and a lead portion that electrically insulates the lead portion 1234B of the conductor layer from the base layer. Embodiments of the invention having a base layer of non-conductive material need not include the polymer layer 1232. In the illustrated embodiment the conductor layer 1234 is embedded within the covercoat 1236. Other embodiments do not include some or all of the covercoat 1236. The electrode portion 1234A of the conductor layer 1234 functions as an electrode. The diaphragm portion and the lead portion of the polymer layer 1232 are common, and the electrode portion 1234A and lead portion 1234B of the conductor layer 1234 are common. Arm portions 1234C and 1234D of the conductor layer 1234 maintain the height of the associated portions of fixed circuit portion 1215 with respect to other components of the sensor 1210. Top circuit portion 1211, fixed circuit portion 1215, and the backer plate 1217 (in embodiments that have this element) can be joined by adhesive, welds or other structures or approaches. Features of sensor 1210 can be similar to those of corresponding features of the other embodiments of sensors described above, and can be manufactured using similar fabrication processes.

Figure 46A:
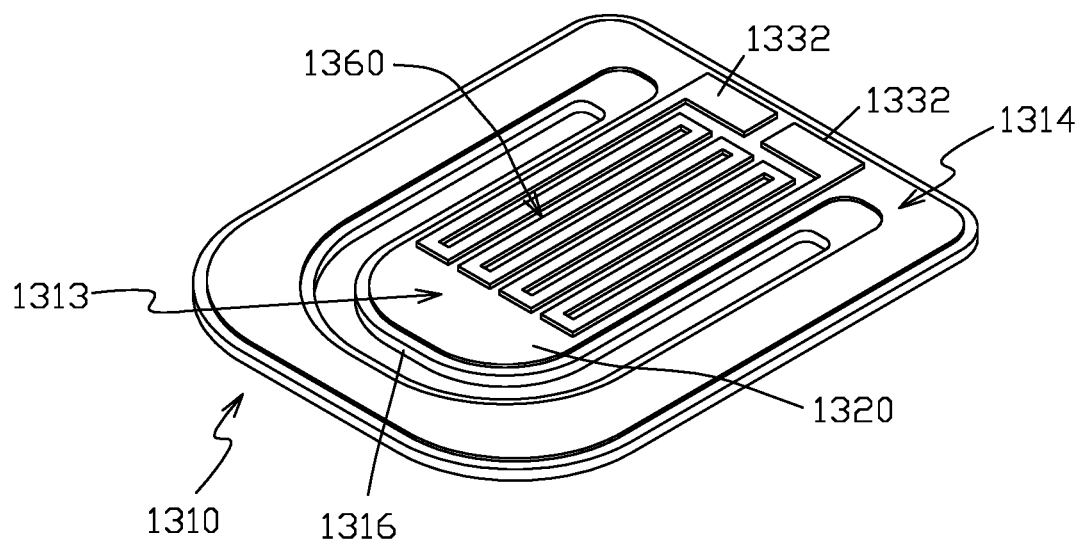
FIGS. 46A, 46B and 46C are top isometric, cross sectional and bottom isometric views of a strain gauge sensor in accordance with other embodiments of the invention.
Figure 46B:
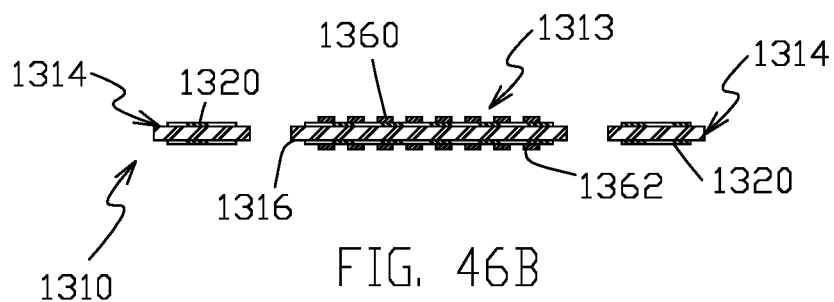
Figure 46C:
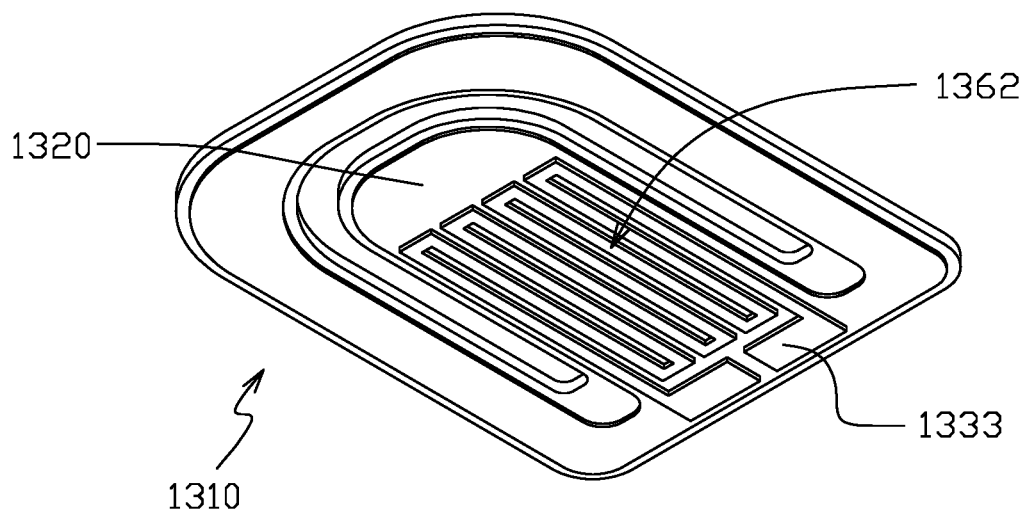

FIGS. 46A and 46C are top and bottom isometric views of a sensor 1310 in accordance with additional embodiments of the invention. FIG. 46B is a cross sectional view of the sensor 1310. As shown, sensor 1310 is a strain gauge device that includes a springboard portion 1313 extending from a static base or lead structure 1314. A first or top strain gauge circuit 1360 is located on the first or top surface of the springboard portion 1313 and has leads 1332 that extend onto the lead structure 1314. Similarly, a second or bottom strain gauge circuit 1362 is located on the second or bottom surface of the springboard portion 1313, and has leads 1333 that extend onto the lead structure 1314. The stain gauge circuits 1360 and 1362 mirror each other in embodiments. Strain gauge circuits 1360 and 1362 and the associated leads 1332 and 1333 can be plated metal such as Constantan. In the illustrated embodiment, the springboard and lead structure include a spring metal base layer 1316 such as stainless steel, although other embodiments use other materials such as polymers or ceramics. The springboard portion 1313 thereby functions as a diaphragm structure in response to the application of pressure or force. Both the top and bottom circuits 1360 and 1362 are arranged in a serpentine configuration such that most of the serpentine length extends into the moving springboard portion 1313 of the base structure or layer 1316. In embodiments such as that shown having a conductive metal base layer 1316, layers of insulating polymer 1320 can separate the metal base layer from the circuits 1360 and 1362. The terminals (electrical pads) on the leads 1332 and 1333 of the strain gauge circuits 1360 and 1362, respectively, can be located on the static region of the base structure or extend further down the integrated lead structure 1314. Sensor 1310 can be manufactured using processes similar to those described above. As with the sensors described above, the strain gauge circuits 1360 and 1362 and associated insulating layers of polymer 1320 are common to the springboard (i.e., diaphragm) portion 1313 and lead structure 1314.

The dual strain gauge sensor 1310 embodiment locates both the strain gauge circuits 1360 and 1362 on the moving springboard region 1313 of a diaphragm structure. When the springboard region 1313 is moved or deflected, one strain gauge element (e.g., 1360) is tensioned while the opposite side strain gauge element (e.g., 1362) is compressed. An advantage of the two strain gauge sensor 1310 is that the thermal output (signal error from temperature changes) can be minimized when the first and second strain gauge elements are connected to adjacent legs of a Wheatstone bridge signal processing circuit (not shown). Wheatstone bridge circuits are known and commonly used to measure the small resistance changes (e.g., milliohms) that occur within a strain gauge element exposed to tension or compression forces. Sensors such as 1310 can produce significantly higher signal outputs (e.g., twice as high) for a given movement displacement since both strain gauge elements are actively moved producing a similar absolute resistance change contributing to the Wheatstone bridge signal output.

Embodiments of the invention described herein (e.g., in connection with FIGS. 21-45) can include one or more features of the sensors disclosed in the above-identified and incorporated application No. 62/290,789 (i.e., the sensors described in connection with FIGS. 1-20). Similarly, one or more features of the sensors disclosed herein (e.g., in connection with FIGS. 21-45) can be incorporated into the sensors disclosed in application No. 62/290,789 (i.e., the sensors described in connection with FIGS. 1-20). For example, one or both of the spring arm supported diaphragm member and the high dielectric constant material within the diaphragm structure can be incorporated into the sensors described in connection with FIGS. 1-20. Furthermore, features described in herein in connection with embodiments (e.g., the diaphragm member having spring arms, high dielectric layer material, plating and cover coat) can be incorporated into any or all other embodiments.

Embodiments of the invention have reduced capacitance offset, noise and drift from parasitic (zero applied pressure) capacitance that exists between other conductors and dielectrics not within the overlapping and compressible electrode areas within the diaphragm members. Parasitic capacitance changes with pressure are reduced. Separation distance between the voltage source and sink conductors, laterally and vertically, is increased. Separation distances between source and sink conductors and other metallic surfaces can be increased. Other embodiments (not shown) can reduce parasitic capacitance by extending and connecting either one or both diaphragm member metal layers to a third conductor trace routed to earth ground, supply signal ground or a capacitance bridge junction. Operation of the sensors is enhanced by the use of high dielectric constant material between the overlapping and compressible electrodes and low dielectric constant material (less than or equal to the diaphragm gap material) between the conductive surfaces that do not constrict the pressure diaphragm, the parallel conducting plates and overlapping space. Capacitance changes to applied pressure are increased. Enhancing the dielectric constant of the material between the parallel conducting plates increases sensitivity to applied pressure. Performance is enhanced by the use of a composite of compressible elastomer (low young's modulus or hardness) and semi-conductive particles, such as $TiO_2$, with large dielectric constant (e.g., 50). The number of assembled parts can kept relatively low by using integrated circuit members formed from insulating and conductive material layers on a base such as spring metal.

The sensors can be incorporated into medical devices such as catheters and endoscopes. For example the sensors can be incorporated at the distal or leading ends of catheters and endoscopes, to sense pressures on the devices that are applied axially and/or from the sides of the devices. In other embodiments the sensors are used in applications such as automotive, aerospace, industrial, mineral extraction, subsea, and geothermal. Yet other applications include positional sensors, such as differential force sensors to determine positions (e.g., of joysticks). The sensors can be well suited to high temperature and/or harsh or corrosive environments. They can also be very small (e.g., thin or having low Z-height). For example, embodiments of the sensors can range from 100 µm to 1000 µm to 5000 µm in diameter, although larger or small sensors are contemplated. In sensors of these types the thickness of the dielectric insulating layers can range from 3-10 µm, the thickness of the sputtered conductor layers can range from 1-50 µm, the thickness of stainless steel layer can range from 12-500 µm, and the traces can be as thin as 10 µm. These structures can also be made thicker or thinner based on factors such as available process constraints and parameters and desired characteristics (e.g., the desired pressure/force sensing range of the device). The sensors can be flexible.

Although the invention has been described with reference to preferred embodiments, those of skill in the art will recognize that changes can be made in form and detail without departing from the spirit and scope of the invention. For example, features of the different embodiments can be combined with features of other embodiments.

The invention claimed is:
1. A capacitive pressure sensor, comprising:
a first trace assembly, including:
   a spring metal diaphragm including a base portion and a moving portion;
   an insulating layer including a diaphragm portion on the moving portion of the diaphragm and a lead portion extending from the diaphragm; and
   a conductor layer on the insulating layer including an electrode on the diaphragm portion and a trace extending from the electrode on the lead portion; and
a second trace assembly joined to the first trace assembly, including:
   a diaphragm including a base;
   an insulating layer having a diaphragm portion on the diaphragm and a lead portion extending from the diaphragm; and
   a conductor layer on the insulating layer including an electrode on the diaphragm portion and a trace extending from the electrode on the lead portion.
2. The pressure sensor of claim 1 wherein the base portion of the first trace assembly is joined to the base portion of the second trace assembly.

3. The pressure sensor of claim 1 and further including a spacer, and wherein the base portions of the first and second trace assemblies are joined to the spacer.

4. The pressure sensor of claim 1 wherein the spring metal diaphragm includes a plurality of arms coupling the moving portion to the base portion.

5. A capacitive pressure sensor, comprising:
   a trace assembly, including:
   a spring metal diaphragm including a base portion and a moving portion;
   an insulating layer having a diaphragm portion on the moving portion of the diaphragm and a lead portion extending from the diaphragm;
   a conductor layer on the insulating layer including an electrode on the diaphragm portion and a trace extending from the electrode on the lead portion; and
   a metal can electrically and mechanically connected to the base portion of the spring metal diaphragm and defining a void adjacent the moving portion of the spring metal diaphragm.

6. A capacitive pressure sensor, comprising:
   an insulating layer including a diaphragm portion, a lead portion, and first and second opposite sides;
   a conductor layer on the first side of the insulating layer including:
   an electrode on the diaphragm portion;
   a first trace extending from the electrode on the lead portion; and
   a second trace on the lead portion;
   a metal spacer member on the second side of the insulating layer around the electrode;
   a conductive via electrically connecting the second trace to the metal spacer member; and
   a metal electrode member mechanically and electrically joined to the metal spacer member.

\* \* \* \* \*